United States Patent [19]

Sugiki

[11] Patent Number: 5,278,660
[45] Date of Patent: Jan. 11, 1994

[54] METHOD FOR DRIVING SOLID-STATE IMAGING DEVICE HAVING A TWO-PIXEL PERIODIC COLOR FILTER ARRAY

[75] Inventor: Tadashi Sugiki, Yokohama, Japan

[73] Assignee: Kabushiki Kaisha Toshiba, Kawasaki, Japan

[21] Appl. No.: 766,290

[22] Filed: Sep. 27, 1991

[30] Foreign Application Priority Data

Sep. 27, 1990 [JP] Japan ................................ 2-255071
Sep. 28, 1990 [JP] Japan ................................ 2-256883

[51] Int. Cl.$^5$ ............................................ H04N 5/335
[52] U.S. Cl. ........................ 358/213.22; 358/213.26; 358/213.29
[58] Field of Search ............ 358/213.22, 213.26, 358/213.27, 213.28, 213.29, 41, 43; H04N 5/335

[56] References Cited

U.S. PATENT DOCUMENTS

| | | | |
|---|---|---|---|
| 4,774,586 | 9/1989 | Koike et al. | 358/213.29 |
| 4,837,630 | 6/1989 | Ueda | 358/213.26 |
| 4,897,728 | 1/1990 | Yamada | 358/213.13 |

FOREIGN PATENT DOCUMENTS

| | | | |
|---|---|---|---|
| 0258001 | 3/1988 | European Pat. Off. | H04N 3/15 |
| 0315778 | 5/1989 | European Pat. Off. | H04N 3/15 |
| 2-1695 | 1/1990 | Japan | |
| 2-196574 | 8/1990 | Japan | |

OTHER PUBLICATIONS

The Journal of the Institute of Television Engineers of Japan, vol. 34, pp. 1088-1095, "A Tiny One Chip MOS Color Camera"; S. Nagahara et al; Dec. 1980.

*Primary Examiner*—Joseph Mancuso
*Assistant Examiner*—Tuan V. Ho
*Attorney, Agent, or Firm*—Cushman, Darby & Cushman

[57] ABSTRACT

A method of driving a solid-state imaging device having photoelectric converting elements arranged in rows and columns, charge-transferring stages associated with the photoelectric converting elements and arranged in rows and columns, and horizontal transfer registers. During the period of each even-numbered field, these components of the device are driven, such that the pixel charges are transferred from the photoelectric converting elements to the associated charge-transferring stages, and then to the horizontal transfer registers. During the period of each odd-numbered field, the components of the device are driven, such that the pixel charges accumulated in any odd-numbered row of the stages are transferred to the charge-transferring stages of the preceding odd-numbered row, thus jumping over those pixel charges in the elements of the preceding even-numbered row, and are then transferred to the horizontal transfer registers.

12 Claims, 52 Drawing Sheets

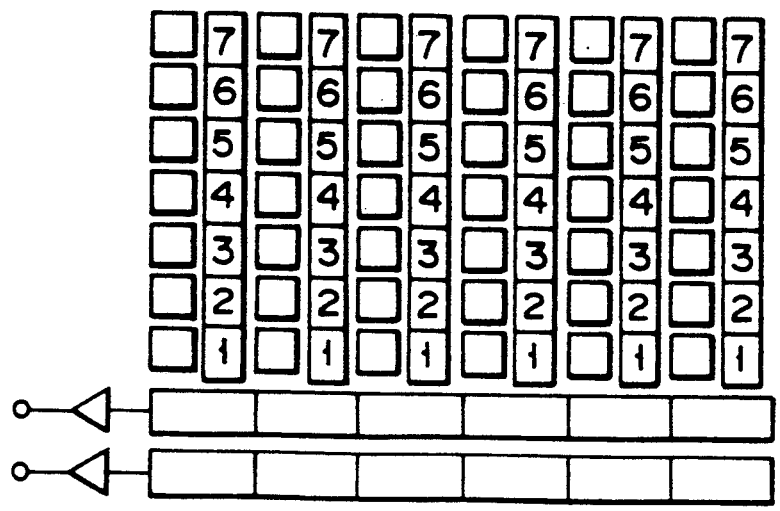
F I G. 6C
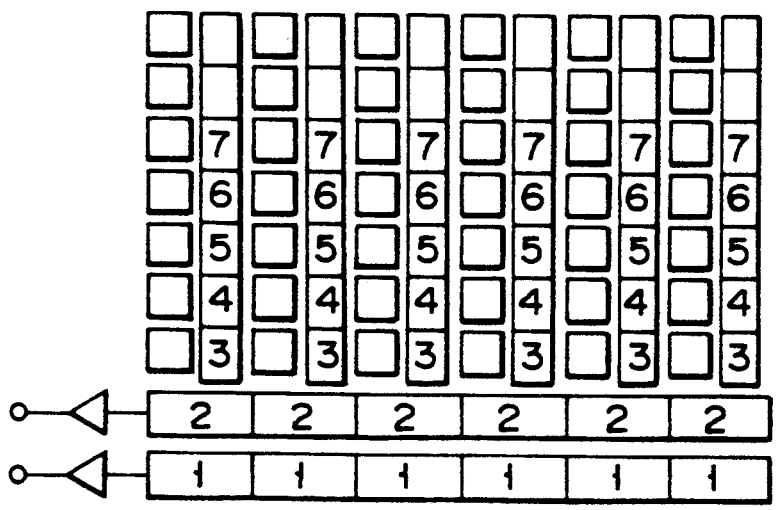
F I G. 6D

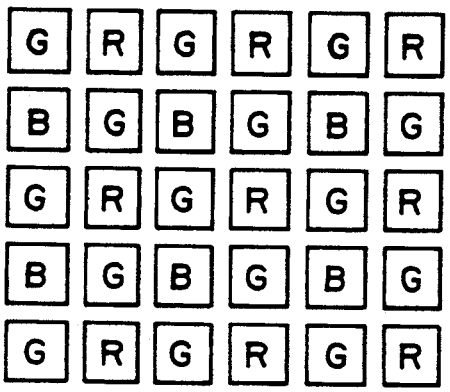
F I G. 10A
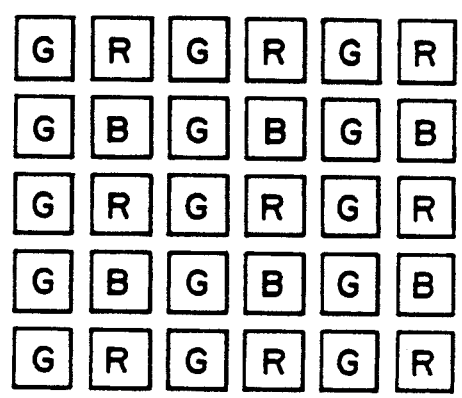
F I G. 10B
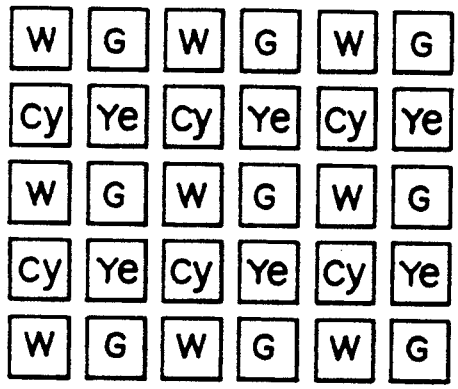
F I G. 10C

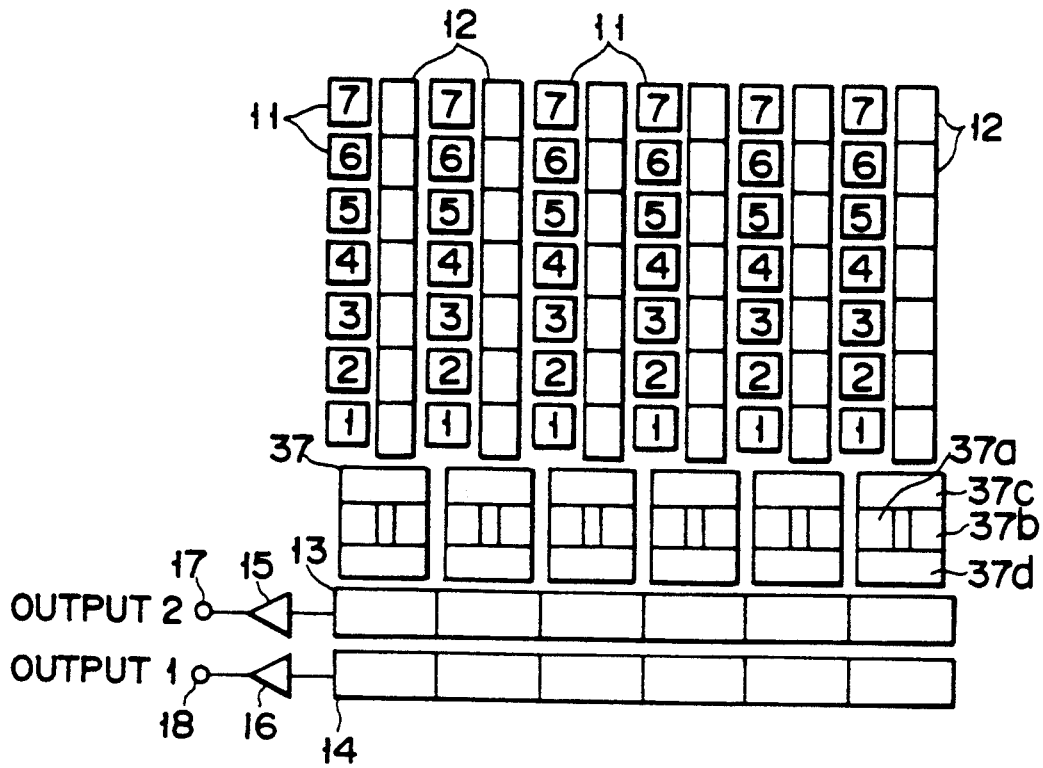
F I G. 13A
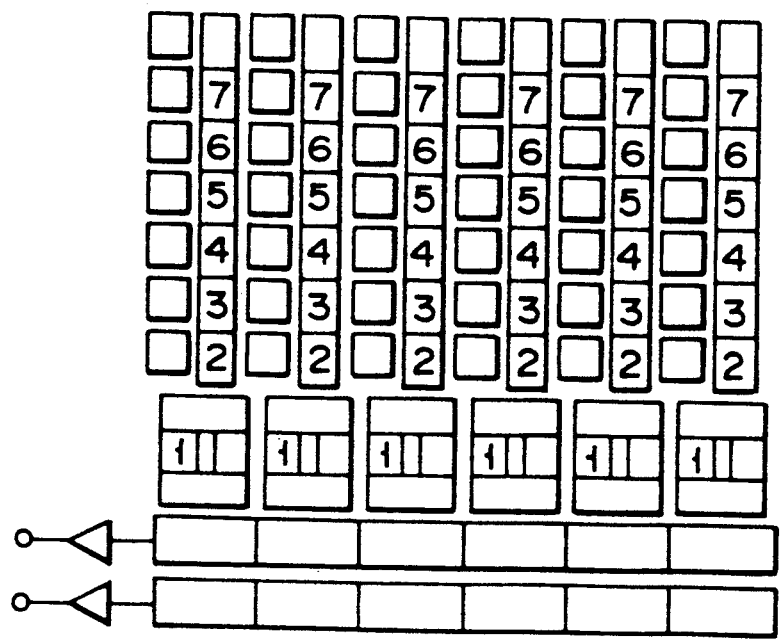
F I G. 13B

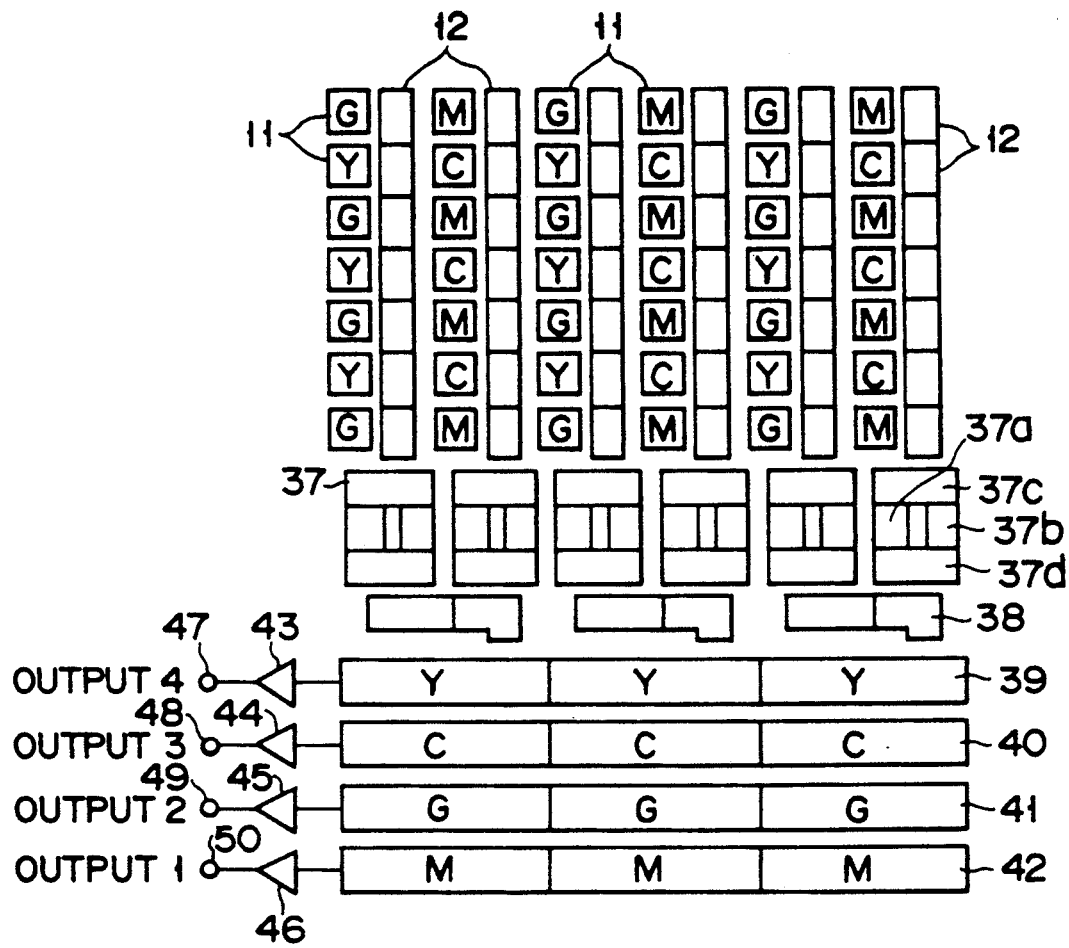
F I G. 14

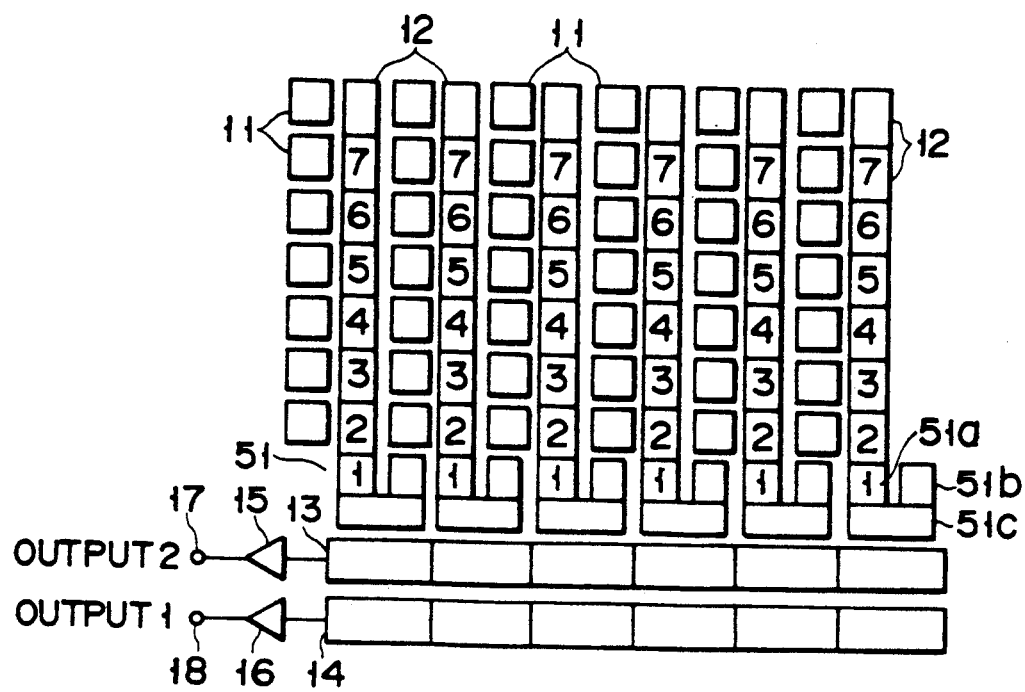
F I G. 16A
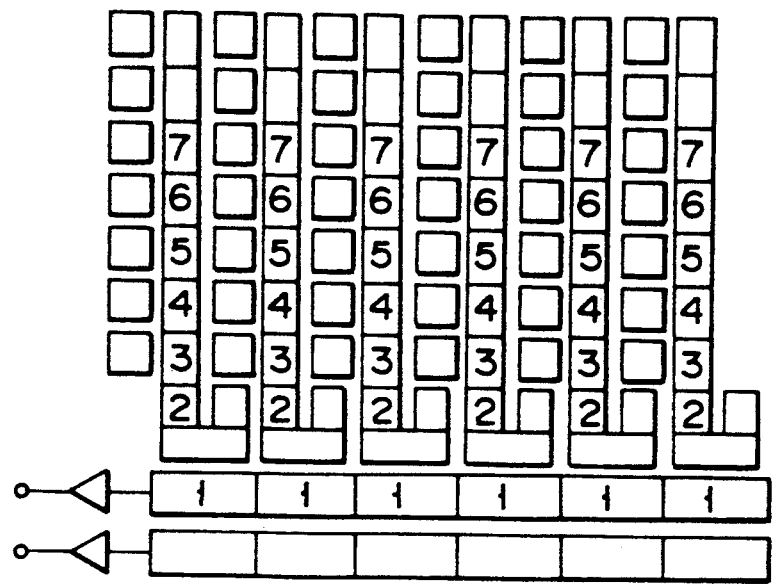
F I G. 16B

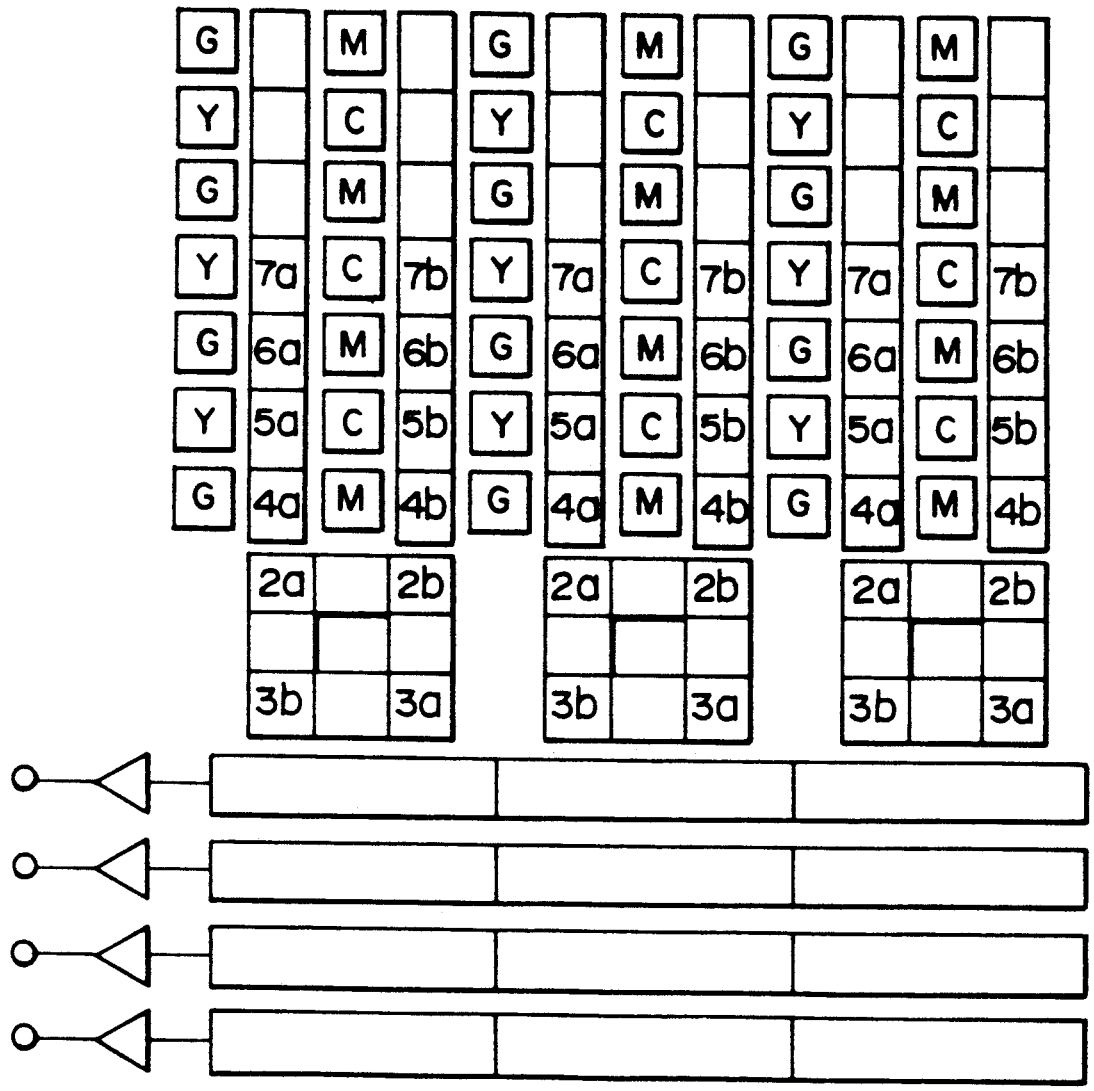
F I G. 18M

METHOD FOR DRIVING SOLID-STATE IMAGING DEVICE HAVING A TWO-PIXEL PERIODIC COLOR FILTER ARRAY

BACKGROUND OF THE INVENTION

1. Field of the Invention

The present invention relates to a solid-state imaging device of single-chip type, for use in a color video camera or the like, and more particularly to a method of driving the solid-state imaging device.

2. Description of the Related Art

As is known in the art, a solid-state imaging device of single-chip type is used in great numbers, in which imaging elements are driven by so-called "field integration method." In the field integration method, adding two signals representing two adjacent pixels of the same column, in one way during the period of every odd-numbered field, and in another way during the period of every even-numbered field. In other words, the "field integration method" performs interlacing. With color filter array shown in FIG. 1, so-called "line sequencial color difference signal method", during each field period, a line signal consisting of color pixel signals G+C and M+Y alternately recurring, and a line signal consisting of color pixel signals M+C and G+Y alternately recurring are alternately output by the solid-state imaging device. The four signals G+C, M+Y, M+C, and G+Y are defined as follows:

$$G+C=2G+B$$

$$M+Y=2R+G+B$$

$$M+C=R+G+2B$$

$$G+Y+R+2G$$

where G is green, C is cyan, B is blue, M is magenta, Y is yellow, and R is red. A signal-processing circuit (not shown) combines these color signals, thereby generating signals representing three primary colors, i.e., red, green, and blue.

The line sequential color difference signal mehod is advantageous in that data of all pixels is read out within one-field period, enhancing the time-domain resolution without reducing the sensitivity of the imaging device. The method is disadvantageous in the following respect, however. Two signals representing two adjacent pixels of a column are added, generating a signal for one row. Further, two adjacent signals representing two other adjacent pixels of the same column are added, thus generating a signal for the next row. Next, the correlation between the two adjacent rows of pixels is determined, thereby generating a color signal. After all, to obtain one color signal, four signals representing four adjacent pixels of the same column must be processed. Consequently, the solid-state imaging device can generate signals, but those representing an image having an insufficient vertical resolution.

A solid-state imaging device has been developed, which can generate signals representing images having sufficient resolution, without impairing the above-mentioned advantage inherent in the line sequential color difference signal method. This device, generally known as "two-line reading device," has the structure shown in FIG. 2A. More specifically, the device comprises photoelectric converting elements 11 charge-transferring stages 12, two horizontal charge transfer elements 13 and 14, two detectors 15 and 16, and two output terminals 17 and 18.

The photoelectric converting elements 11 are arranged in rows and columns. They are provided in numbers large enough to detect a full frame of an image. The charge-transferring stages 12 are provided in the same numbers as the photoelectric converting elements 11, associated with the photoelectric converting elements 11, respectively, and are arranged, forming columns which extend along the columns of elements 11, respectively. Each of the stages 12 transfers the electric charge of the associated photoelectric converting element 11 to the next stages 12 of the same column. Hence, each column of stages 12 transfers the charges accumulated in the elements 11 in the vertical direction.

The horizontal charge transfer registers 13 and 14 extend in the horizontal direction. The register 13 has a row of charge-transferring stages provided in the same number as the charge-transferring stages 12 of one row and associated with the columns of charge-transferring stages 12 of the respective columns. Each charge-transferring stage of the stage 13 receives an electric charge from the last stage 12 of the associated column. The register 14 has a row of charge-transferring stage provided in the same number as those of the charge transfer regtister 13 and associated with therewith, respectively. Each charge-transferring stage of the register 14 receives an electric charge from the charge-transferring stage of the register 13. Either charge transfer stage transfers the electric charges defining one line of an image frame in the horizontal direction.

The detector 15 detects the charges defining one line of the image frame, horizontally transferred in the transfer register 13 and successively output there from, and converts these charges into voltage signals. Similarly, the detector 16 detects the charges defining the preceding line of the image frame, horizontally transferred in the transfer register 14 and successively output therefrom, and converts the charges into voltage signals.

The output terminal 17 supplies the voltage signals output by the detector 15, to a signal-processing circuit (not shown). The output terminal 18 supplies the voltage signals output by the detector 16, to the signal-processing circuit.

During the period of each even-numbered field of a frame, the solid-state imaging device operates in the following way. First, as is shown in FIG. 2A, the photoelectric converting elements 11 accumulate the electric charges 1 to 7 defining the frame. As is evident from in FIG. 2B, these charges are simultaneously transferred from the elements 11 to the charge-transferring stages 12. Then, as is shown in FIG. 2C, the charges are transferred in the columns of the stages 12, in the vertical direction, whereby the charges defining one line of the frame are supplied to the horizontal transfer register 13. Next, as is shown in FIG. 2D, the charges are further transferred in the columns of the stages 12, in the vertical direction, whereby the charges defining the line of the frame are supplied to the horizontal transfer register 14, while the charges defining the next line of the frame are supplied to the horizontal transfer register 13. Then, the detector 16 converts the charges defining the second line of the frame into voltage signals. At the same time, the detector 15 detects converts charges defining the second line of the frame into voltage signals. Finally, the output terminals 17 and 18 supply the signals output by the detector 15 and those output by the detector 16 to the signal-processing circuit (not shown).

During the period of each odd-numbered field of a frame, the solid-state imaging device operates in the following way. First, as is shown in FIG. 3A, the photoelectric converting elements 11 accumulate the electric charges 1 to 7 defining the frame. As is evident from in FIG. 3B, these charges ar simultaneously transferred from the elements 11 to the charge-transferring stages 12, and are transferred in the columns of the stages 12, in the vertical direction, whereby the charges defining one line of the frame are supplied to the horizontal transfer register 13. Next, as is shown in FIG. 3C, the charges are further transferred in the columns of the stages 12, in the vertical direction, whereby the charges defining the line of the frame are supplied to the horizontal transfer register 14, while the charges defining the next line of the frame are supplied to the horizontal transfer register 13. Further, as is shown in FIG. 3D, the charges are further transferred in the columns of the stages 12, in the vertical direction, such that the charges defining the second line of the frame are supplied to the horizontal transfer register 14, while the charges defining the third line of the frame are supplied to the horizontal transfer register 13. Then, the detector 16 converts the charges defining the third line of the frame into voltage signals. At the same time, the detector 15 detects converts charges defining the second line of the frame into voltage signals. Finally, the output terminals 17 and 18 supply the signals output by the detector 15 and those output by the detector 16 to the signal-processing circuit (not shown).

The two-line reading device shown in FIG. 2A has a color-filter array of the type shown in FIG. 4, wherein each column consists of two types of color filters, arranged alternately. This type of a color filter array will be referred to hereinafter, as "two-pixel periodic color filter array." As can be understood from FIG. 4, the two combinations of colors, i.e., two outputs 1 and 2 the terminals 17 and 18 generated during each even-numbered field period, are reversed during each odd-numbered field period. To prevent this reversion, it is therefore necessary to supply, as is shown in FIG. 5, the two outputs 1 and 2 of the solid-state imaging device 19 to the signal-processing circuit 22 through switches 20 and 21 which are controlled at the start of every field period. Since the detectors 15 and 16 most likely have different gains in most cases, an attenuator 23 is connected between the output 2 of the device 19 and the switch 21, thereby balancing the outputs 1 and 2 of the device 19.

SUMMARY OF THE INVENTION

The object of the present invention is to provide a method of driving a solid-state imaging device, which enables the imaging device having a two-pixel periodic color-filter array to output two outputs representing two combinations of colors and remaining not reversed during both each even-numbered field period and each odd-numbered field period, without using switches controlled at the start of every field period to prevent reversion of the two outputs, or an attenuator designed to attenuate one of the outputs for balancing the outputs of the device.

According to an aspect of the present invention, there is provided a method of driving a solid-state imaging device comprising a plurality of photoelectric converting elements arranged in rows and columns for converting an optical image into pixel charges, a two-pixel periodic color filter array having color filters converting the photoelectric converting elements, respectively, a plurality of charge-transferring stages arranged in columns and associated with the photoelectric-converting elements, respectively, for transferring pixel charges from the photoelectric converting elements in a vertical direction, and two horizontal transfer registers for receiving the pixel charges in units of one line of an image field, from the columns of the charge-transferring stages, and transferring these pixel charges in a horizontal direction, said method comprising the steps of:

during each first field period, transferring the pixel charges accumulated in the photoelectric converting elements to the charge-transferring stages, and then transferring the charges in the vertical direction to the horizontal transfer registers; and during each second field period, transferring the pixel charges accumulated in the photoelectric con-verting elements of each even-numbered row to the charge-transferring stages of the corresponding even-numbered row, transferring the pixel charges accumulated in the photoelectric converting elements of each odd-numbered row to the charge-transferring stages of the preceding odd-numbered row, thereby causing the pixel charges to jump over the the pixel charges accumulated in the preceding even-numbered row, and then transferring the charges in all photoelectric converting elements in the vertical direction to the horizontal transfer registers.

BRIEF DESCRIPTION OF THE DRAWINGS

FIGS. 6A to 6D are diagrams explaining how a solid-state imaging device of the two-line reading type is driven during the period of each even-numbered field by a first method according to the present invention;

FIGS. 10A to 10C are diagrams showing three color-filter arrays of different types, respectively;

FIGS. 13A to 13F are diagrams explaining how the solid-state imaging device is driven during the period of each odd-numbered field by the second method according to the invention;

FIG. 14 is a diagram explaining a modification of the second method of the invention;

FIGS. 16A to 16E are diagrams explaining how the solid-state imaging device is driven during the period of each odd-numbered field by the third method according to the invention;

FIGS. 17A to 17I are diagrams explaining how a solid-state imaging device of the two-line reading type is driven during the period of each even-numbered field by a fourth method according to the present invention.

DETAILED DESCRIPTION OF THE PREFERRED EMBODIMENTS

Figure 1:
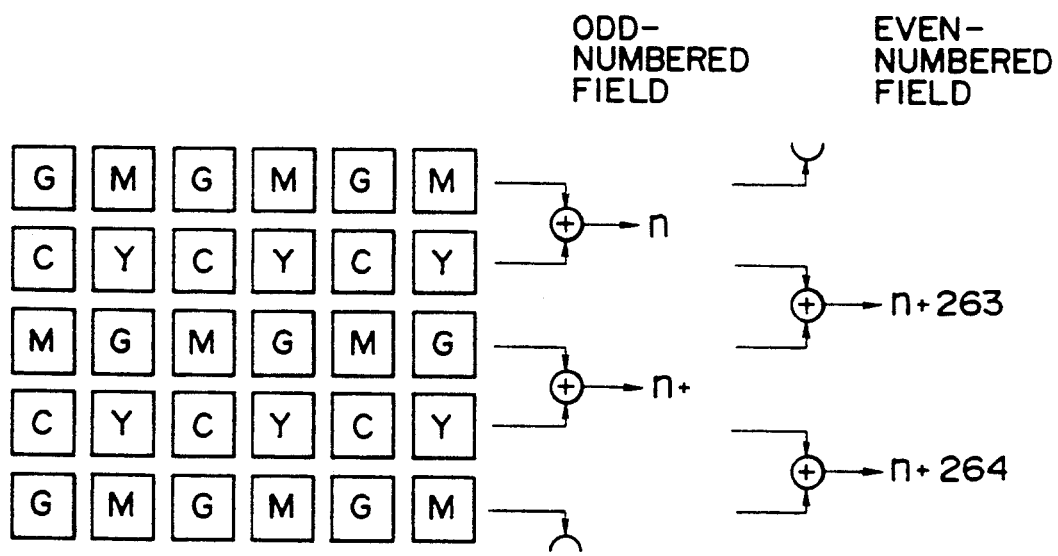
FIG. 1 is a diagram explaining how color filters are arranged, forming an array, in a solid-state imaging device of single-plate type, and also how the device outputs pixel signals in one way during the period of every odd-numbered field, and in another way during the period of every even-numbered field.
Figure 2A:
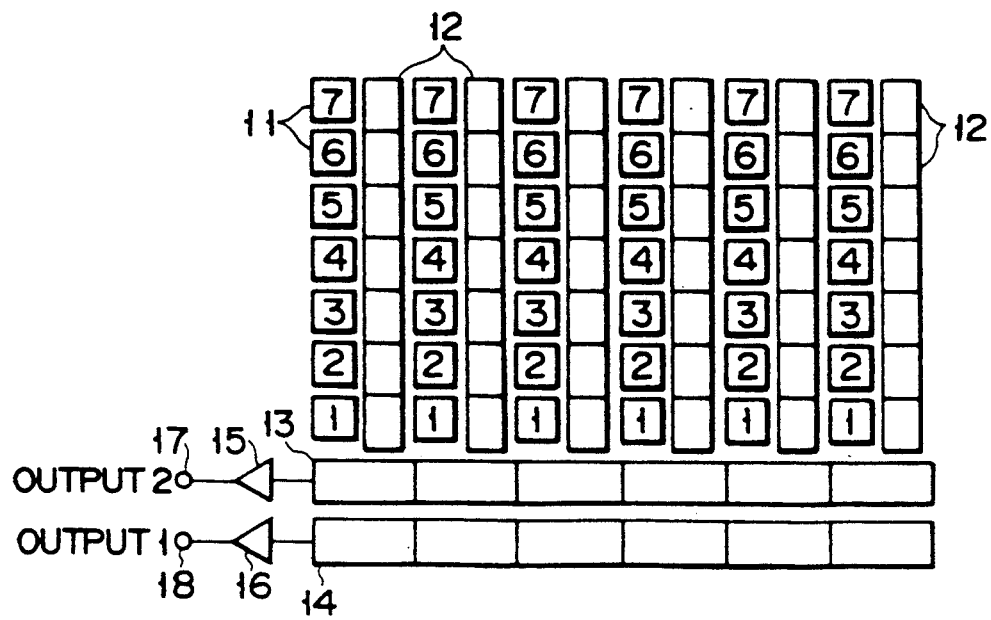
FIGS. 2A to 2D are diagrams explaining how a solid-state imaging device of two-line reading type is driven during the period of each even-numbered field.
Figure 6A:
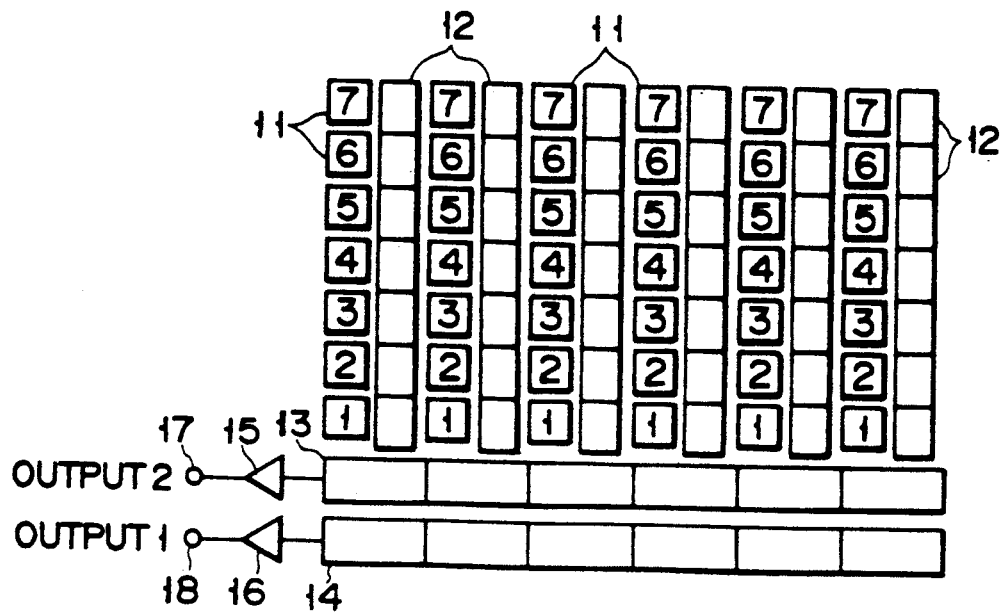

Embodiments of the invention will now be described in detail, with reference to the accompanying drawings. FIG. 6A shows a solid-state imaging device which is identical to the device of FIG. 2A. Therefore, in FIG. 6A, the components of the device are designated at the same reference numerals as in FIG. 2A. A method of driving this device, which is a first embodiment of the invention, will be explained, with reference to FIGS. 6A to 6D and also FIG. 7 which is a timing chart.

Figure 6B:
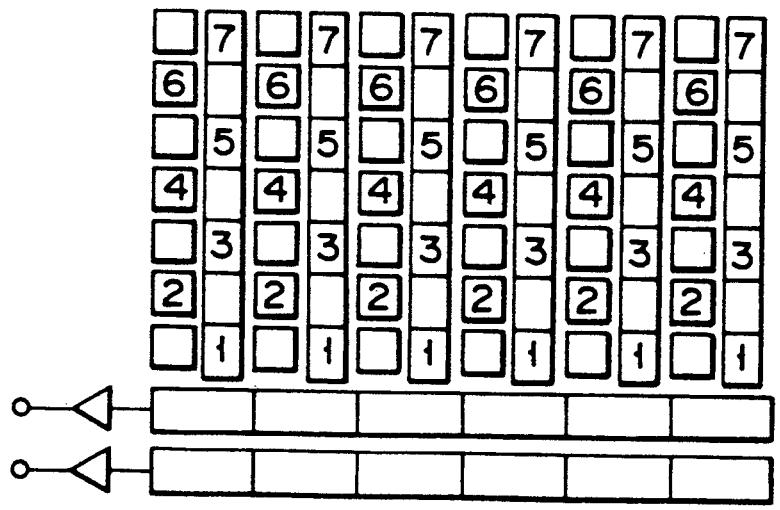
Figure 7:
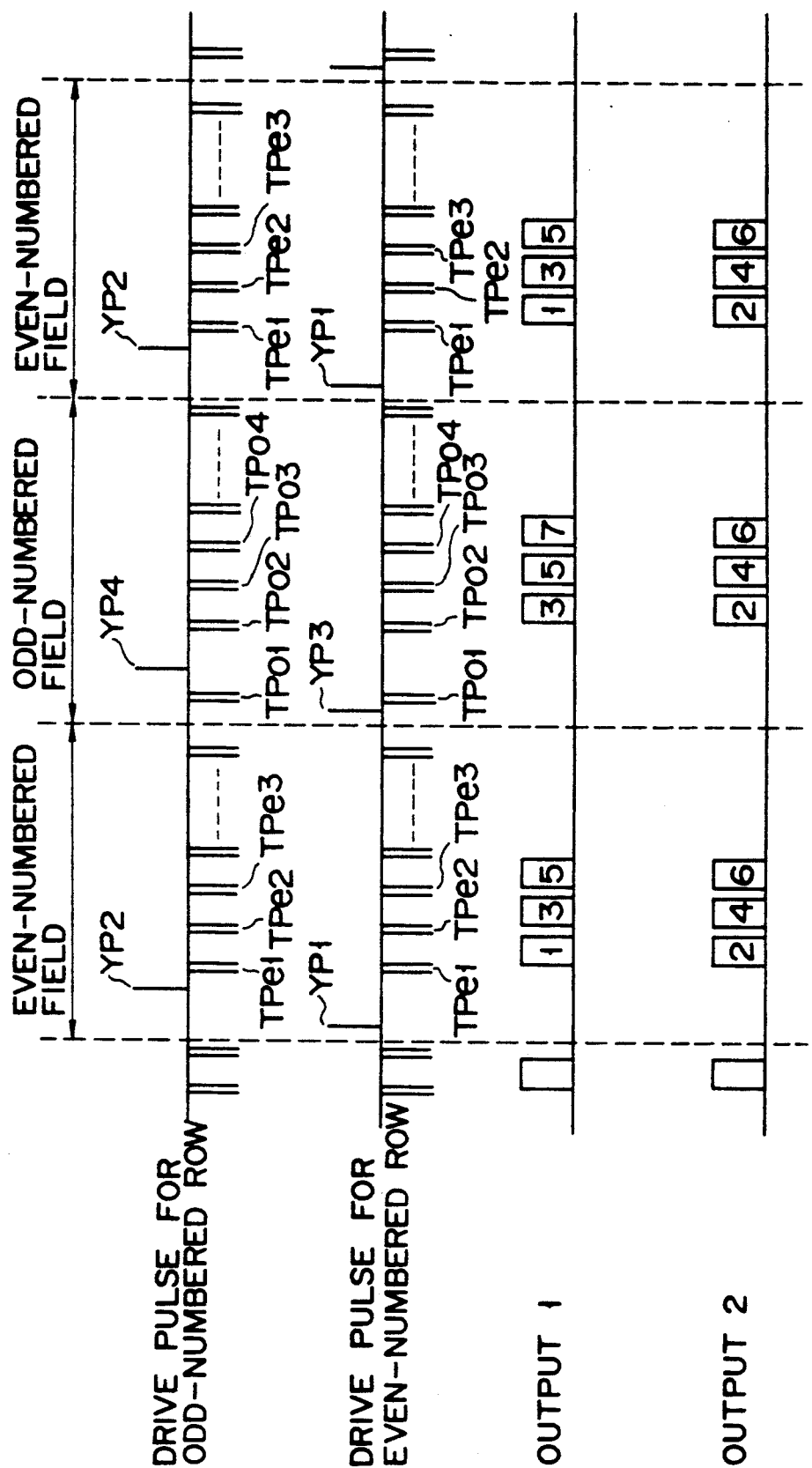
FIG. 7 is a timing chart illustrating the relation between variou pulses for driving the imaging device in the first method of the invention, on the one hand, and the pulses outputs by the device, on the other hand.

During the period of each even-numbered field, the imaging device is driven in the following way. First, a charge-reading pulse YP1 is supplied to the photoelectric converting elements 11 of each odd-numbered row, as is shown in FIG. 7. As a result, the pixel charges 1, 3, 5 and 7 accumulated in the elements 11 of the odd-numbered rows are simultaneously transferred to the associated charge-transferring stages 12 as is shown in FIG. 6B.

Next, a charge-reading pulse YP2 is supplied to the photoelectric converting elements of each even-numbered row, as is shown in FIG. 7, whereby the pixel charges 2, 4, and 6 accumulated in the elements 11 of the even-numbered rows are simultaneously transferred to the associated charge-transferring stages 12, as is evident from FIG. 6C. Next, two vertical-transfer pulses TPel are supplied to all charge-transferring stages 12 as is shown in FIG. 7. As a result, as is shown in FIG. 6D, the pixel charges defining the first line charge 1 representing the first line of an image frame is transferred to the horizontal transfer register 14, and the second line charge 2 pixel charges representing the second line of image frame is transferred to the horizontal register 13. The first line charge and the second line charge are supplied from the elements 14 and 13 to the detectors 16 and 15, respectively, and are converted thereby into a first line signal and a second line signal. These line signals are output from the terminals 18 and 17, respectively. At the same time, the third to seventh line charges 3, 4, 5, 6 and 7 are transferred to the first to fifth rows of stages 12, respectively, as can be understood from FIG. 6D.

Thereafter, every time two vertical-transfer pules (TPe2, TPe3, and so on) are supplied to all charge-transferring stages 12, an odd-numbered line charge and an even-numbered line charge are transferred to the horizontal transfer registers 14 and 13, respectively, and are converted into an odd-numbered line signal and an even-numbered line signal by the detectors 16 and 15, which are output from the terminals 18 and 17, respectively.

Figure 8A:
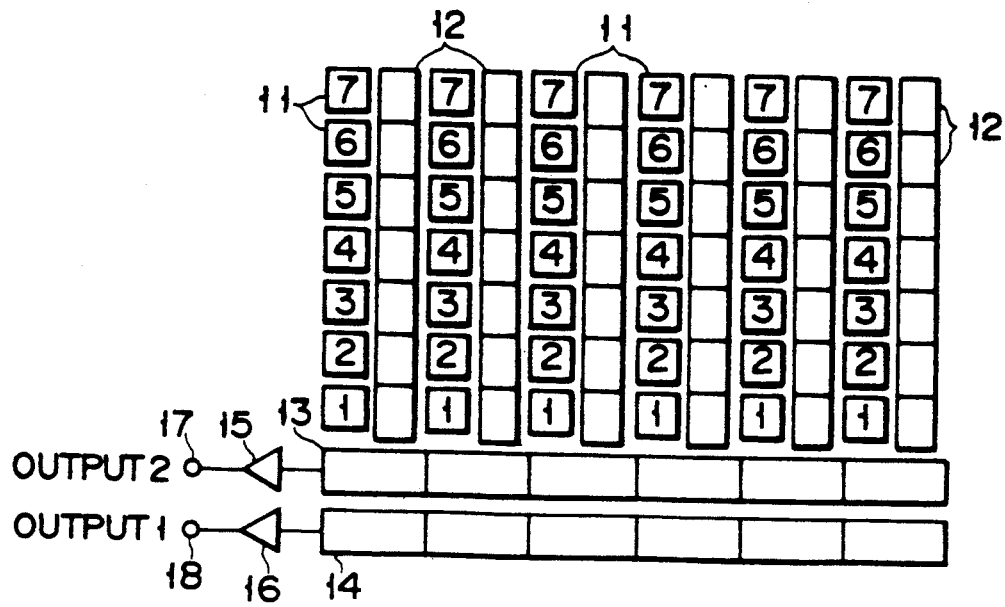
FIGS. 8A to 8D are diagrams explaining how the solid-state imaging device is driven during the period of each odd-numbered field by the first method according to the invention.
Figure 8B:
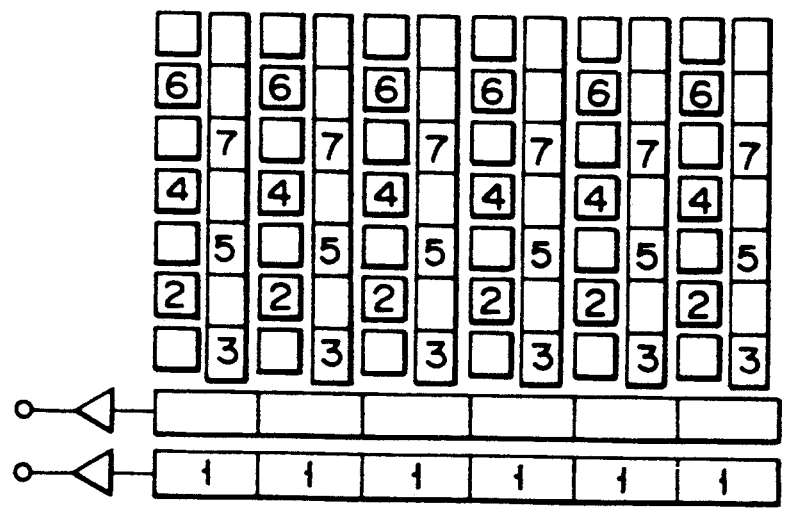

During the period of each odd-numbered field, the solid-state imaging device is driven in the following way. First, a charge-reading pulse YP3 is supplied to the photoelectric converting elements 11 of each odd-numbered row as is shown in FIG. 7, whereby the pixel charges 1, 3, 5 and 7 accumulated in the first, third, fifth and seventh rows of element 11 are simultaneously transferred to the first, third, fifth and seventh rows of charge-transferring stages 12. Shortly thereafter, two vertical-transfer pulses TPo1 are supplied to all charge-transferring stages 12 as is shown in FIG. 7. As a result, as is shown in FIG. 8B, the line charge 1 in the first row of stages 12 is transferred to the horizontal transfer register 14, whereas the line charges 3, 4, 5 and 7 are transferred from the third, fifth and seventh rows of stages 12 are transferred to the first, third and fifth rows of stages 12.

Figure 8C:
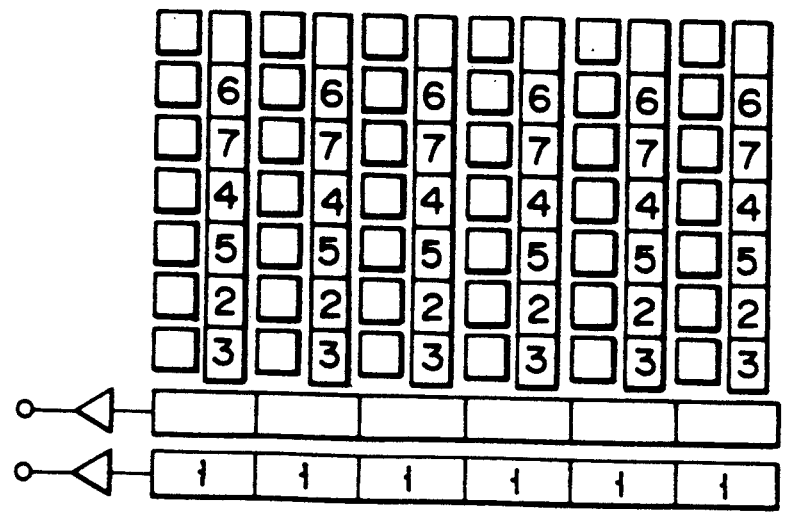

Next, as is shown in FIG. 7, a charge-reading pulse YP4 is supplied to the photoelectric converting elements 11 of each even-numbered row, whereby the line charges 2, 4 and 6 accumulated in the second, fourth and sixth rows of elements 11 are transferred to the second, fourth and sixth rows of stages 12, as is evident from FIG. 8C. At this time any odd-numbered line charge jumps over the immediately preceding even-numbered line charge.

Figure 8D:
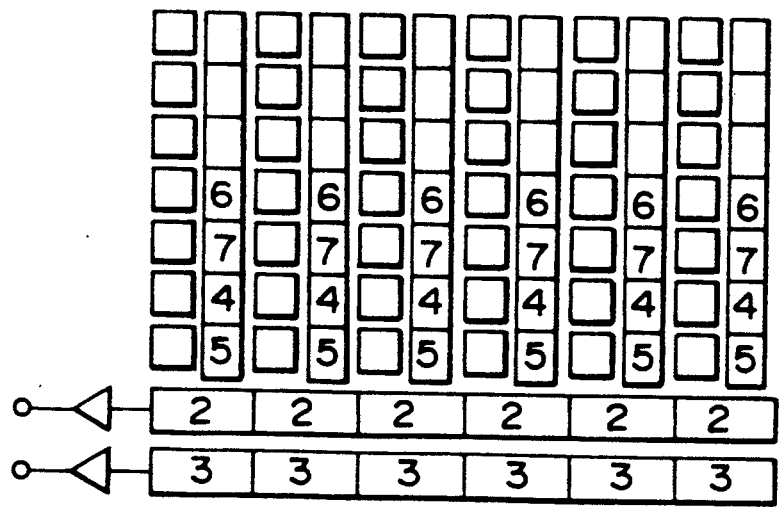

Further, two vertical-transfer pulses TPo2 are supplied to all charge-transferring stages 12 as is shown in FIG. 7. As a result, as is evident from FIG. 8D, the line charge 1 is discarded from the horizontal transfer register 14, thereby to achieve interlacing, and the line charges 3 and 2 are transferred to the horizontal transfer registers 14 and 13, respectively. These line charges 3 and 2 are supplied from the registers 14 and 13 to the detectors 16 and 15, respectively, and are converted thereby into a line signal and a line signal. These line signals are output, as outputs 1 and 2, from the terminals 18 and 17, respectively. At the same time, the other line charges 5, 4, 7 and 6 defining the fifth, fourth, seventh and sixth lines of the image frame, are transferred to the first to fourth rows of stages 12, respectively, as can be understood from FIG. 8D.

Thereafter, every time two vertical-transfer pules (TPo3, TPo4, and so on) are supplied to all charge-transferring stages 12, two line charges representing an odd-numbered line and an even-numbered line are transferred to the horizontal transfer registers 14 and 13, respectively, and converted into two line signals by the detectors 16 and 15. These line signals are output, as outputs 3 and 2, from the terminals 18 and 17, respectively.

As has been described, during each odd-numbered field period, the pixel charges accumulated in the elements 11 of each odd-numbered row are transferred to the charge-transferring stages 12 of the associated row, and then the line charge in the first row of stages 12 is transferred to the horizontal transfer registers 14, while the line charge in any other odd-numbered row of stages 12 jumps over the preceding even-numbered line charge. Hence, two adjacent line signals the imaging device outputs during each odd-numbered field period are in the same position as the two adjacent line signals the device outputs during each even-numbered field period. As a result, it is unnecessary use switches for switching the two adjacent lines signals output by the device during each odd-numbered field period.

Figure 4:
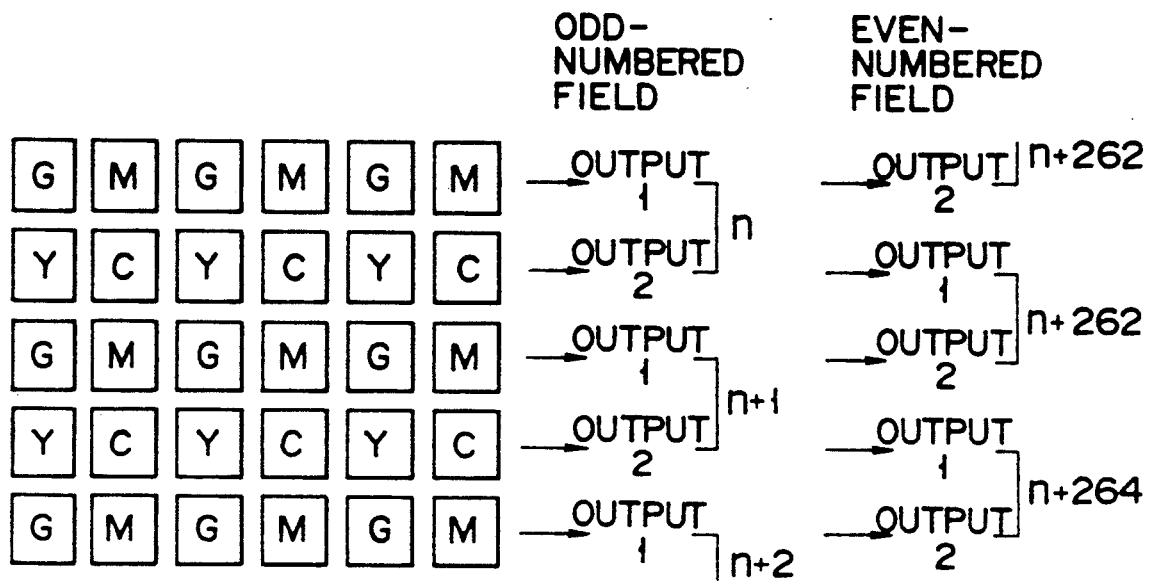
FIG. 4 is a diagram representing the relation between the color signals the two-line reading type device outputs during the even-numbered and odd-numbered field periods, and the output lines through which these color signals are output.
Figure 5:
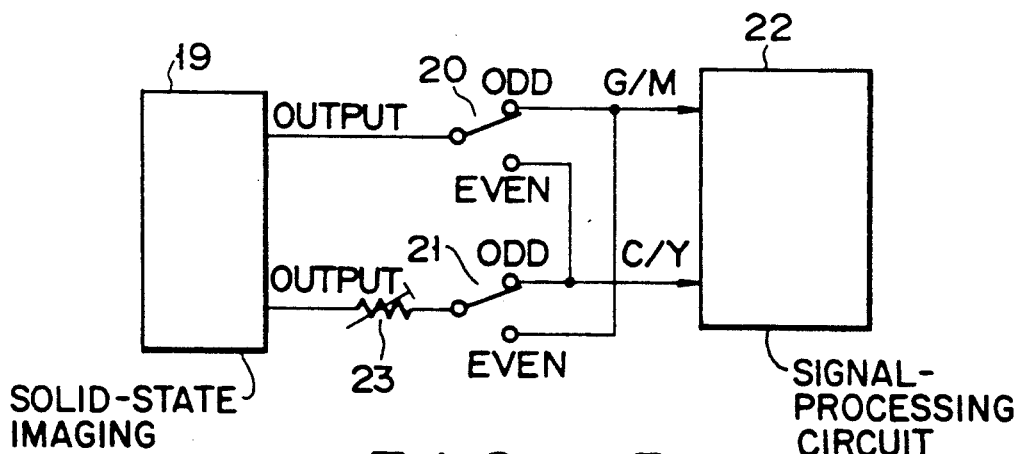
FIG. 5 is a block diagram showing a system including the two-line reading type device, and explaining why field-changeover switches are required to supply signals which can be properly processed by a signal-processing circuit.
Figure 9:
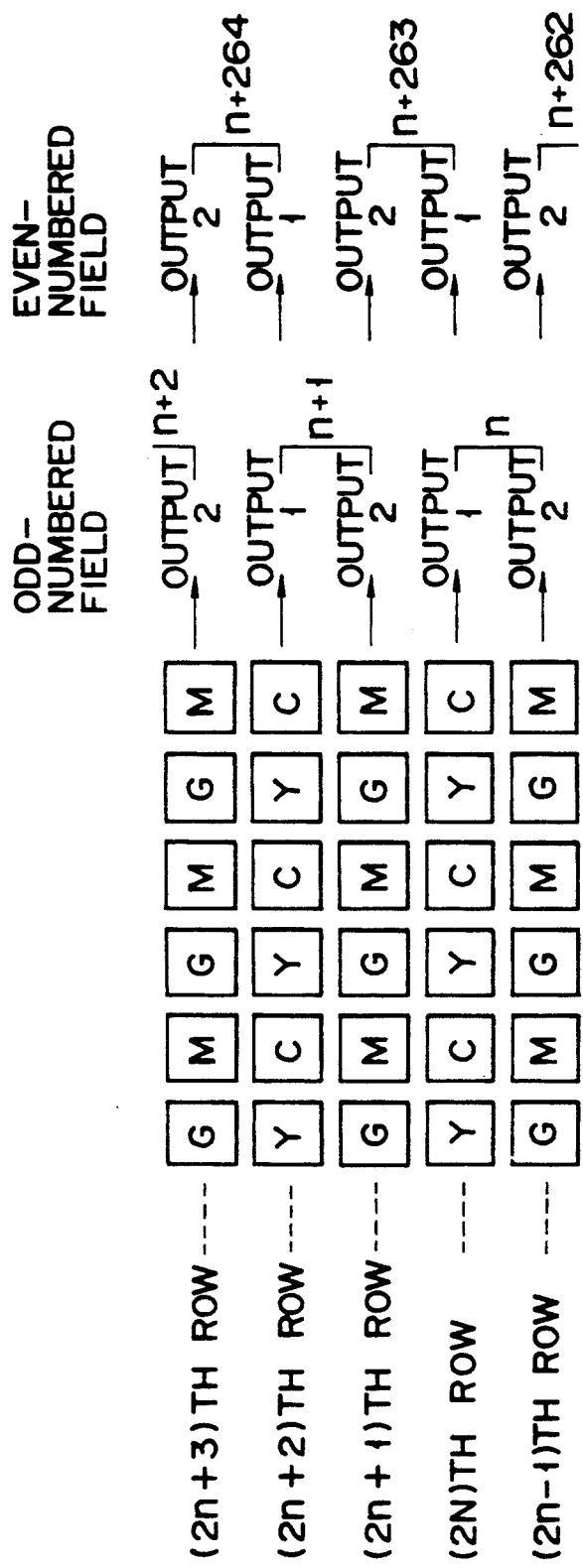
FIG. 9 is a diagram illustrating the relation between the color signals which the two-line reading type device outputs during the even-numbered and odd-numbered field periods while it is being driven by the first method of the invention, on the one hand, and the output lines through which these color signals are output, on the other hand.

FIG. 9 is a diagram illustrating the relation between the color signals which the two-line reading type device outputs during the even-numbered and odd-numbered field periods, on the one hand, and the output lines through which these color signals are output, on the other hand. As can be clearly understood from FIG. 9, any two adjacent line signals 1 and 2 output during each odd-numbered field period are in the same position as the corresponding two adjacent line signals output during each even-numbered field period. By contrast, as is shown in FIG. 4, any two adjacent line signals 1 and 2 output during each odd-numbered field period are reversed in position with respect to the corresponding two adjacent line signals output during each even-numbered field period, when the solid-state imaging device is driven by the conventional method.

Figure 2B:
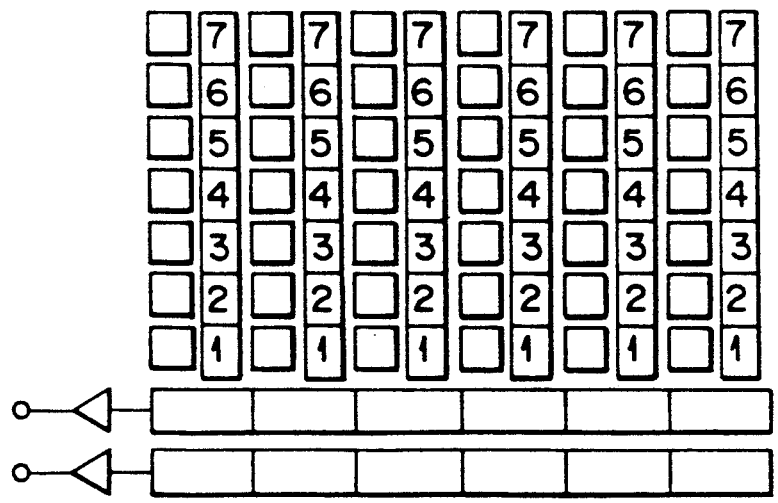
Figure 2C:
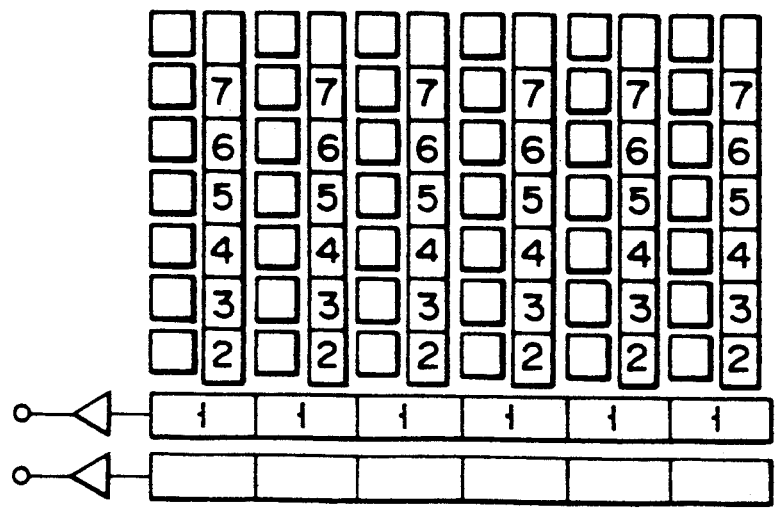
Figure 2D:
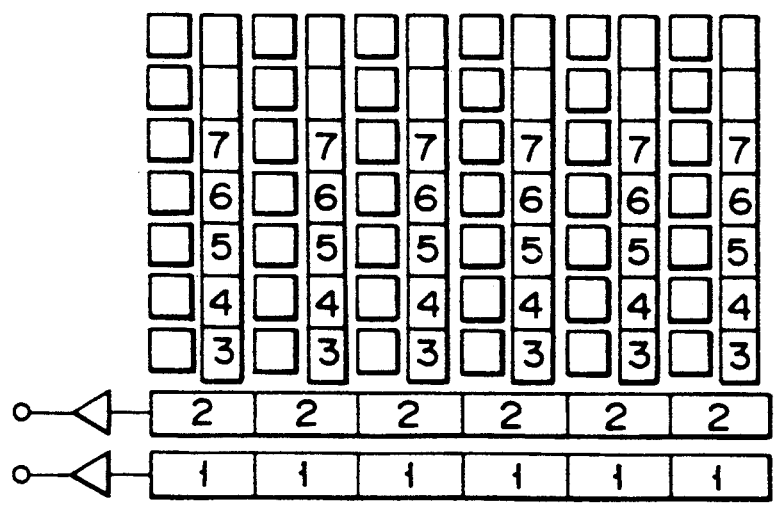
Figure 3A:
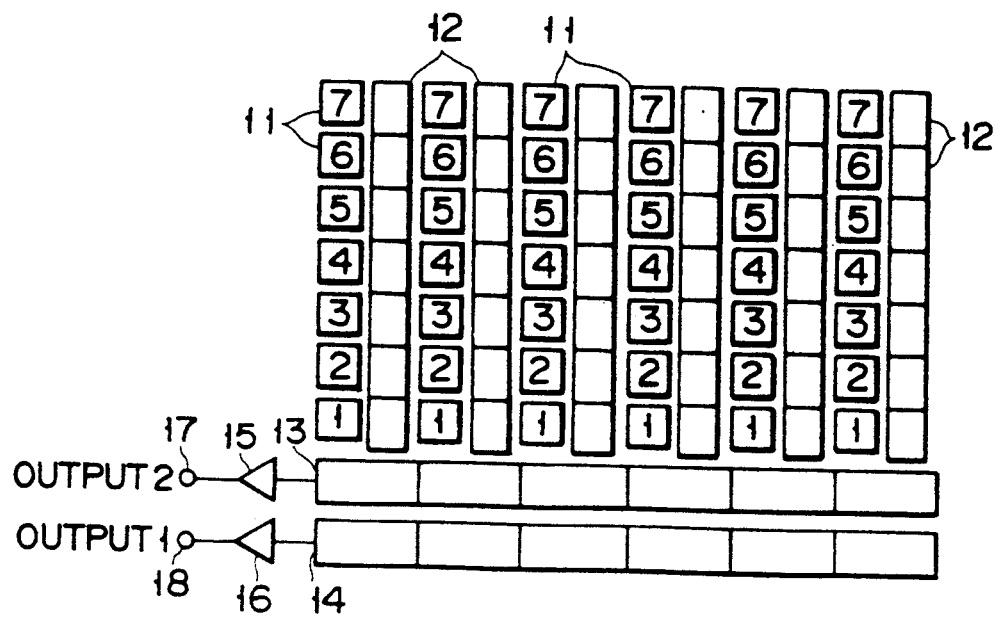
FIGS. 3A to 3D are diagrams explaining how the two-line reading type device is driven during the period of each odd-numbered field.
Figure 3B:
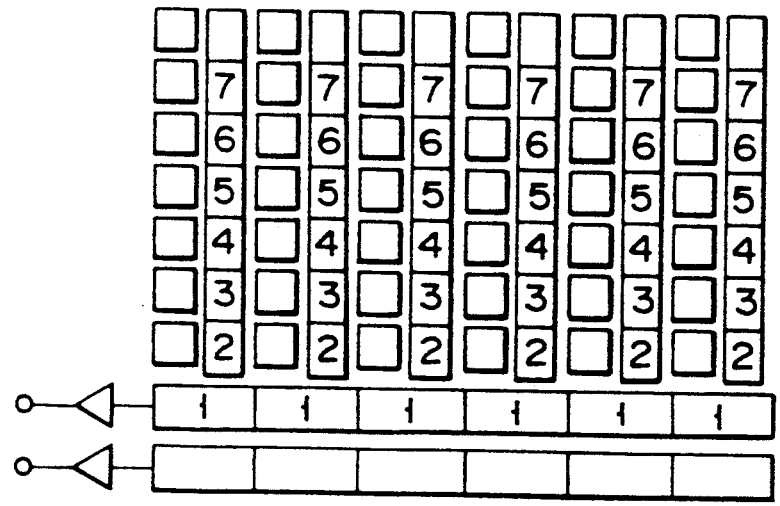
Figure 3C:
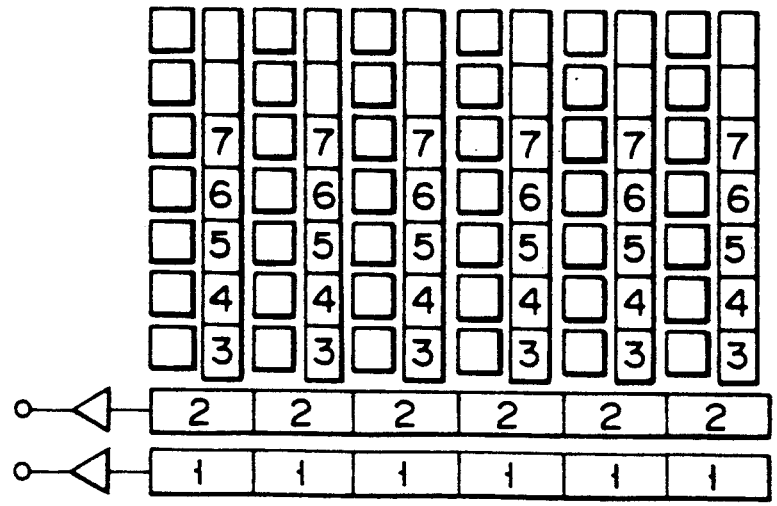
Figure 3D:
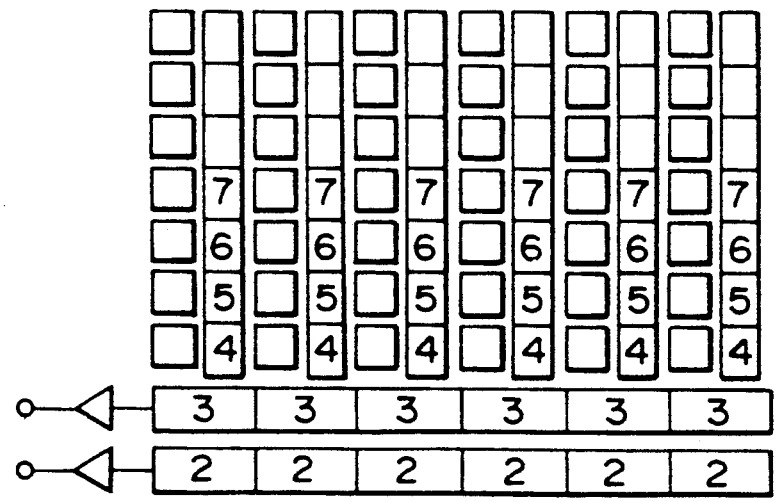

The method described above can be used to drive not only a solid-state imaging device having a color-filter array of the type shown in FIGS. 2B, but also solid-state imaging devices having color-filter arrays of any other two-pixel periodic types shown in FIGS. 10A, 10B, and 10C, wherein two filters of different colors are alternately arranged in the vertical direction.

Figure 11:
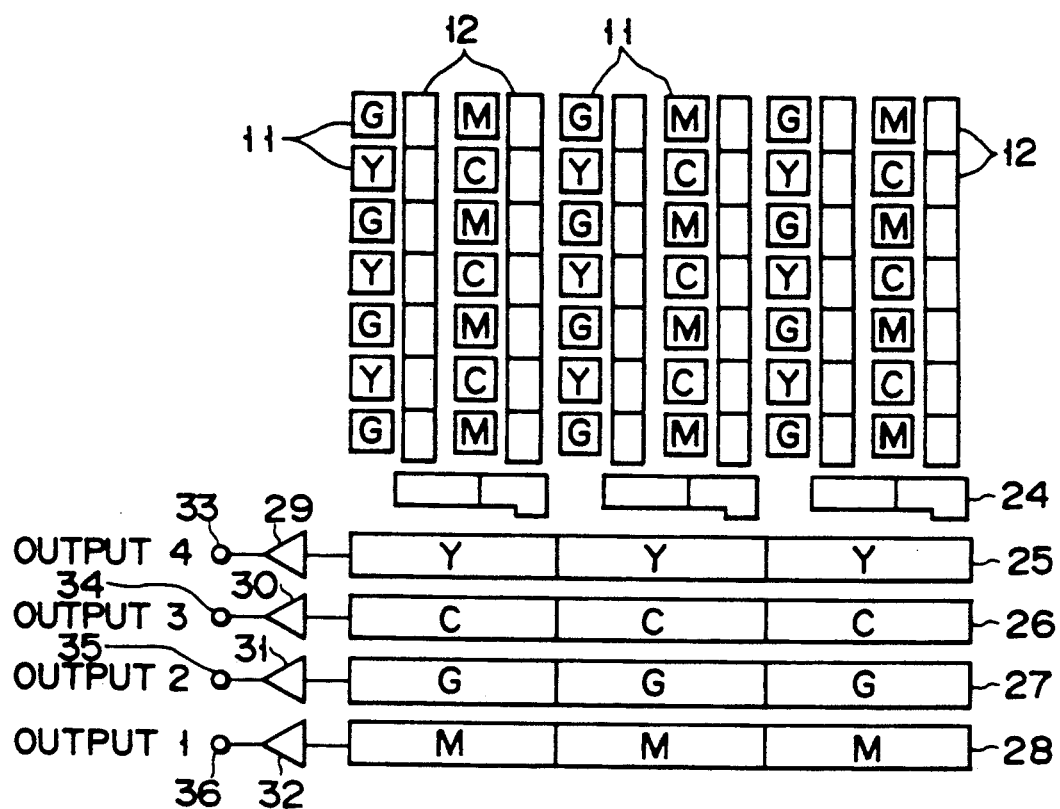
FIG. 11 is a diagram explaining a modification of the first method of the invention.

FIG. 11 is a diagram explaining a modification of the method of the invention, explained above. More precisely, the figure shows a solid-state imaging device which is identical to the device shown in FIG. 6A, except that it has a color-filter array, parallel-to-serial conversion units 24, four horizontal transfer registers 25 to 28, four detectors 29 to 32, and four output terminals 33 to 36. The color-filter array is covering the elements 11, respectively. The parallel-to-serial conversion units 24 are spaced apart in the horizontal direction, each assigned to two adjacent columns of stages 12.

Each of the serial-to-parallel conversion units 24 receives the pixel charges from the associated two columns of stages 12 and converts them to serial pixel charges. The register 25 transfers the pixel charges generated by the elements 11 covered by yellow filters; the register 26 transfers the pixel charges generated by the elements 11 covered by cyan filters; the register 27 transfers the pixel charges generated by the elements 11 covered by green filters; and the register 28 transfers the pixel charges generated by the elements 11 covered by magenta filters. Hence, each line signal, which the device will output, represent pixels of the same color. The detector 29 converts the serial pixel charges output by the register 25, into a yellow line signal; the detector 30 converts the serial pixel charges output by the register 26, into a cyan line signal; the detector 31 converts the serial pixel charges output by the register 27, into a green line signal; and the detector 32 converts the serial pixel charges output by the register 28, into a magenta line signal.

In the modified method, too, during the period of each odd-numbered field, the pixel charges accumulated in the photoelectric converting elements 11 of each odd-numbered row jump over the pixel charges accumulated in the elements 11 of the immediately preceding even-numbered row. As a result, any four adjacent line signals 1 to 4 output from the terminals 36 to 33 during each odd-numbered field period are in the same position as the corresponding four adjacent line signals 1 to 4 output from the terminals 36 to 33 during each even-numbered field period.

A matrix circuit (not shown) combines the four line signals 1 to 4 output by the solid-state imaging device, thereby generating signals representing three primary colors, i.e., red, green, and blue. The modified method, explained with reference to FIG. 11, is therefore more advantageous than the first method explained with reference to FIGS. 6A-6D, FIG. 7, and FIGS. 8A ∝ 8D.

A second method of driving a solid-state imaging device, according to the present invention, will now be described with reference to FIGS. 12A-12E and FIGS. 13A-13F.

Figure 12A:
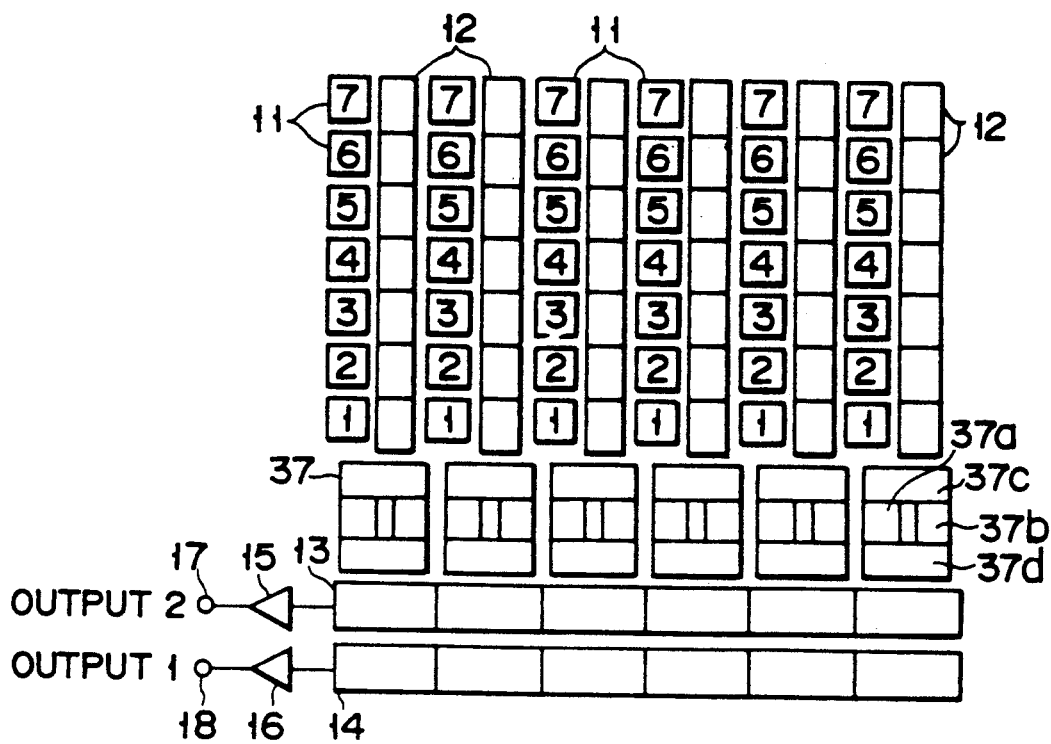
FIGS. 12A to 12E are diagrams explaining how a solid-state imaging device of the two-line reading type is driven during the period of each even-numbered field by a second method according to the present invention.

FIG. 12A shows a solid-state imaging device similar to the device shown in FIG. 6A, and the same components are designated at the same reference numerals as in FIG. 6A. The device, however, is different in that cyclic transfer register 37 are provided in association with columns of charge-transferring stages 12, respectively. Each cyclic transfer register 37 is comprised two charge-accumulating sections 37a an 37b and two charge-transferring sections 37c and 37d. Either charge-transferring section is designed to transfer a pixel charge between the charge-accumulating sections 37a and 37b. A solid-state imaging device having similar cyclic transfer register is disclosed in U.S. Pat. No. 4,897,728.

The pixel charges are transferred from the columns of charge-transferring stages 12 to the cyclic transfer registers 37, respectively. In each cyclic transfer register 37, the section 37c transfers the pixel charge to the section 37a. The charge accumulated in the section 37a is then transferred via the section 37d to the horizon-tal transfer register 13. If necessary, the same charge can be transferred via the section 37d to the charge-accumulating section 37b, and then via the section 37c to the charge-accumulating section 37a.

Figure 12B:
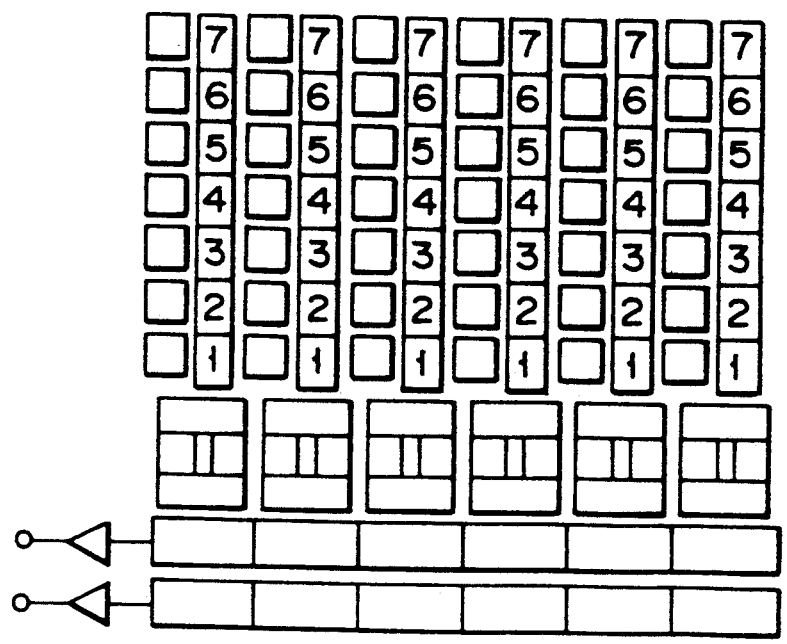

During the period of each even-numbered field, the imaging device is driven in the following way. First, all photoelectric converting elements 11 are driven, whereby the pixel charges 1 to 7 accumulated in the elements 11 are simultaneously transferred to the charge-transferring stages 12 as is shown in FIG. 12B.

Figure 12C:
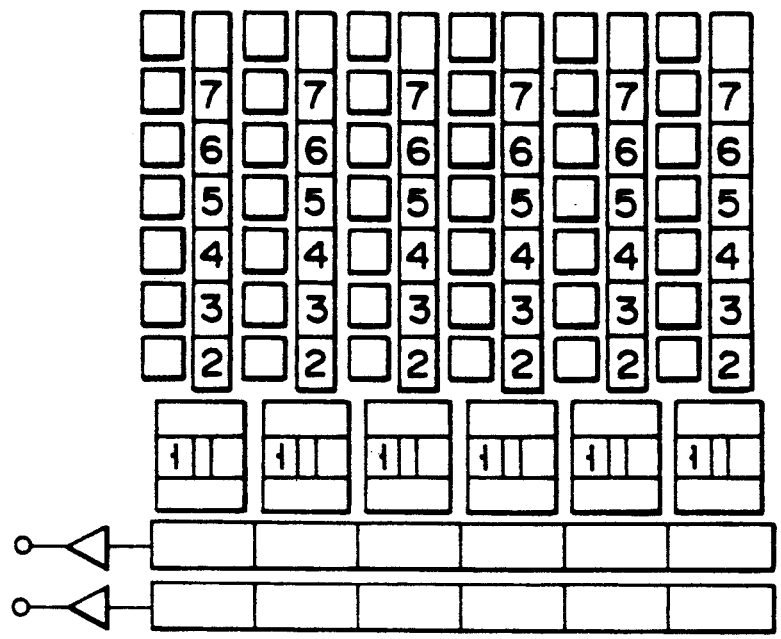
Figure 12D:
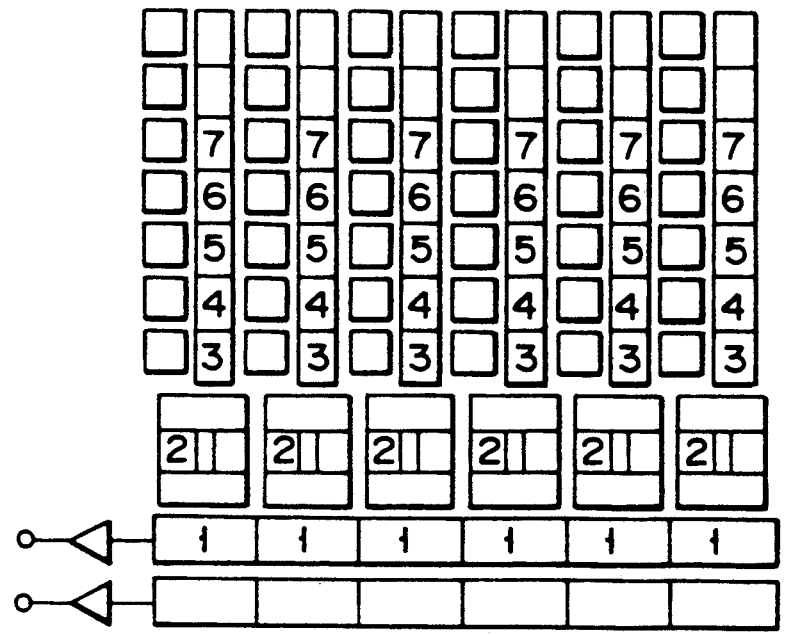
Figure 12E:
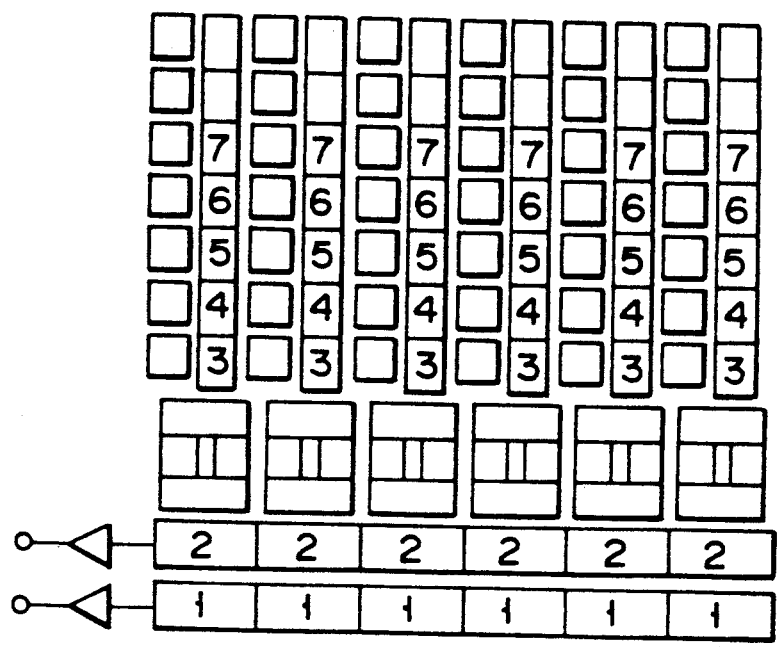

Then, as is shown in FIG. 12C, the line charges 2 to 7 in the second to seventh rows of stages 12 are transferred to the first to sixth rows of elements 12, while the pixel charges 1 in the elements 12 of the first (i.e., lower-most) row are transferred to the charge-accumulating sections 37a of the cyclic transfer registers 37, respectively. Next, as is evident from FIG. 12D, the line charges 3 to 7 in the second to sixth rows of stages 12 are transferred to the first to fifth rows, respectively. At the same time, the pixel charges 2 in the stages 12 of the first row are transferred to the charge-accumulating sections 37a, respectively, and the charges 1 in the sections 37a are transferred to the horizontal transfer register 13. Thereafter, as is shown in FIG. 12E, the pixel charges 2 in the sections 37a are transferred to the horizontal transfer register 3, while the pixel charges 1 in the register 13 are transferred to the horizontal transfer register 14. At this time, the pixel charges 3 to 7 in the first to fifth rows of stages 12 are not transferred at all. The horizontal transfer registers 13 and 14 output two line charges 2 and 1 to the detectors 15 and 16, respectively. The detectors 15 and 16 converts the line charges 2 and 1 into two line signals, which are output from the terminals 17 and 18 in the form of outputs 2 and 1, respectively.

The sequence of operations, described in the preceding paragraph is repeated in the rest of the even-numbered field period, whereby the solid-state imaging device outputs line signals, each time an output 1 from the terminal 18 and an output 2 from the terminal 17.

During the period of each odd-numbered field, the imaging device is driven in the following way. First, all photoelectric converting elements 11 and all charge-transferring stages 12 are driven. As a result, as is shown in FIG. 13B, the pixel charges 1 to 7 accumulated in the elements 11 are simultaneously transferred to the charge-transferring stages 12, and then the line charges 2 to 7 in the second to seventh rows of elements 12 are transferred to the first to sixth rows of elements 12, while the pixel charges 1 in the stages 12 of the first row are transferred to the charge-accumulating section 37a.

Figure 13C:
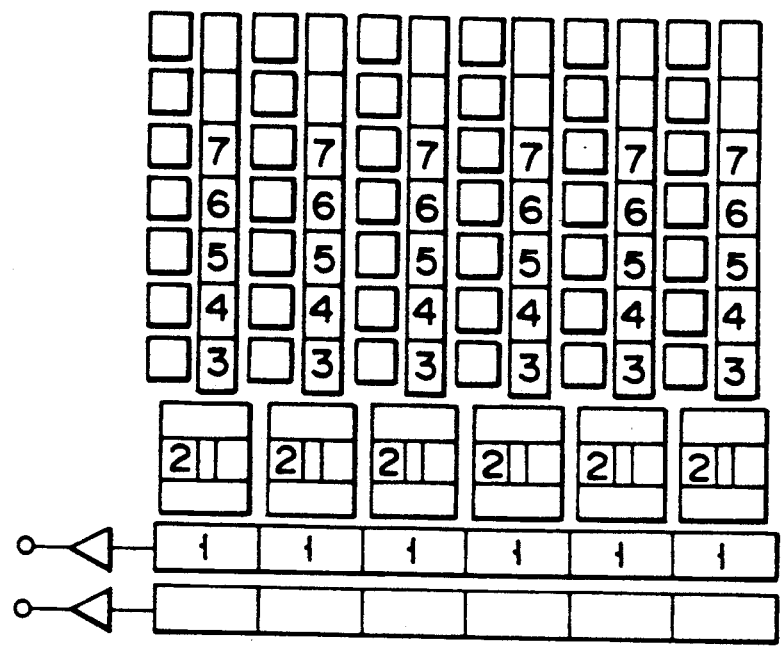
Figure 13D:
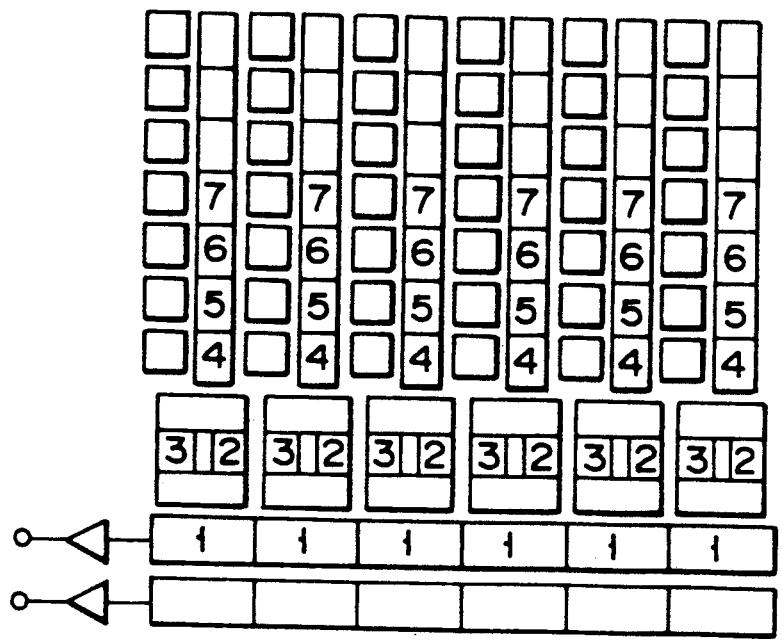
Figure 13E:
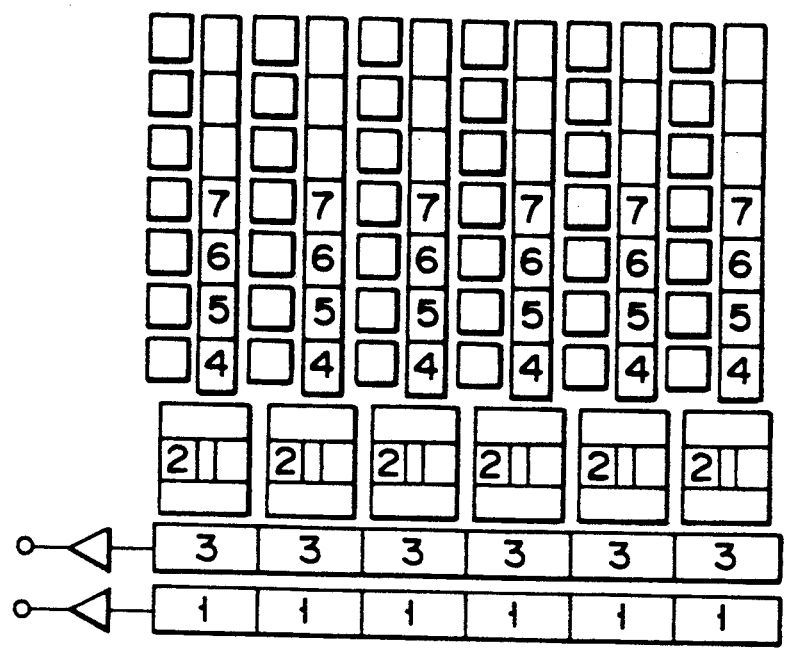
Figure 13F:
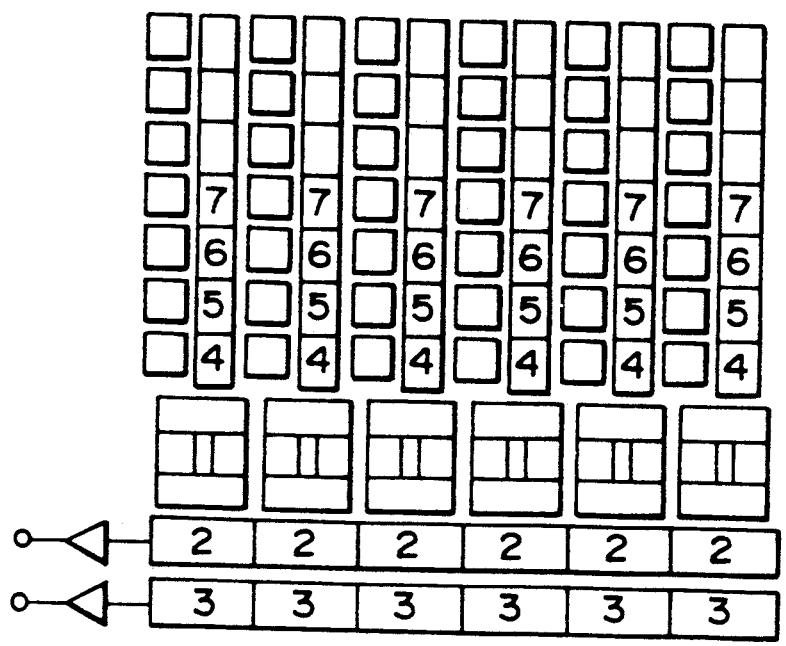

Next, as is shown in FIG. 13C, the line charges 3 to 7 in the second to sixth rows of stages 12 are transferred to the first to fifth rows, respectively. At the same time, the pixel charges 2 in the stages 12 of the first row are transferred to the charge-accumulating sections 37a, respectively, whereas the charges 1 in the sections 37a are transferred to the horizontal transfer register 13. Thereafter, as is shown in FIG. 13D, the line charges 4 to 7 in the second to fifth rows of stages 12 are transferred to the first to fourth rows, respectively. At the same time, the pixel charges 3 in the stages 12 of the first row are transferred to the charge-accumulating sections 37a, respectively, whereas the pixel charges 2 in the sections 37a are transferred to the charge-accumulating sections 37b through the chargetransferring sections 37d. Then, as can be understood from FIG. 12E, the line charge 1 is transferred from the horizontal transfer register 13 to the horizontal transfer register 14. Meanwhile, the line charge 2 is transferred from the section 37b to the section 37a via the sections 37c, whereas the line charge 3 in the section 37a is transferred via the section 37d to the horizontal transfer register 13. At this time, the line charge 3, originally accumulated in the third row of photoelectric converting elements 11, jumps over the line charge 2 originally accumulated in the second row of elements 11. Next, as is evident from FIG. 13F, the line charge 1 is discarded from the register 14 to accomplish interlacing, and the pixel charges 2 in the sections 37a are transferred to the horizontal transfer register 13, while the pixel charges 3 in the register 13 are transferred to the horizontal transfer register 14. At this time, the pixel charges 4 to 7 in the first to fourth rows of elements 12 are not transferred at all. The horizontal transfer stages 13 and 14 output the line charges 2 and 3 to the detectors 15 and 16, respectively. The detectors 15 and 16 converts the line charges 2 and 3 into two line signals, which are output from the terminals 17 and 18 in the form of outputs 2 and 1, respectively.

The sequence of operations, described in the preceding paragraph is repeated in the rest of the odd-numbered field period, whereby the solid-state imaging device outputs line signals, each time an output 1 from the terminal 18 and an output 2 from the terminal 17.

As has been explained with reference to FIGS. 11, 12A-12E, and 13A-13F, during each odd-numbered field period, the cyclic transfer registers 37, each connected between the lowermost of the stages 12 of the associated column and the associated charge-transfer element of the horizontal transfer register 13, transfer pixel charges such that the line charge originally accumulated in any odd-numbered row of photoelectric converting elements 11 jumps over the line charge originally accumulated in the immediately preceding even-numbered row of elements 11. Hence, two adjacent line signals the imaging device outputs during each odd-numbered field period are in the same position as the two adjacent line signals the device outputs during each even-numbered field period. As a result, it is unnecessary use switches for switching the two adjacent lines signals output by the device during each odd-numbered field period.

FIG. 14 is a diagram explaining a modification of the second method of the invention, which has been described with reference to FIGS. 11, 12A-12E, and 13A-13F. More precisely, the figure shows a solid-state imaging device which is identical in structure to the device shown in FIG. 12A, except that parallel-to-serial conversion units 38, and four horizontal transfer registers 39 to 42, four detectors 43 to 46, and four output terminals 47 to 50. The color filters cover the photoelectric converting elements 11, respectively. The units 38 are spaced part in horizontal direction, each assigned to two adjacent columns of elements 12.

Each of the serial-to-parallel conversion units 38 receives the pixel charges from the associated two cyclic transfer registers 37 and converts them to serial pixel charges. The registers 37 are identical to, and hence perform the same function as, those used in the device shown in FIG. 12A. The register 39 transfers the pixel charges generated by the elements 11 covered by yellow filters; the register 40 transfers the pixel charges generated by the elements 11 covered by cyan filters; the register 41 transfers the pixel charges generated by the elements 11 covered by green filters; and the register 42 transfers the pixel charges generated by the elements 11 covered by magenta filters. Hence, each line signal, which the device will output, represent pixels of the same color. The detector 43 converts the serial pixel charges output by the register 39, into a yellow line signal; the detector 44 converts the serial pixel charges output by the register 40, into a cyan line signal; the detector 45 converts the serial pixel charges output by the register 41, into a green line signal; and the detector 46 converts the serial pixel charges output by the register 42, into a magenta line signal.

In the modified method, too, during the period of each odd-numbered field, the pixel charges accumulated in the photoelectric converting elements 11 of each odd-numbered row jump over the pixel charges accumulated in the elements 11 of the immediately preceding even-numbered row. As a result, any four adjacent line signals 1 to 4 output from the terminals 50 to 47 during each odd-numbered field period are in the same position as the corresponding four adjacent line signals 1 to 4 output from the terminals 50 to 47 during each even-numbered field period.

A matrix circuit (not shown) combines the four line signals 1 to 4 output by the solid-state imaging device, thereby generating signals representing three primary colors, i.e., red, green, and blue. The modified method, explained with reference to FIG. 11, is therefore more advantageous than the second method explained with reference to FIGS. 12A-12E and 13A-16F.

A third method of driving a solid-state imaging device, according to the present invention, will now be described with reference to FIGS. 15A-15D and FIGS. 16A-16E.

Figure 15A:
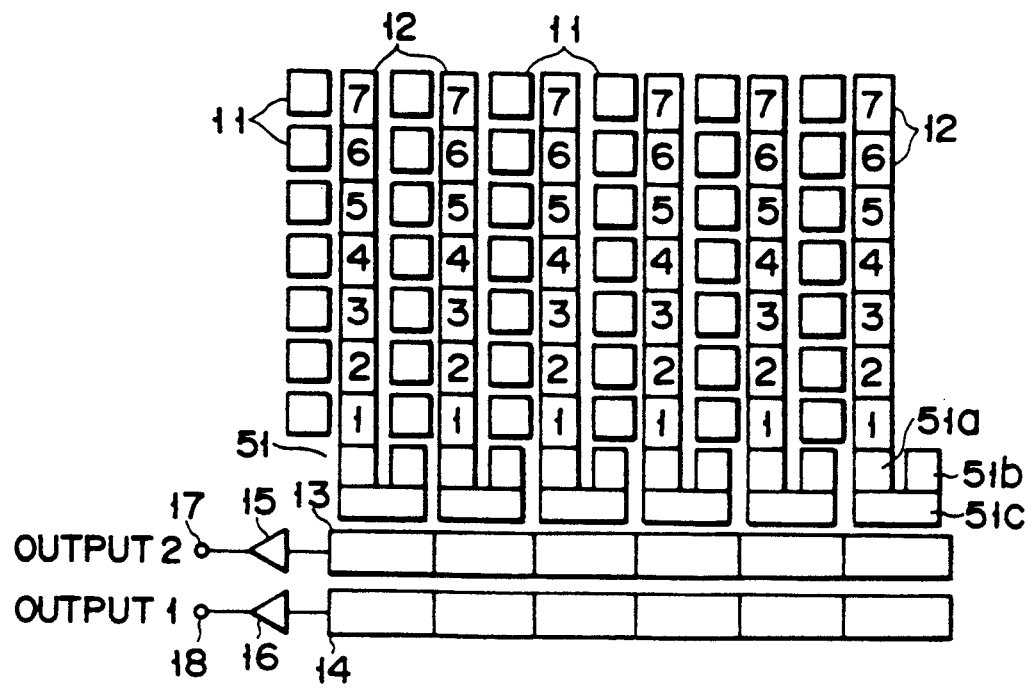
FIGS. 15A to 15D are diagrams explaining how a solid-state imagin device of the two-line reading type is driven during the period of each even-numbered field by a third method according to the present invention.

FIG. 15A shows a solid-state imaging device similar to the device shown in FIG. 6A, and the same components are designated at the same reference numerals as in FIG. 6A. The device, however, is different in that six U-shaped transfer registers 51 are provided in association with six columns of charge-transferring stages 12. Each U-shaped transfer register 51 is comprised two charge-accumulating sections 51a an 51b and one charge-transferring section 51c. The section 51c is designed to transfer a pixel charge from the section 51a to section 51b.

The pixel charges are transferred from the columns of charge-transferring stages 12 to the U-shaped transfer registers 51, respectively. In each U-shaped transfer register 51, the pixel charge in the section 51a can be transferred via the section 51c, either to the section 51b or to the associated charge-transferring element of the horizontal transfer stage 13. Further, the pixel charge accumulated in the section 51b can be transferred via the section 51c to the associated charge-transferring element of the horizontal transfer register 13.

During the period of each even-numbered field, the imaging device is driven in the following way. First, all photoelectric converting elements 11 are driven, whereby the pixel charges 1 to 7 accumulated in the elements 11 are simultaneously transferred to the charge-transferring stages 12 as is shown in FIG. 15A.

Figure 15B:
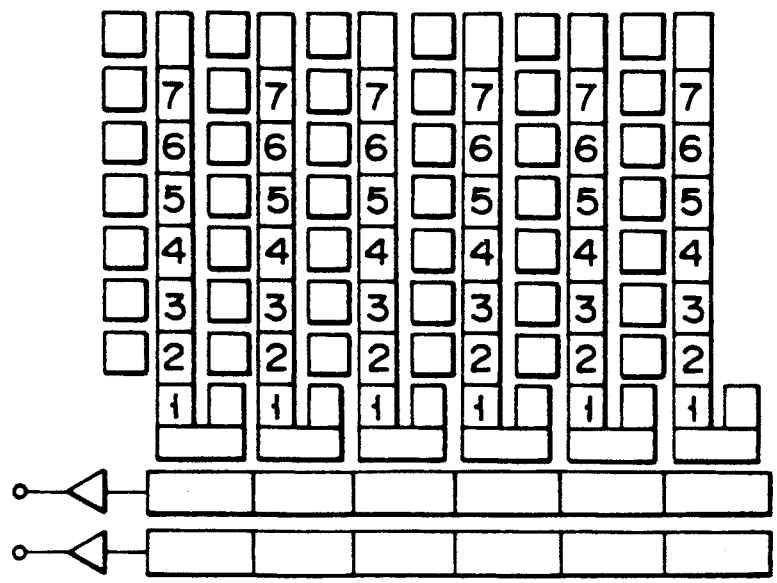
Figure 15C:
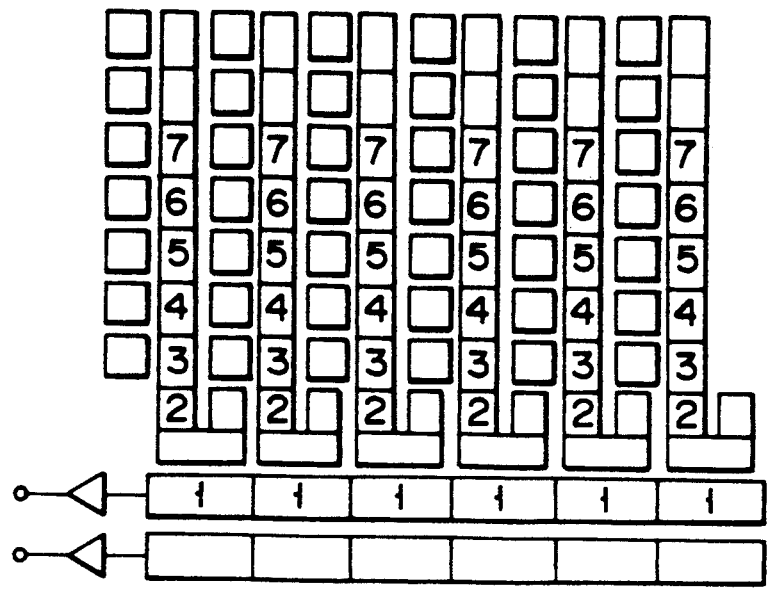
Figure 15D:
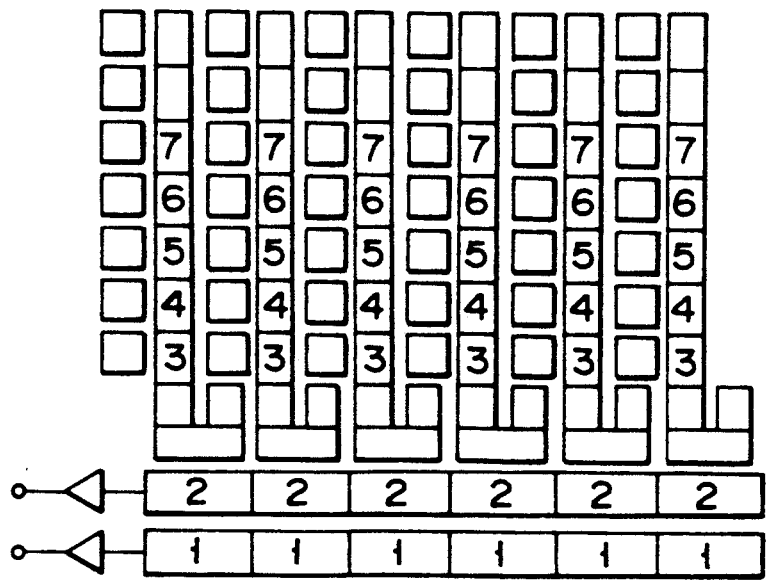

Then, as is shown in FIG. 15B, the line charges 2 to 7 in the second to seventh rows of stages 12 are transferred to the first to sixth rows of stages 12, while the pixel charges 1 in the stages 12 of the first (i.e., lowermost) row are transferred to the charge-accumulating sections 51a of the U-shaped transfer stages 51, respectively. Next, as is evident from FIG. 15C, the line charges 3 to 7 in the second to sixth rows of stages 12 are transferred to the first to fifth rows, respectively. At the same time, the pixel charges 2 in the stages 12 of the first row are transferred to the charge-accumulating sections 51a, respectively, and the charges 1 in the sections 51a are transferred to the horizontal transfer register 13. Thereafter, as is shown in FIG. 15D, the pixel charges 2 in the sections 51a are transferred to the horizontal transfer stage 13, while the pixel charges 1 in the register 13 are transferred to the horizontal transfer register 14. At this time, the pixel charges 3 to 7 in the first to fifth rows of elements 12 are not transferred at all. The horizontal transfer stages 13 and 14 output two line charges 2 and 1 to the detectors 15 and 16, respectively. The detectors 15 and 16 converts the line charges 2 and 1 into two line signals, which are output from the terminals 17 and 18 in the form of outputs 2 and 1, respectively.

The sequence of operations, described in the preceding paragraph is repeated in the rest of the even-numbered field period, whereby the solid-state imaging device outputs line signals, each time an output 1 from the terminal 18 and an output 2 from the terminal 17.

During the period of each odd-numbered field, the imaging device is driven in the following way. First, all photoelectric converting elements 11 and all charge-transferring stages 12 are driven. As a result, as is shown in FIG. 16A, the pixel charges 1 to 7 accumulated in the elements 11 are simultaneously transferred to the charge-transferring stages 12, and then the line charges 2 to 7 in the second to seventh rows of stages 12 are transferred to the first to sixth rows of stages 12, while the pixel charges 1 in the stages 12 of the first row are transferred to the charge-accumulating sections 51a.

Figure 16C:
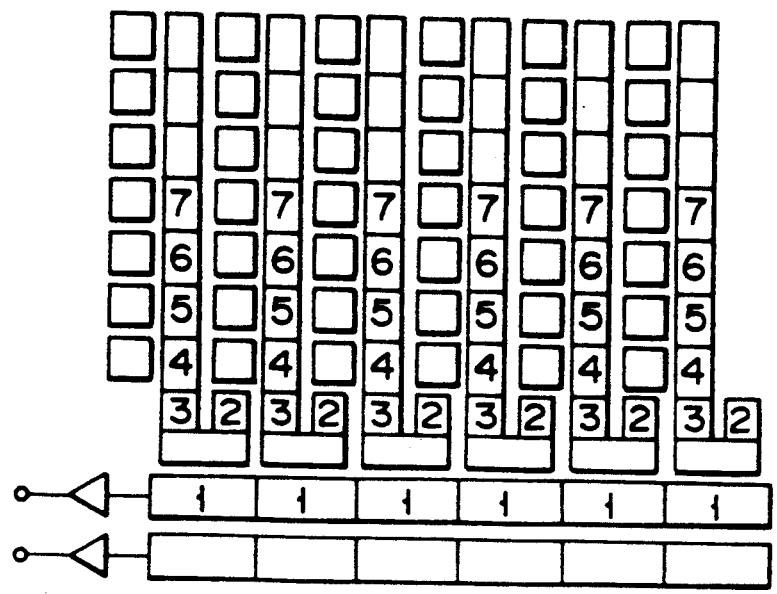
Figure 16D:
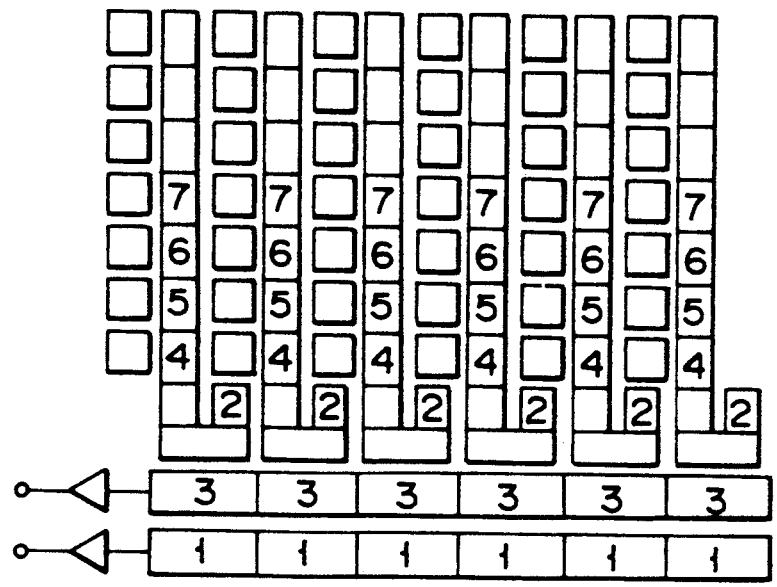
Figure 16E:
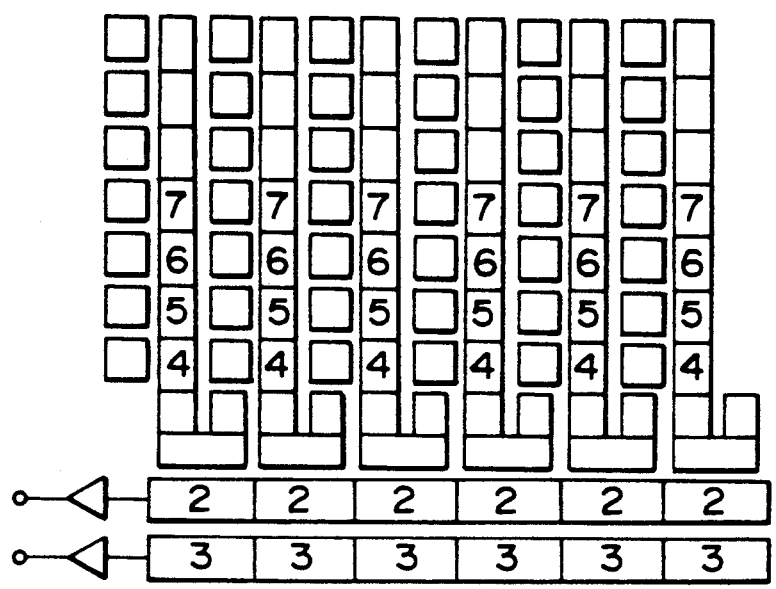

Next, as is shown in FIG. 16B, the line charges 3 to 7 in the second to sixth row of stages 12 are transferred to the first to fifth rows, respectively. At the same time, the pixel charges 2 in the stages 12 of the first row are transferred to the charge-accumulating sections 51a, respectively, whereas the charges 1 in the sections 51a are transferred to the horizontal transfer register 13. Thereafter, as is shown in FIG. 16C, the line charges 4 to 7 in the second to fifth rows of register 12 are transferred to the first to fourth rows, respectively. At the same time, the pixel charges 3 in the stages 12 of the first row are transferred to the charge-accumulating sections 51a, respectively, whereas the pixel charges 2 in the sections 51a are transferred to the charge-accumulating sections 51b through the charge-transferring sections 51c. Then, as can be understood from FIG. 16D, the line charge 1 is transferred from the horizontal transfer stage register 13 to the horizontal transfer register 14, while the line charge 3 is transferred from the section 51a to the horizontal transfer register 13 through the charge-transferring sections 51c. At this time, the line charge 3, originally accumulated in the third row of photoelectric converting elements 11, jumps over the line charge 2 originally accumulated in the second row of elements 11. Next, as is evident from FIG. 16E, the line charge 1 is discarded from the stage 14 to accomplish interlacing, and the pixel charges 2 in the sections 51b are transferred to the horizontal transfer register 13, while the pixel charges 3 in the register 13 are transferred to the horizontal transfer register 14. At this time, the pixel charges 4 to 7 in the first to fourth rows of stages 12 are not transferred at all. The horizontal transfer stages 13 and 14 output the the line charges 2 and 3 to the detectors 15 and 16, respectively. The detectors 15 and 16 converts the line charges 2 and 3 into two line signals, which are output from the terminals 17 and 18 in the form of outputs 2 and 1, respectively.

The sequence of operations, described in the preceding paragraph is repeated in the rest of the odd-number field period, whereby the solid-state imaging device outputs line signals, each time an output 1 from the terminal 18 and an output 2 from the terminal 17.

In the third method, as has been explained with reference to FIGS. 16A-16E, during each odd-numbered field period, the U-shaped transfer registers 51, each connected between the lowermost of the stages 12 of the associated column and the associated charge-transfer stage of the horizontal transfer register 13, transfer pixel charges such that the line charge originally accumulated in any odd-numbered row of photoelectric converting elements 11 jumps over the line charge originally accumulated in any odd-numbered row of photoelectric converting elements 11 jumps over the line charge originally accumulated in the immediately preceding even-numbered row of elements 11. Hence, two adjacent line signals the imaging device outputs during each odd-numbered field period are in the same position as the two adjacent line signals the device outputs during each even-numbered field period. As a result, it is unnecessary use switches for switching the two adjacent lines signals output by the device during each odd-numbered field period.

Figure 17A:
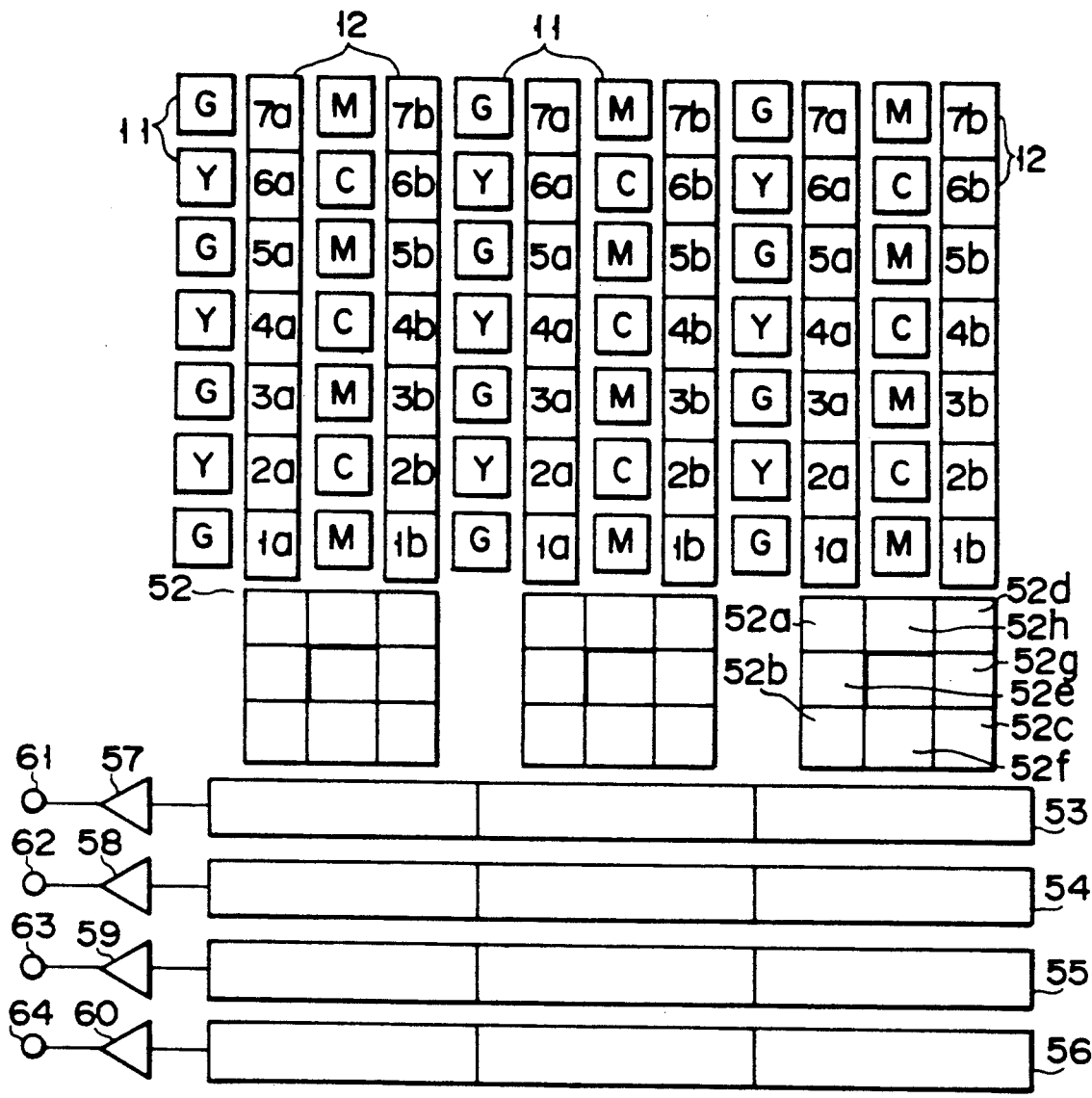

A fourth method of driving a solid-state imaging device, according to the present invention will now be described, with reference to FIGS. 17A to 17I. FIG. 17A shows a solid-state imaging device similar to the device shown in FIG. 6A, and the same components are designated at the same reference numerals as in FIG. 6A. This device, however, is different in that it comprises cyclic transfer registers 52, four horizontal transfer registers 53 to 56, four detectors 57 to 60, and four output terminals 61 to 64. The color filters cover the photoelectric converting elements 11, respectively. The cyclic transfer registers 52 are spaced part in horizontal direction, each assigned to two adjacent columns of elements 12. Each cyclic transfer registers 52 is comprised of four charge-accumulating sections 52a to 52d and two charge-transferring sections 52e to 52h. The sections 52a to 52d and the sections 52e to 52h are alternately arranged, forming a loop. In each cyclic transfer register 52, the charge-accumulating sections 52a and 52b receive two pixel charges transferred from the lowermost stages 12 of the associated two columns, respectively, and each pixel charge is circulated from one charge-accumulating section to the next one through the charge-transferring section connecting these two charge-accumulating sections. The horizontal transfer registers 53 to 56 perform the same function as those shown in FIG. 14. More precisely, the element 53 transfers the pixel charges generated by the elements 11 covered by cyan filters; the register 54 transfers the pixel charges generated by the elements 11 covered by yellow filters; the register 5 transfers the pixel charges generated by the elements 11 covered by magenta filters; and the register 56 transfers the pixel charges generated by the elements 11 covered by green filters. Hence, each line signal, which the device will output, represent pixels of the same color.

During the period of each even-numbered field, the imaging device is driven in the following way. First, all photoelectric converting elements 11 are driven, whereby the pixel charges 1a to 7a accumulated in the elements 11 of each odd-numbered column and the pixel charges 1b to 7b accumulated in the elements 11 of each even-numbered column are simultaneously transferred to the charge-transferring stages 12 as is shown in FIG. 17A.

Figure 17B:
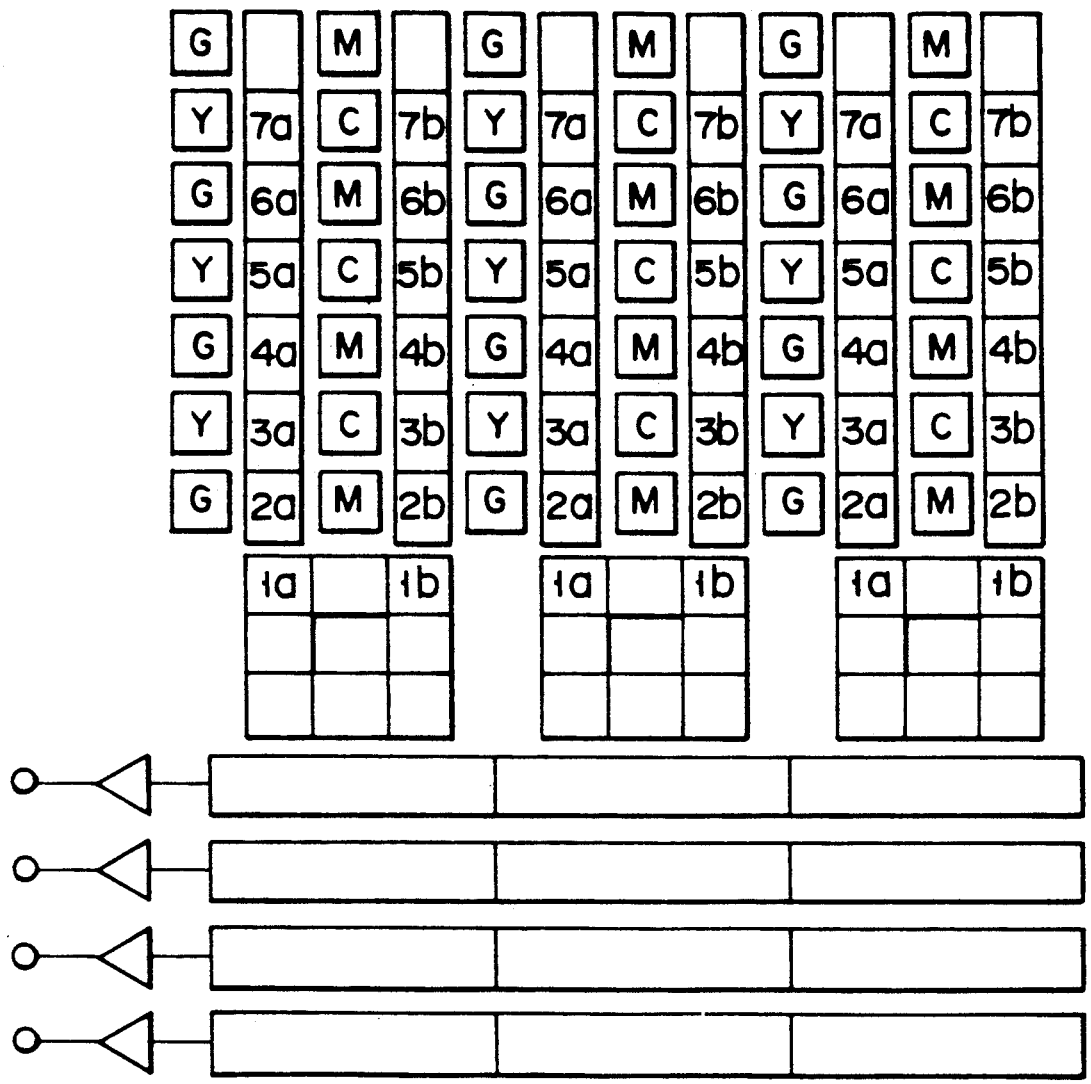
Figure 17C:
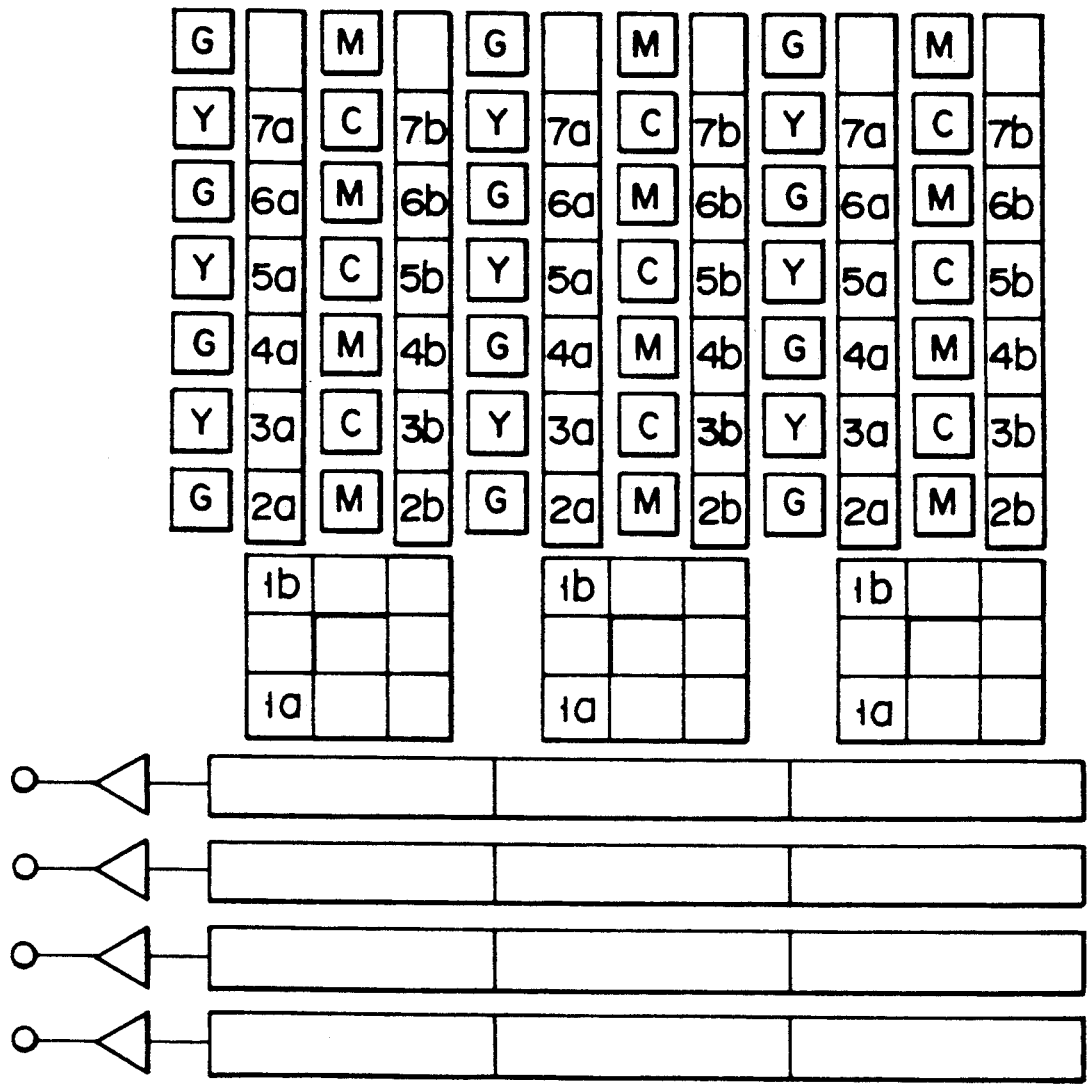
Figure 17D:
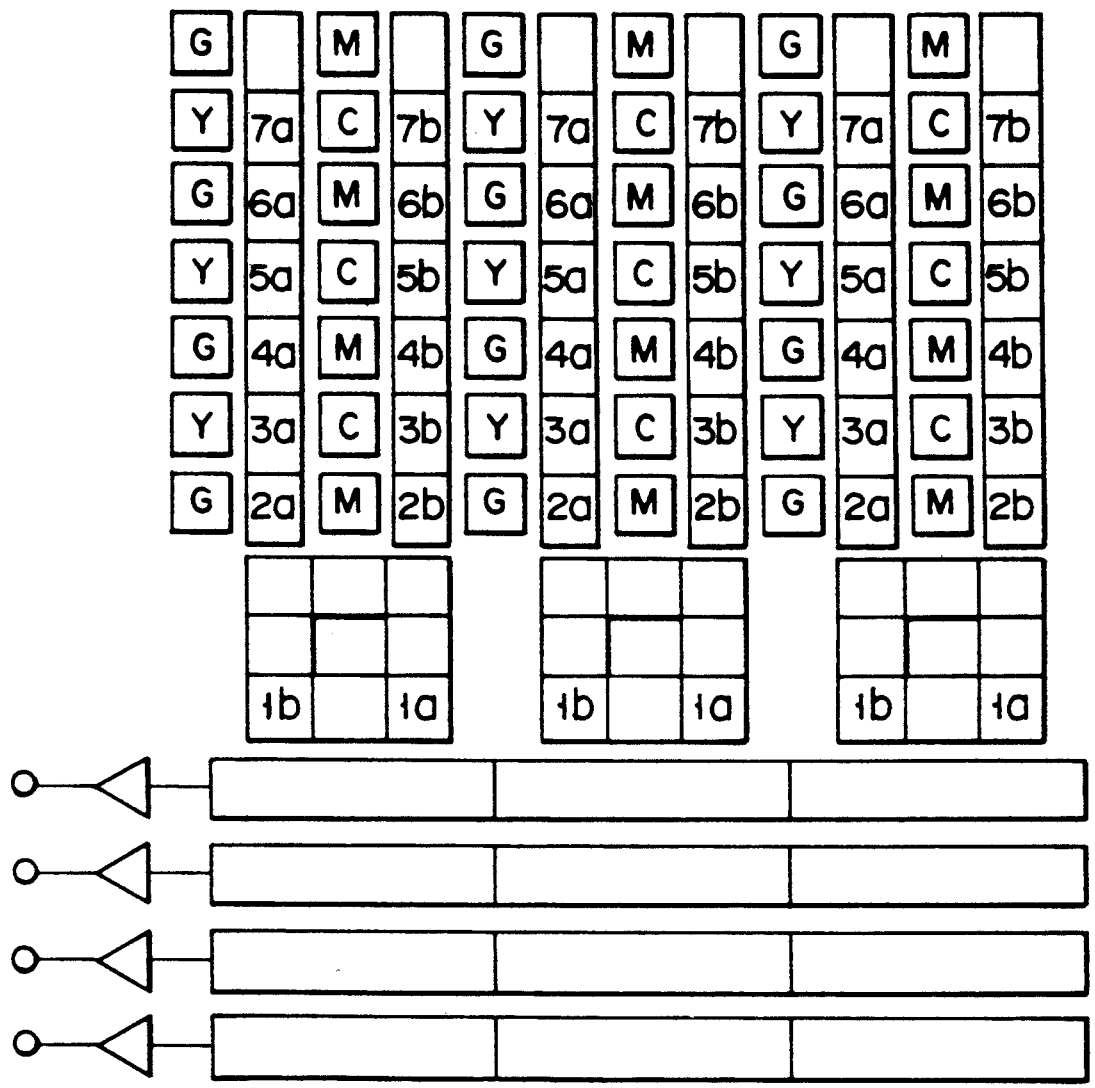
Figure 17E:
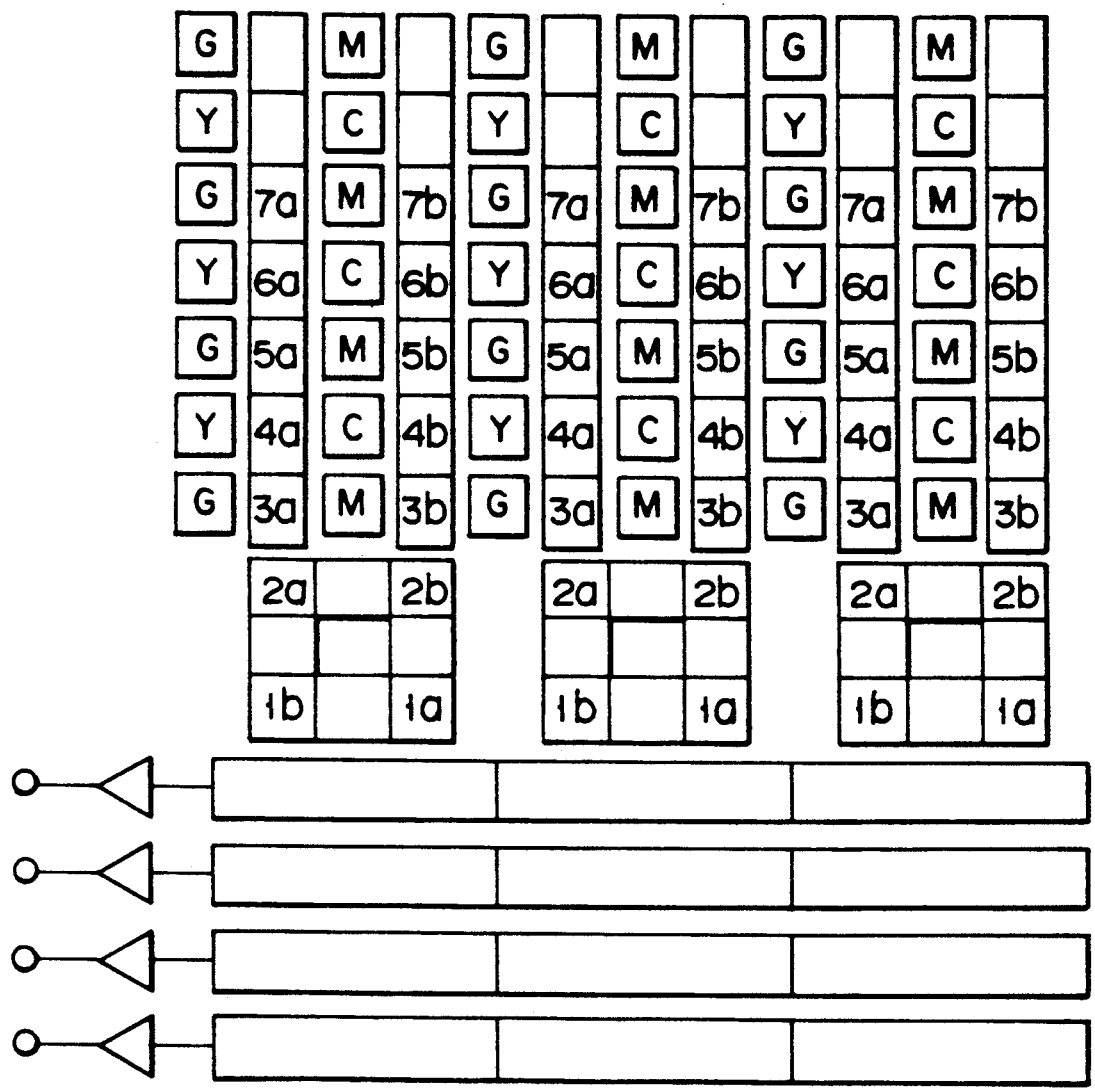
Figure 17F:
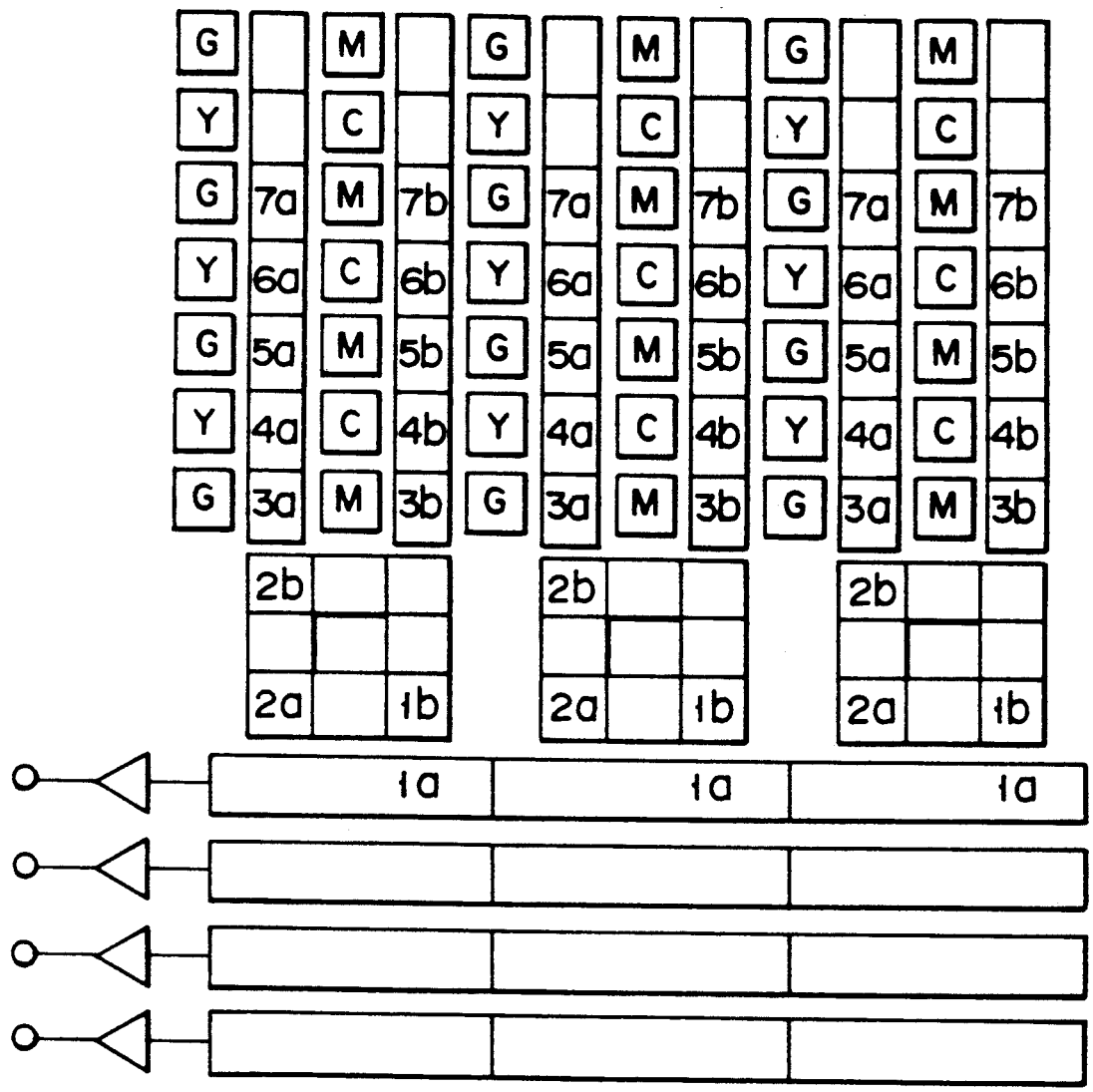
Figure 17G:
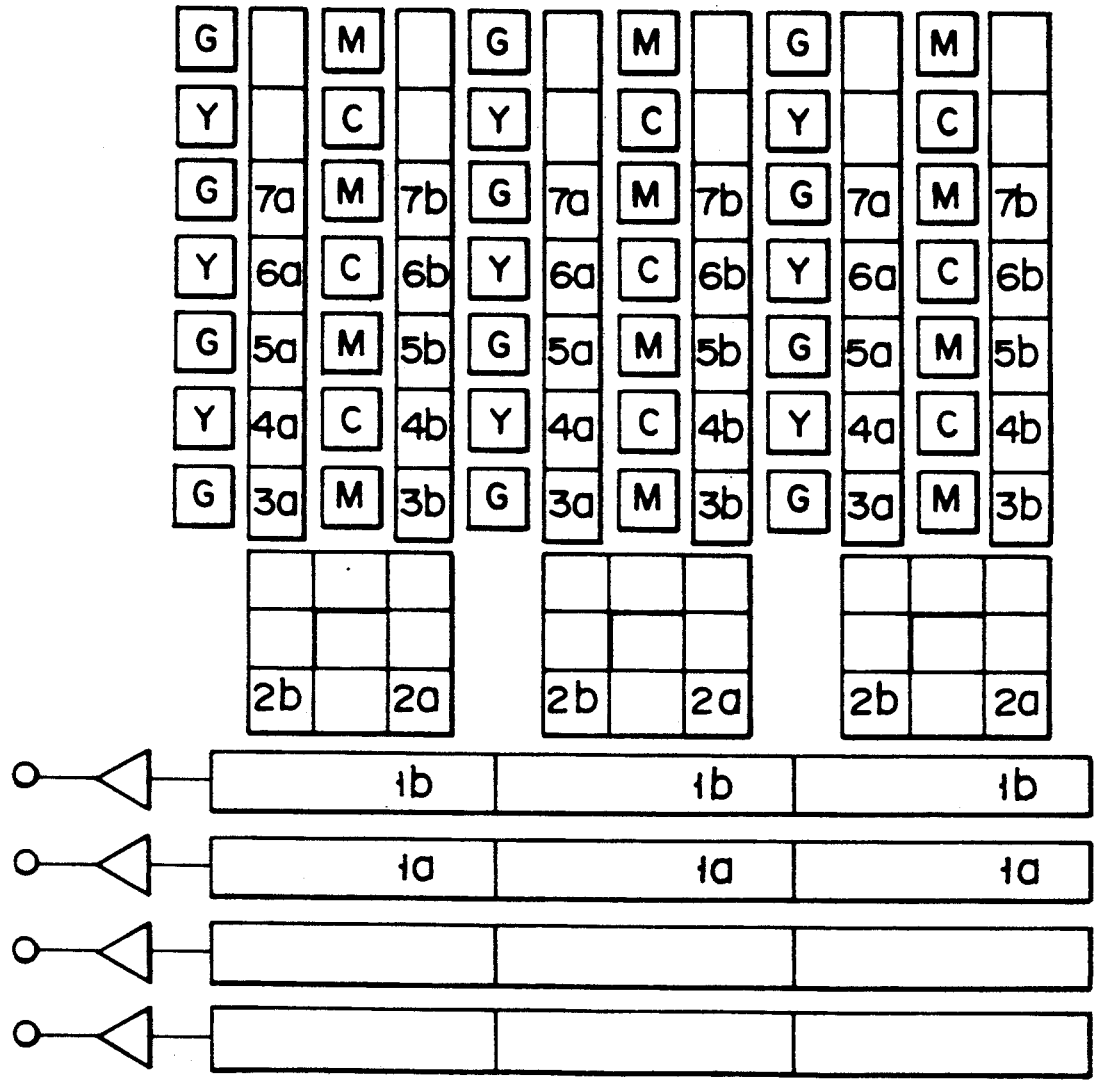
Figure 17H:
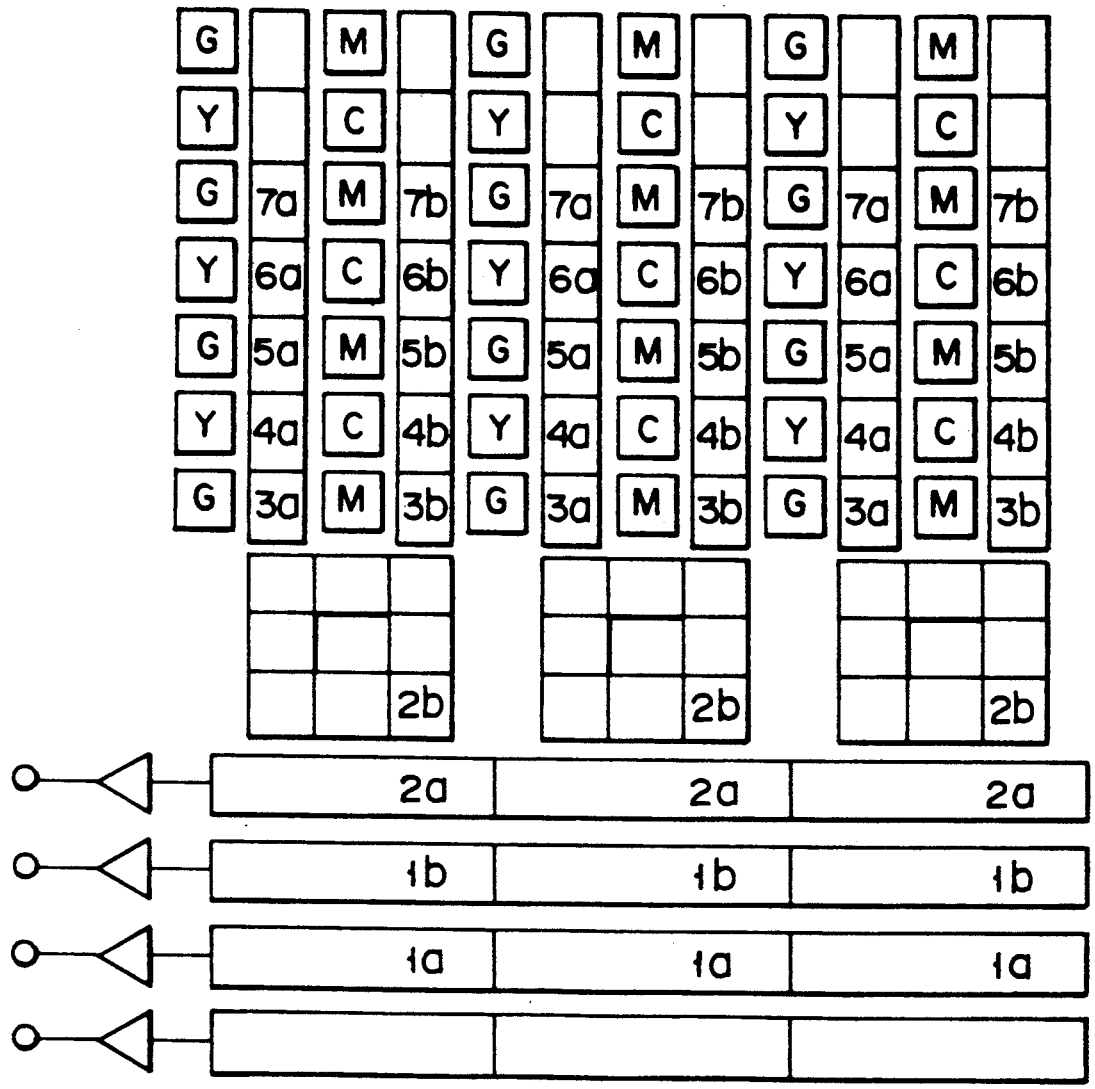
Figure 171:
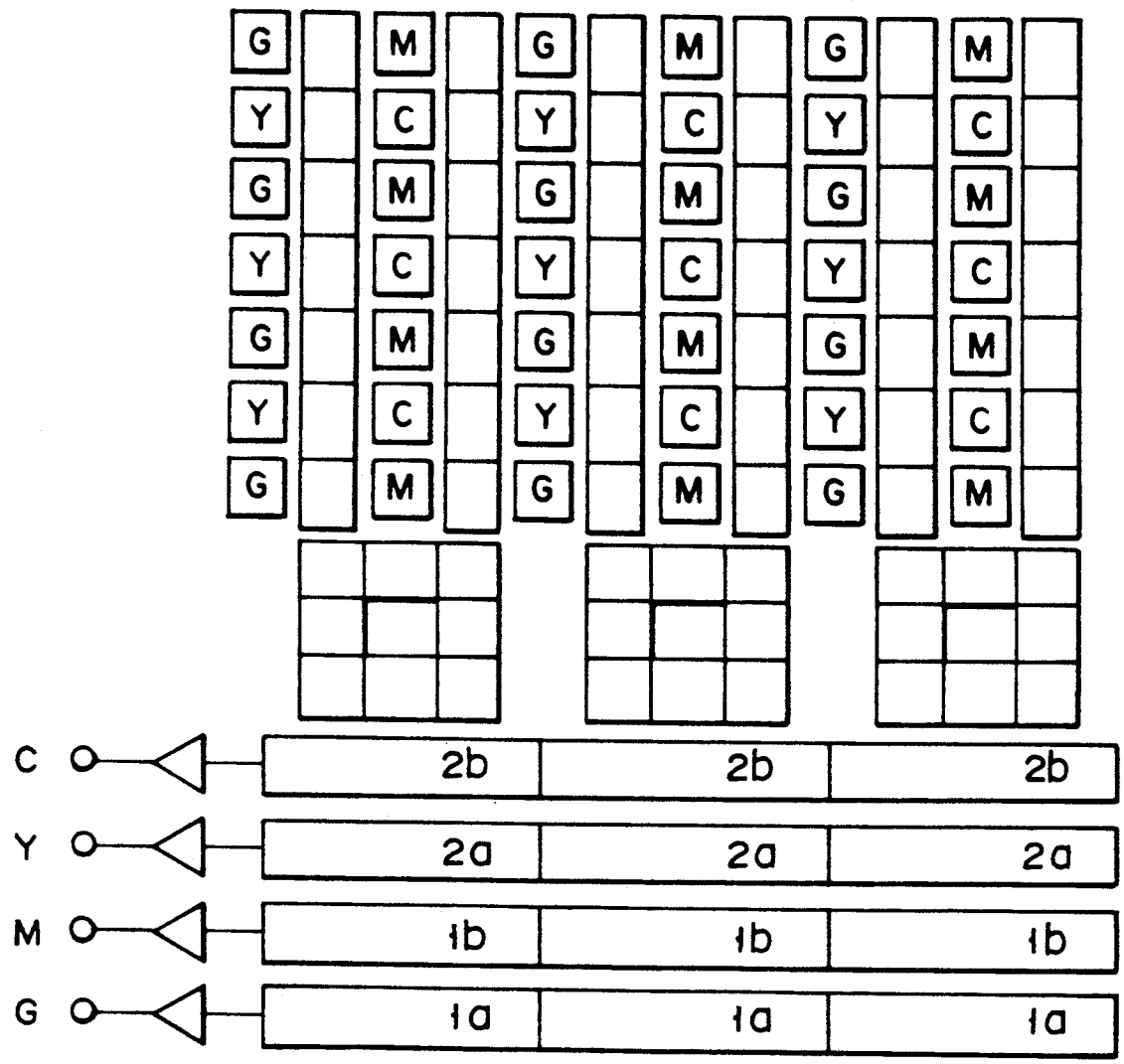

Then, as is shown in FIG. 17B, the line charges, each consisting of six pixel charges, which are accumulated in the second to seventh rows of elements 12 are transferred to the first to sixth rows of elements 12. At the same time, the pixel charges 1a and 1b accumulated in the lowermost stages 12 of each pair of columns are transferred to the charge-accumulating sections 52a and 52d of the loop transfer stage 52 assigned to these columns of stages 12. Next, as is evident from FIG. 17C, the pixel charges 1a and 1b are transferred to the sections 52b and 52a via the charge-transferring section 52h and 52g, respectively. Further, as is shown in FIG. 17D, these charges 1a and 1b are transferred to the sections 52c and 52b via the charge-transferring sections 52f and 52g, respectively. Thereafter, as can be understood from FIG. 17E, the line charges, each consisting of six pixel charges, which are accumulated in the second to sixth rows of stages 12 are transferred to the first to fifth rows of stages 12, while the same time, the pixel charges 2a and 2b accumulated in the lowermost stages 12 of each pair of columns are transferred to the charge-accumulating sections 52a and 52d of the loop transfer stage 52 assigned to these columns of stages 12. Next, as is shown in FIG. 17F, the pixel charges 1a in the charge-accumulating sections 52c of the stages 52 are transferred to the horizontal transfer register 53, and, at the same time, the pixel charges 1b, 2a and 2b are transferred to the sections 52c, 52b and 52a via the sections 52f, 52g and 52h, respectively. Further, as is shown in FIG. 17G, the pixel charges 1a are transferred to the horizontal transfer register 54, and the pixel charges 1b are transferred to the horizontal transfer register 53, while the pixel charges 2a and 2b are transferred to the charge-accumulating sections 52c and 52b through the charge-transferring sections 52f and 52g, respectively. Then, as is evident from FIG. 17H, the pixel charges 1a are transferred to the horizontal transfer stage 55, the pixel charges 1b are transferred to the horizontal transfer stage 54, and the pixel charges 2a are transferred to the horizontal transfer stage 53. At the same time, the pixel charges 2b are transferred to the charge-accumulating sections 52c through the charge-transferring sections 52f. Next, as is shown in FIG. 17I, the pixel charges 1a, 1b, 2a and 2b are transferred to the horizontal transfer stages 56, 55, 54 and 53, respectively. Thereafter, the detector 57 converts the pixel charges output by the register 53, into a cyan line signal; the detector 58 converts the pixel charges output by the register 54, into a yellow line signal; the detector 59 converts the serial charges output by the register 55, into a magenta line signal; and the detector 60 converts the serial charges output by the register 56, into a green line signal. The cyan line signal, the yellow line signal, the magenta line signal, and the green line signals, thus obtained, are output from the terminals 61, 62, 63 and 64, respectively.

The sequence of operations, described in the preceding paragraph is repeated in the rest of the even-numbered field period. Every time the device performs the sequence of operations, it outputs four line signals from the terminals 61 to 64.

Figure 18A:
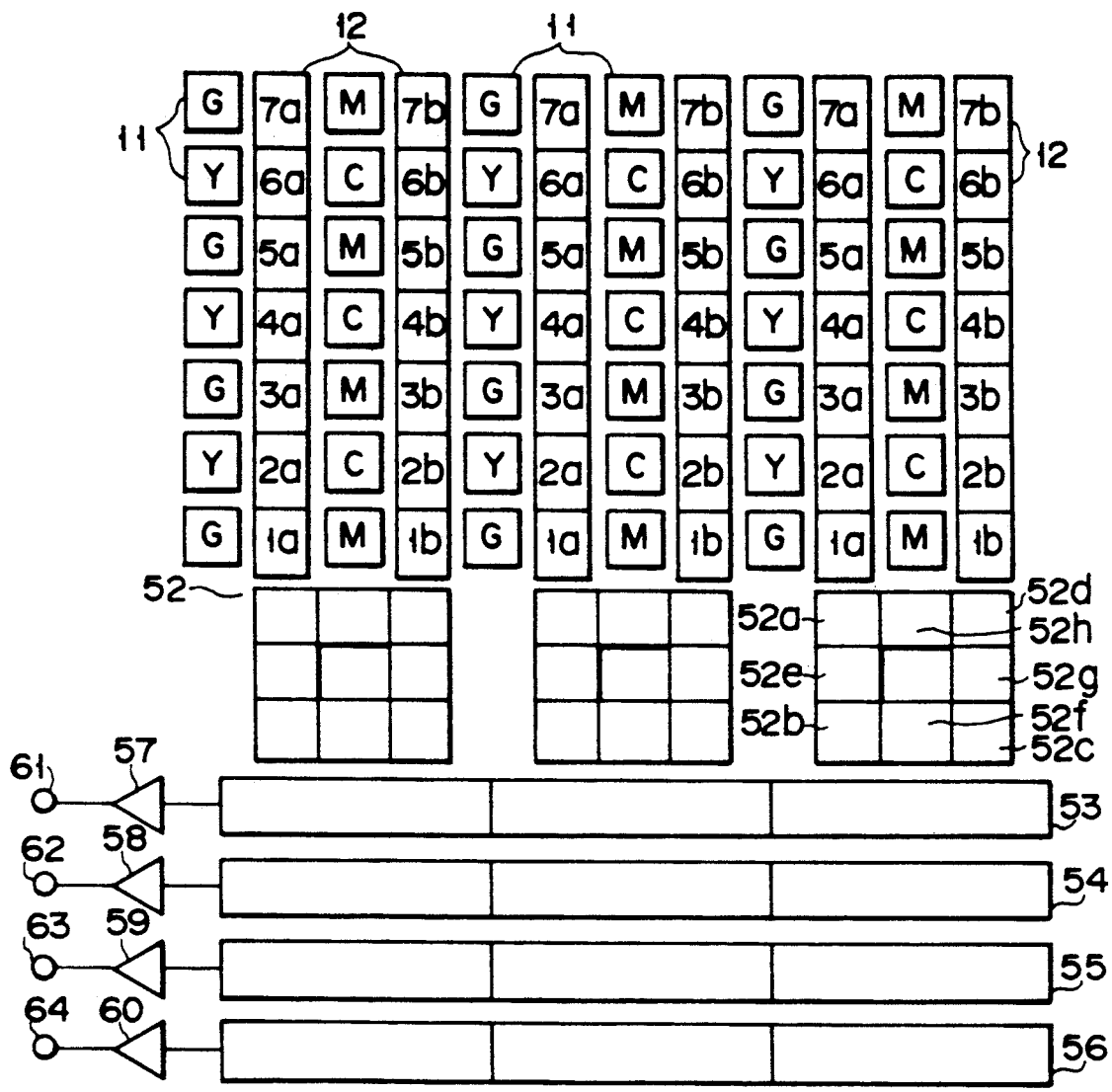
FIGS. 18A to 18Q are diagrams explaining how the solid-state imaging device is driven during the period of each odd-numbered field by the third method according to the invention.
Figure 18B:
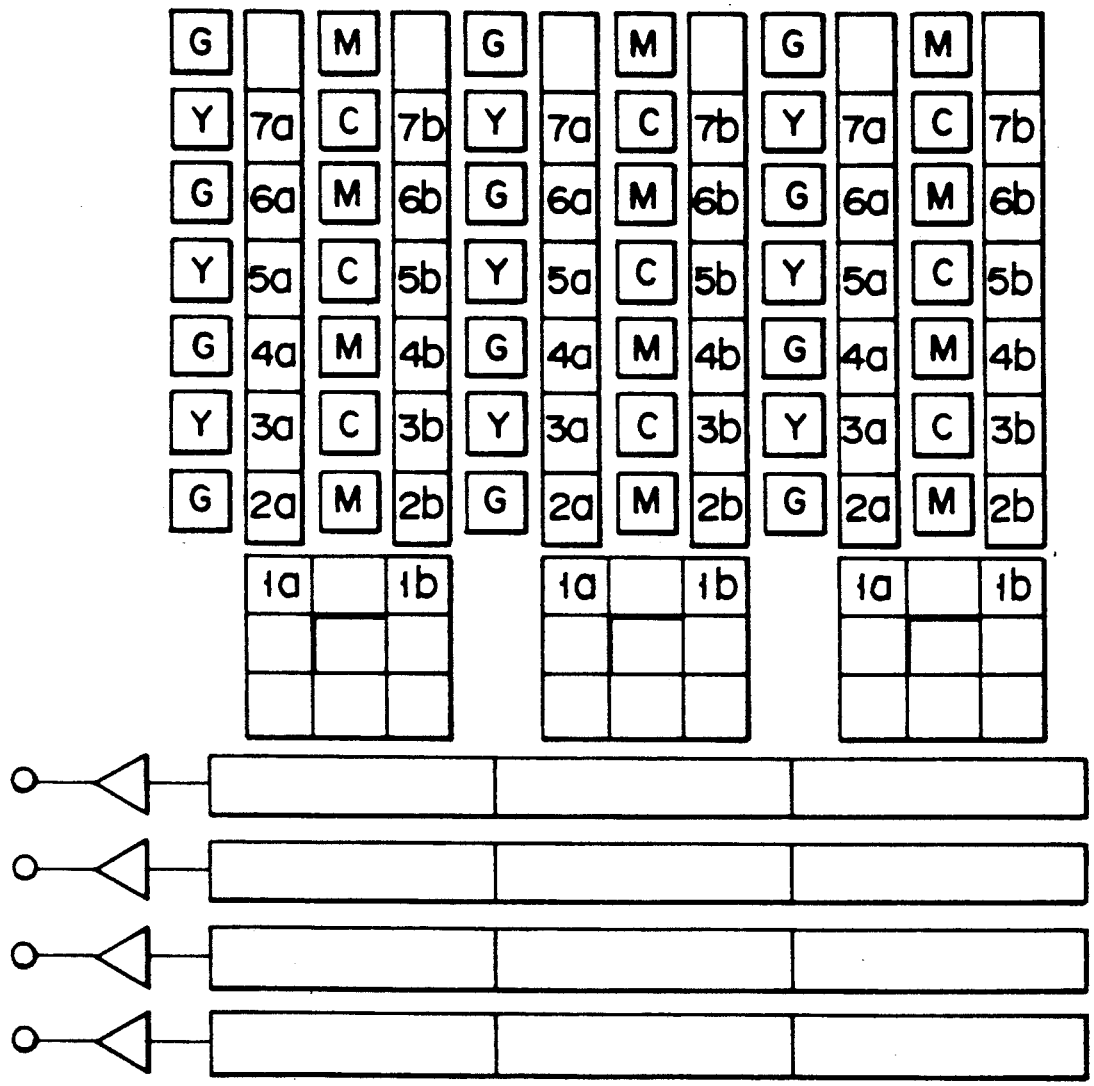
Figure 18C:
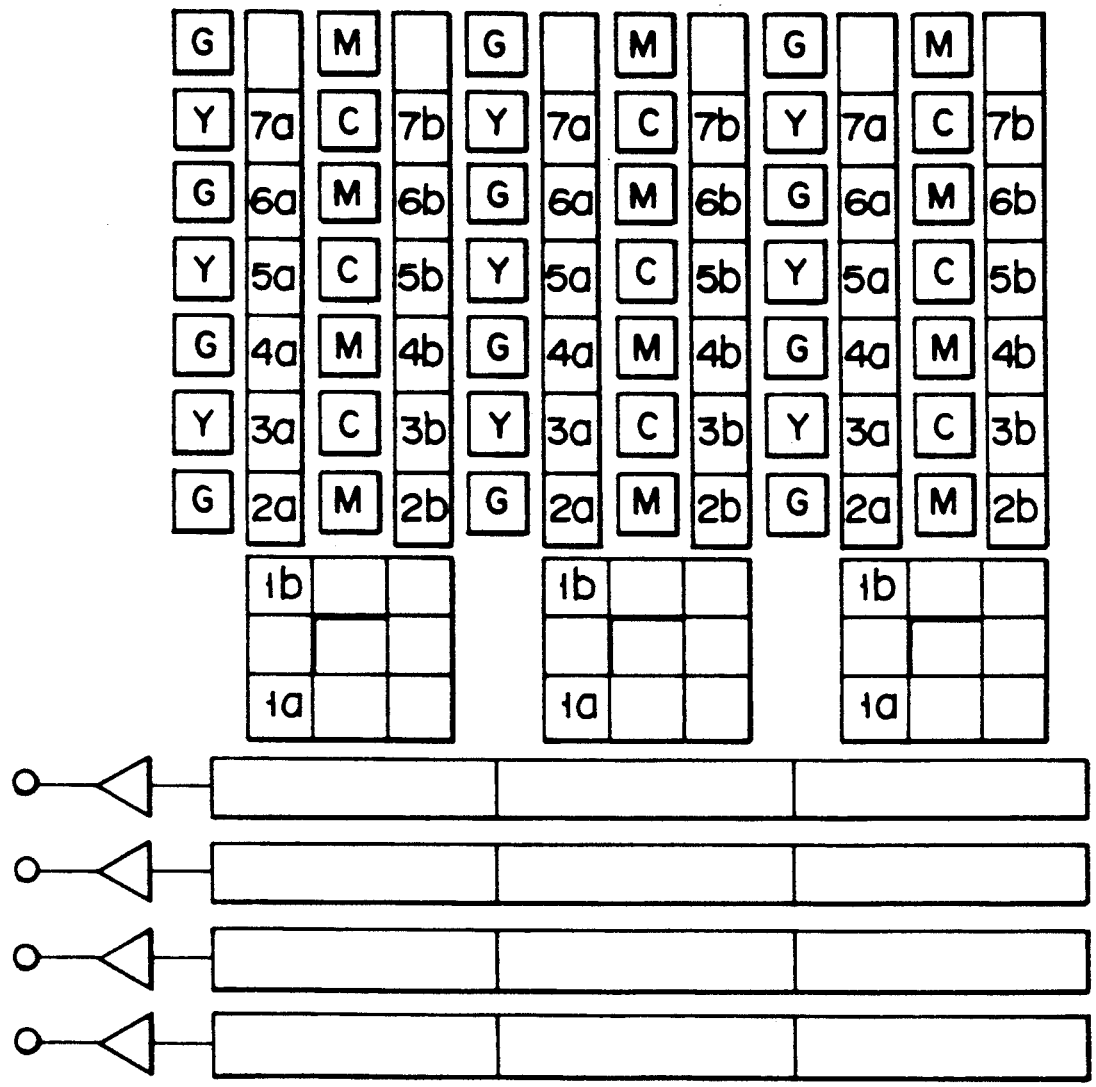
Figure 18D:
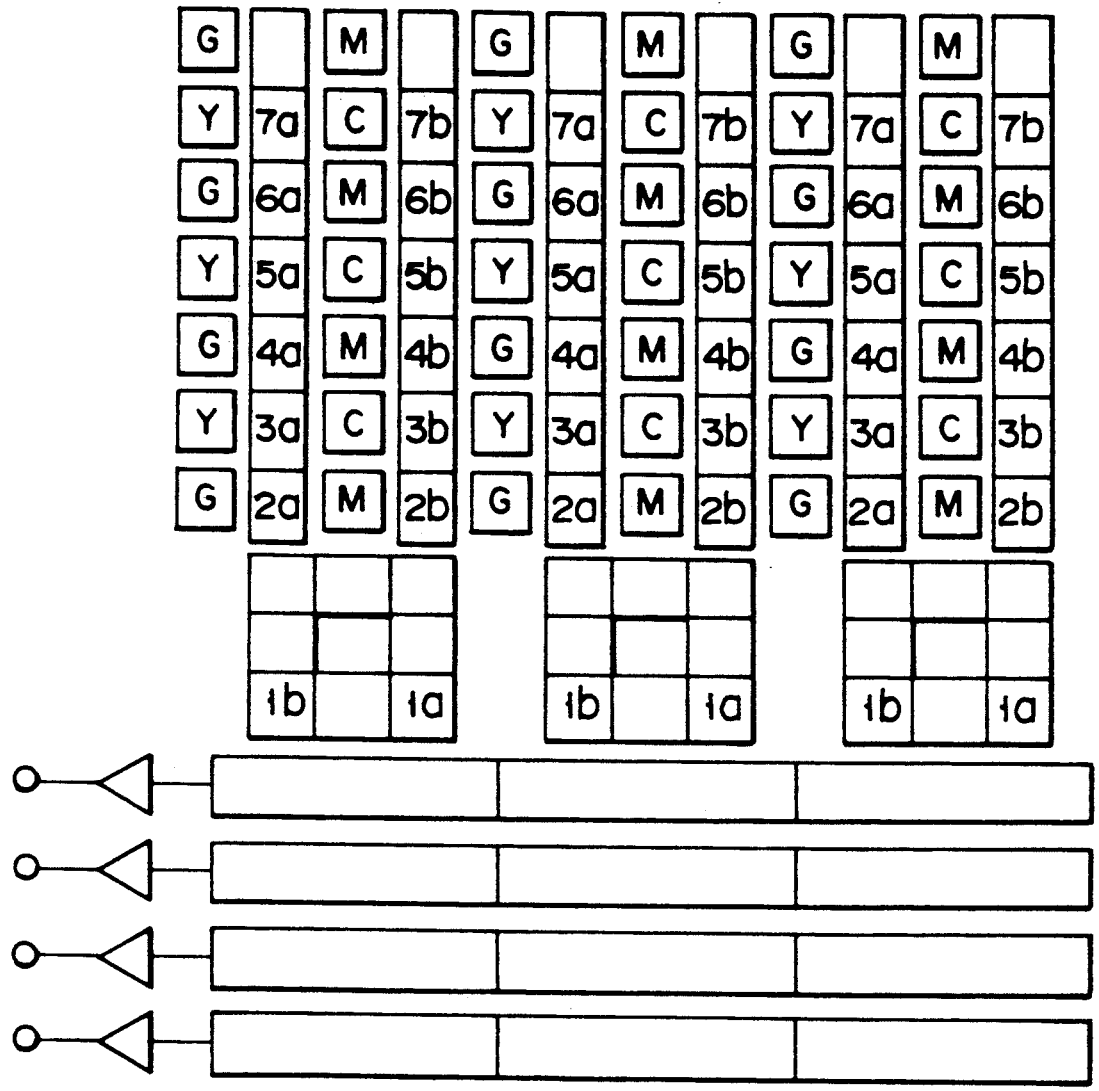
Figure 18E:
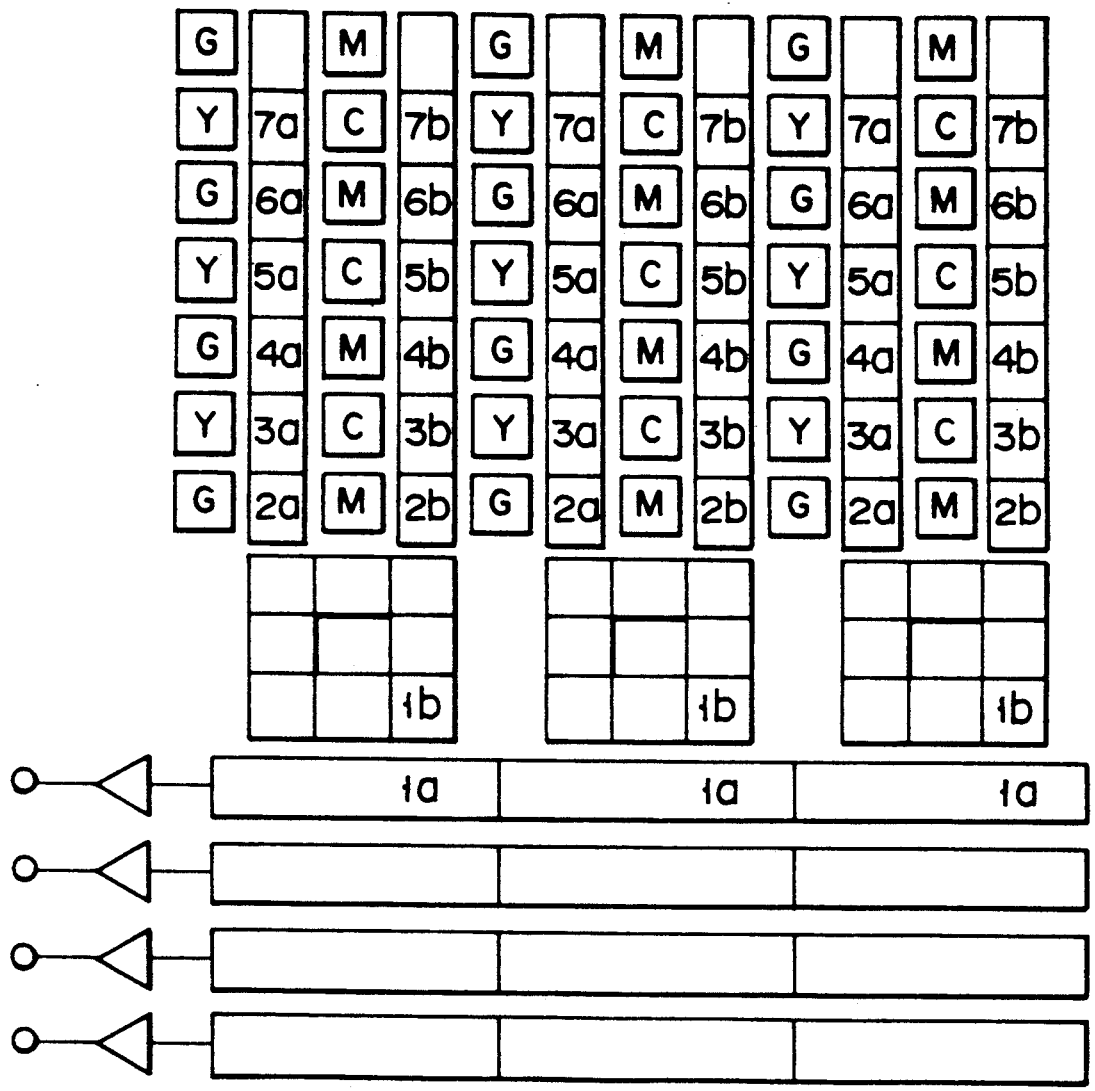

During the period of each odd-numbered field, the imaging device is driven in the following way. First, all photoelectric converting elements 11 are driven, whereby the pixel charges 1a to 7a accumulated in the elements 11 of each odd-numbered column and the pixel charges 1b to 7b accumulated in the elements 11 of each even-numbered column are simultaneously transferred to the charge-transferring stages 12 as is shown in FIG. 18A. Then, as is shown in FIG. 18B, the line charges, each consisting of six pixel charges, which are accumulated in the second to seventh rows of stages 12 are transferred to the first to sixth rows of stages 12. At the same time, the pixel charges 1a and 1b accumulated in the lowermost stages 12 of each pair of columns are transferred to the charge-accumulating sections 52a and 52d of the cyclic transfer register 52 assigned to these columns of stages 12. Next, as is evident from FIG. 18C, the pixel charges 1a and 1b are transferred to the sections 52b and 52a via the charge-transferring section 52h and 52g, respectively. Then, as is shown in FIG. 18D, these charges 1a and 1b are transferred to the sections 52c and 52b via the charge-transferring sections 52f and 52g, respectively. Thereafter, as is evident from FIG.

18E, the pixel charges 1a are transferred to the horizontal transfer register 53, and the pixel charges 1b are transferred to the charge-accumulating sections 52c through the charge-transferring sections 52f.

Figure 18F:
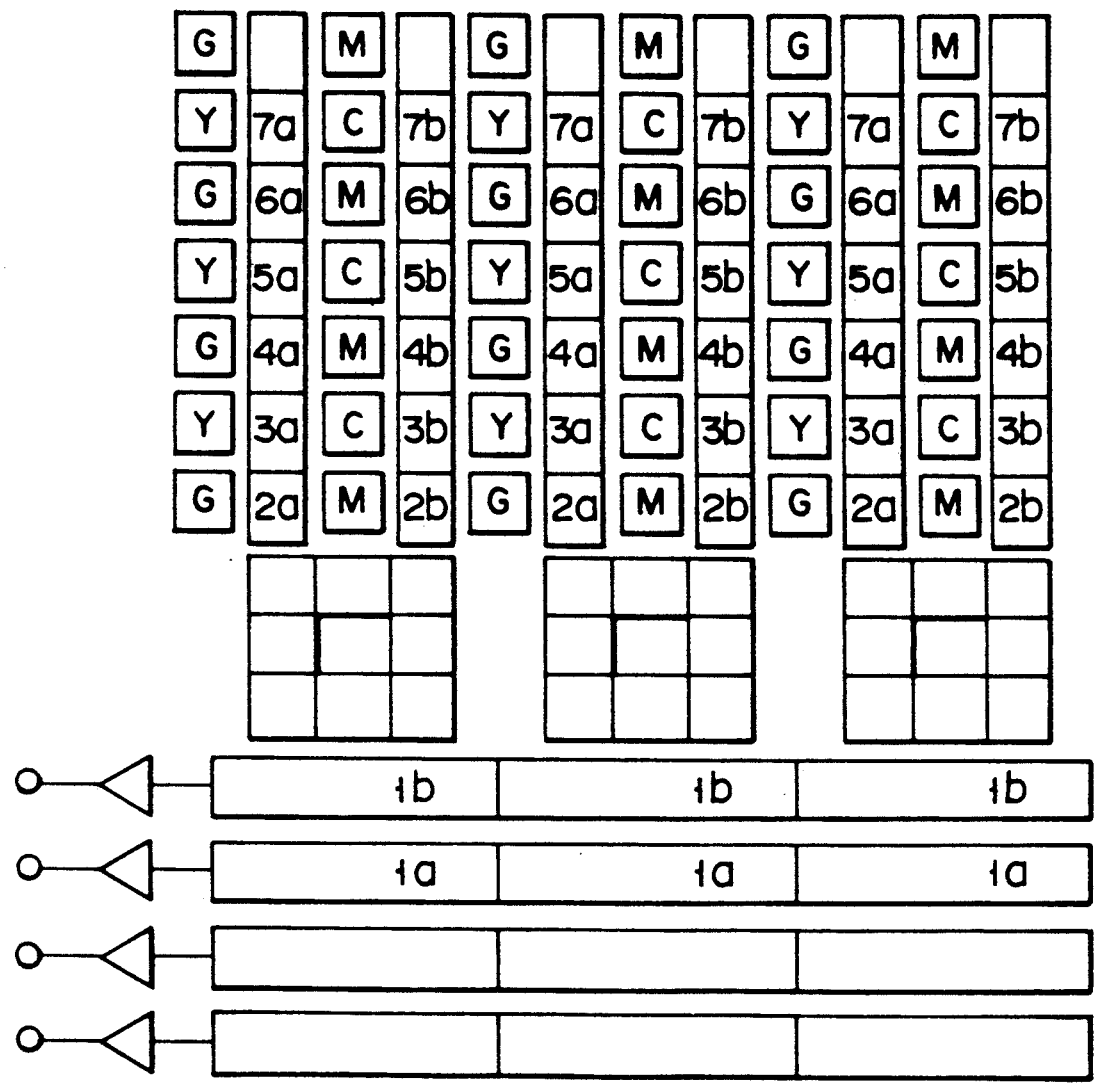
Figure 18G:
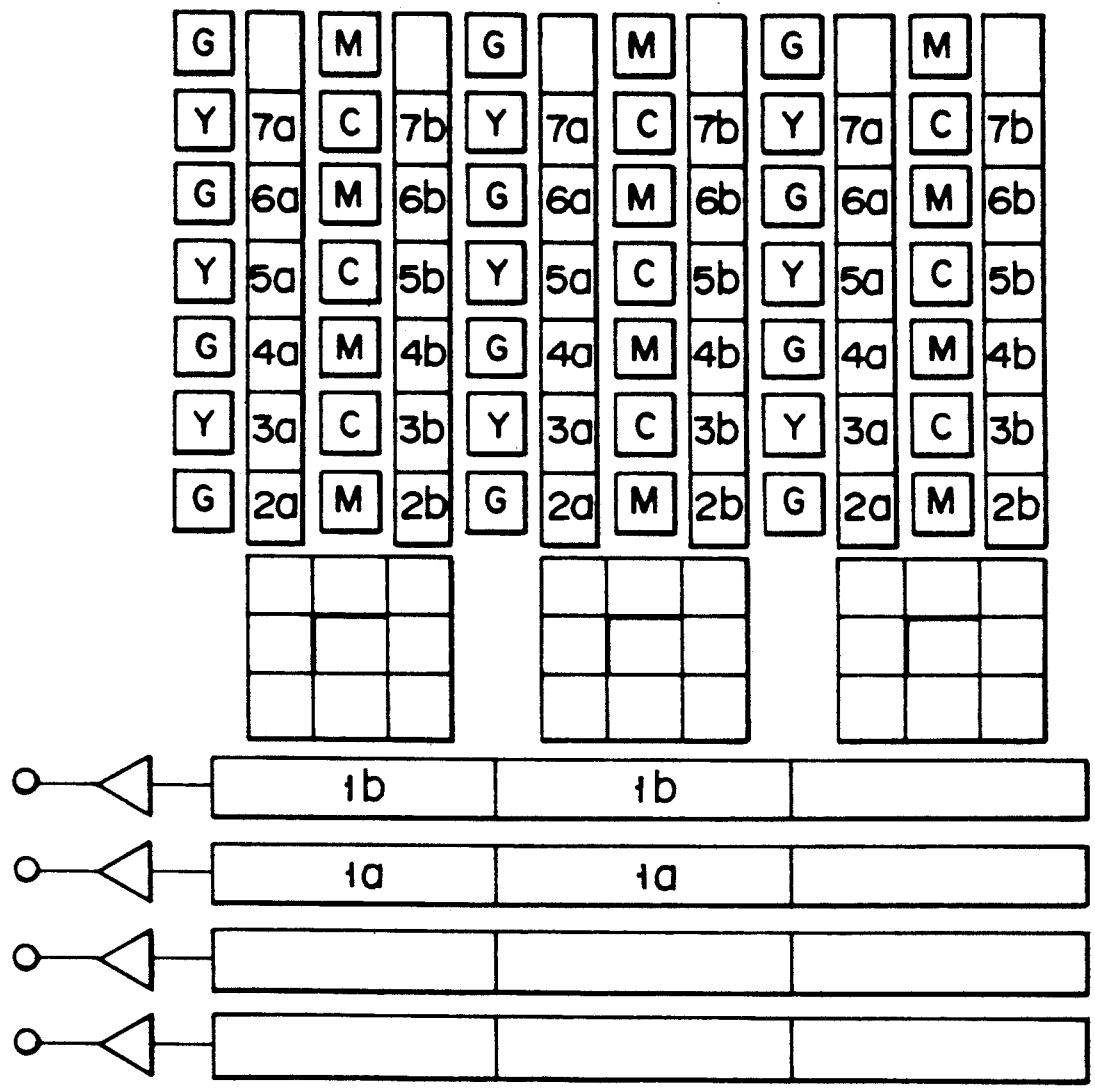

Next, as is shown in FIG. 18F, the pixel charges 1a and 1b are transferred to the horizontal transfer stages 54 and 53, respectively. At this time, as can be understood from FIG. 18G, the pixel charges 1a and 1b are discarded from the horizontal transfer stages 53 and 54 through the detectors 57 and 58 and the output terminals 61 and 62, thereby to accomplish interlacing.

Figure 18H:
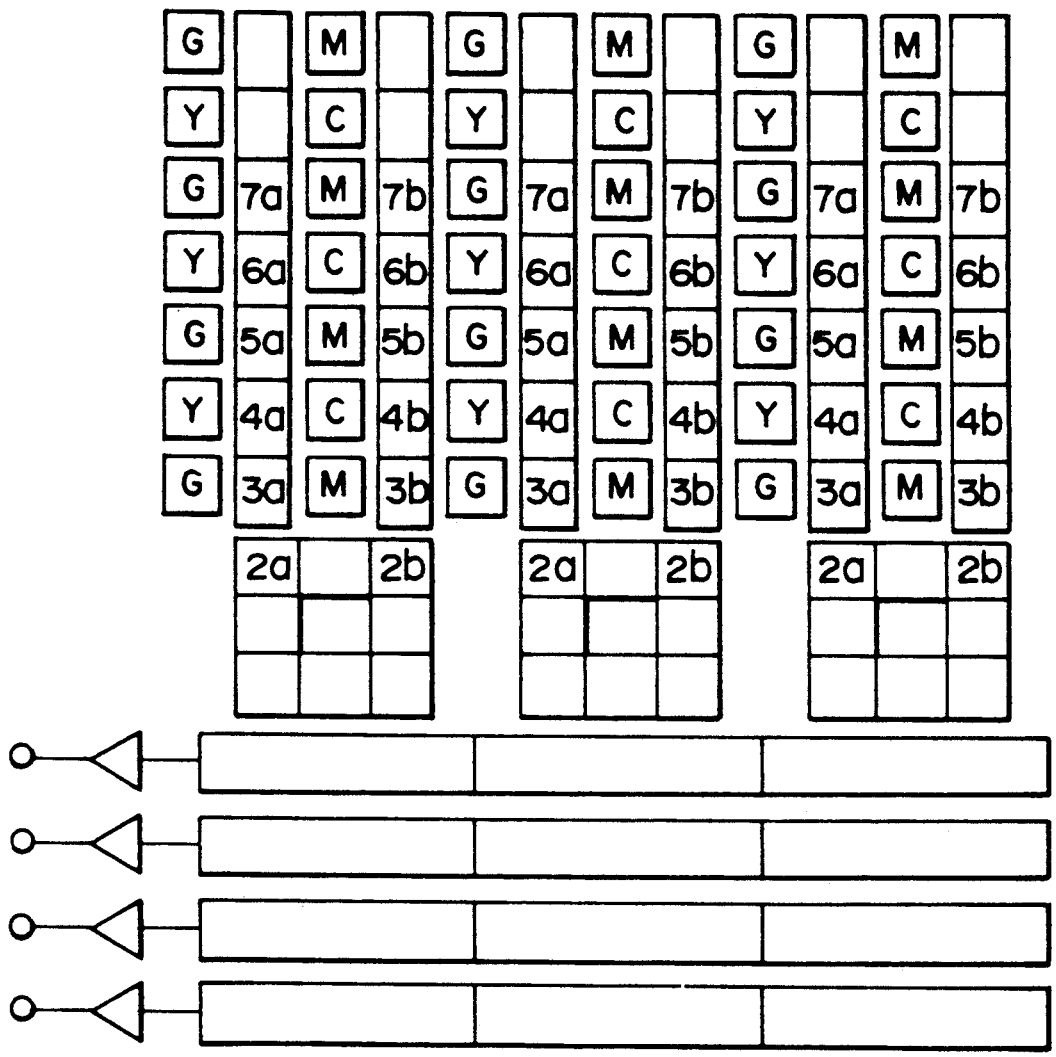
Figure 181:
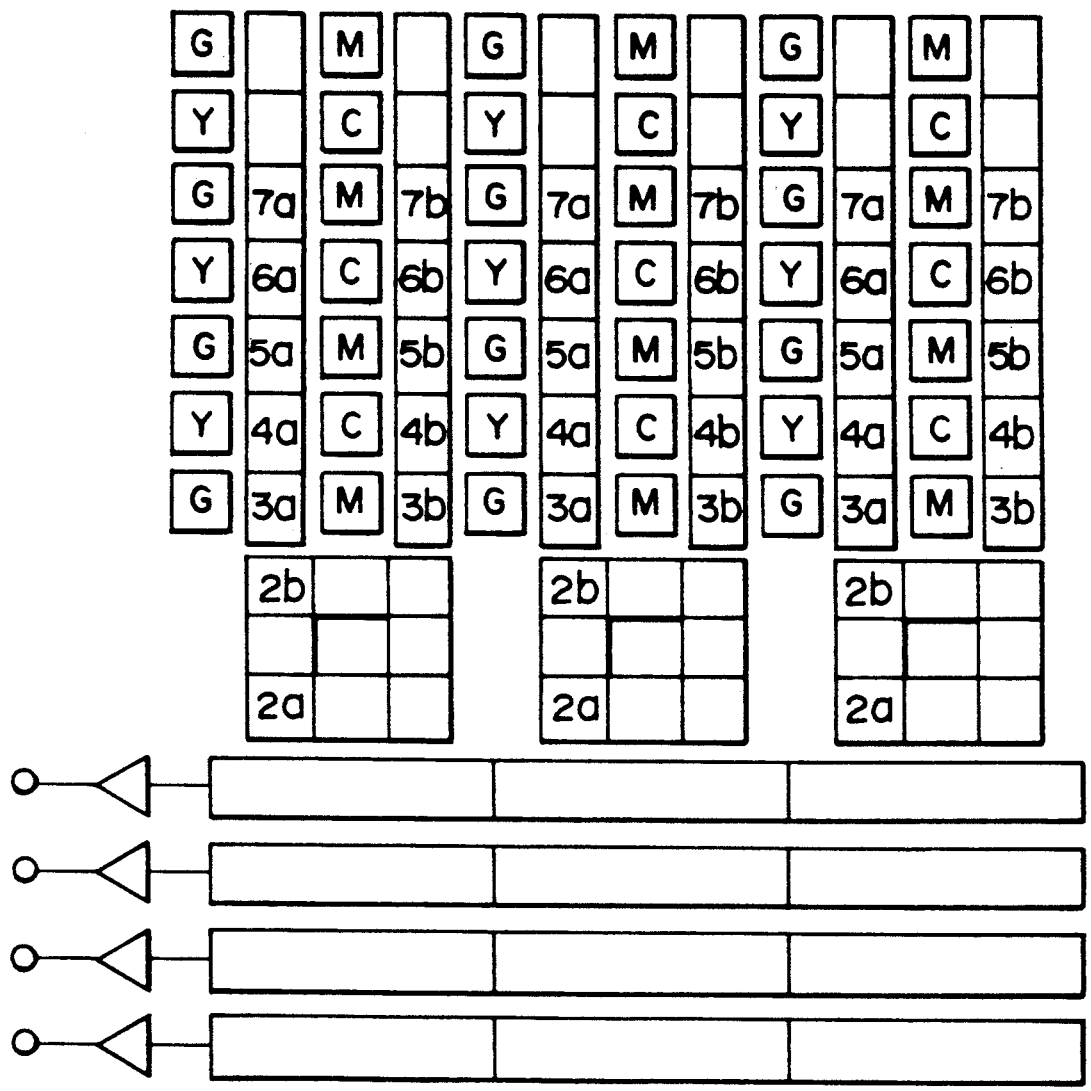
Figure 18J:
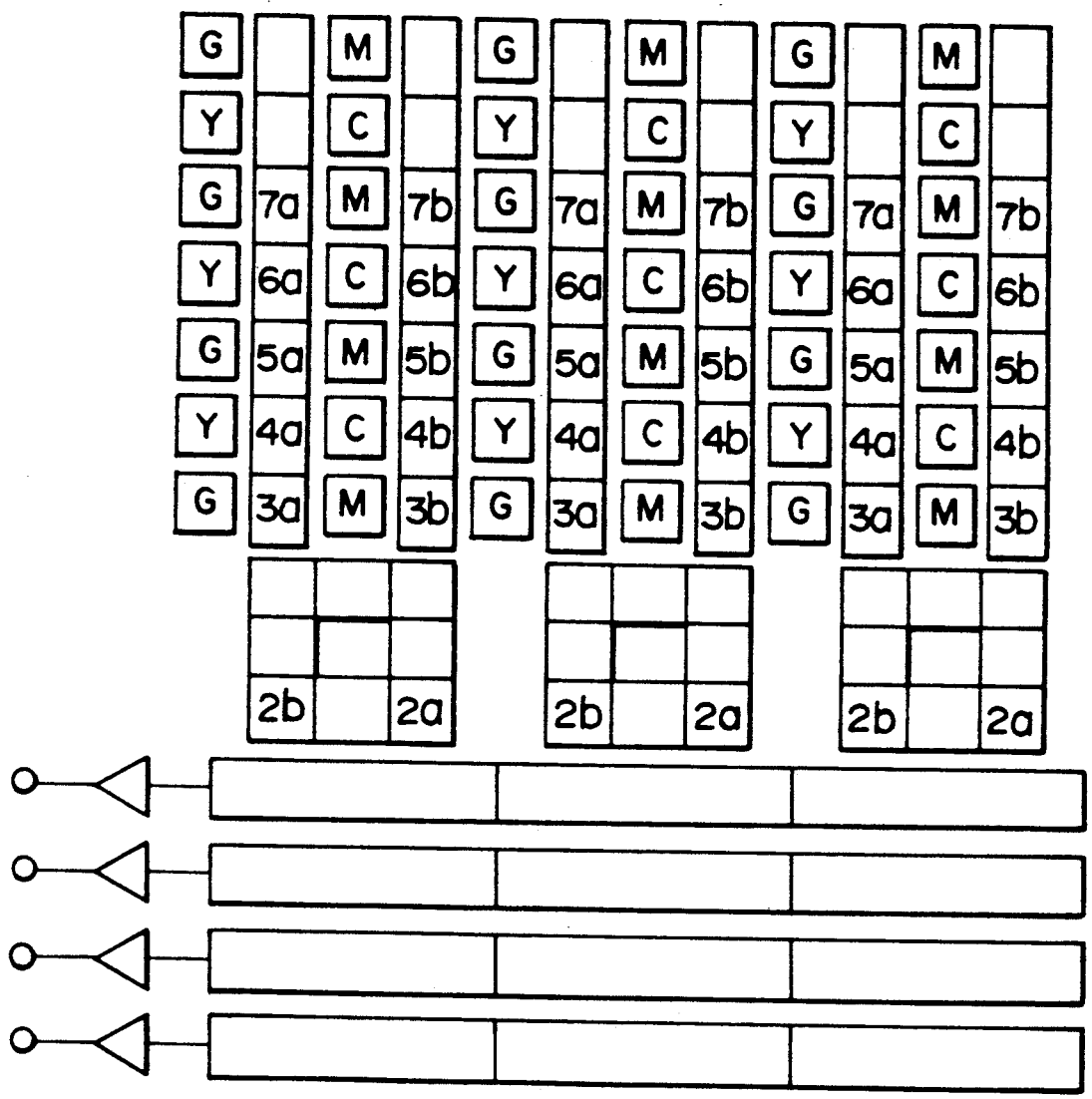
Figure 18K:
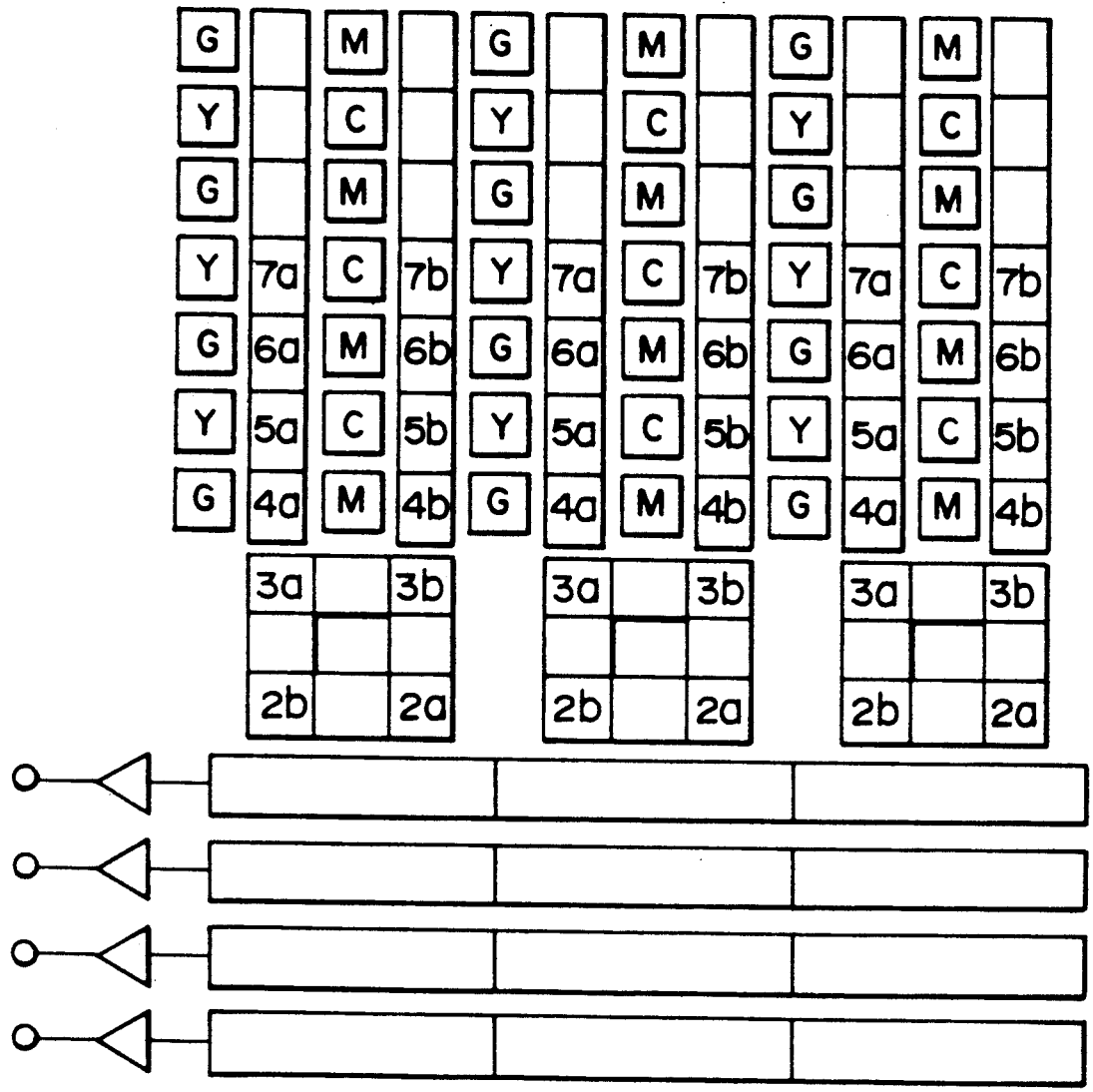
Figure 18L:
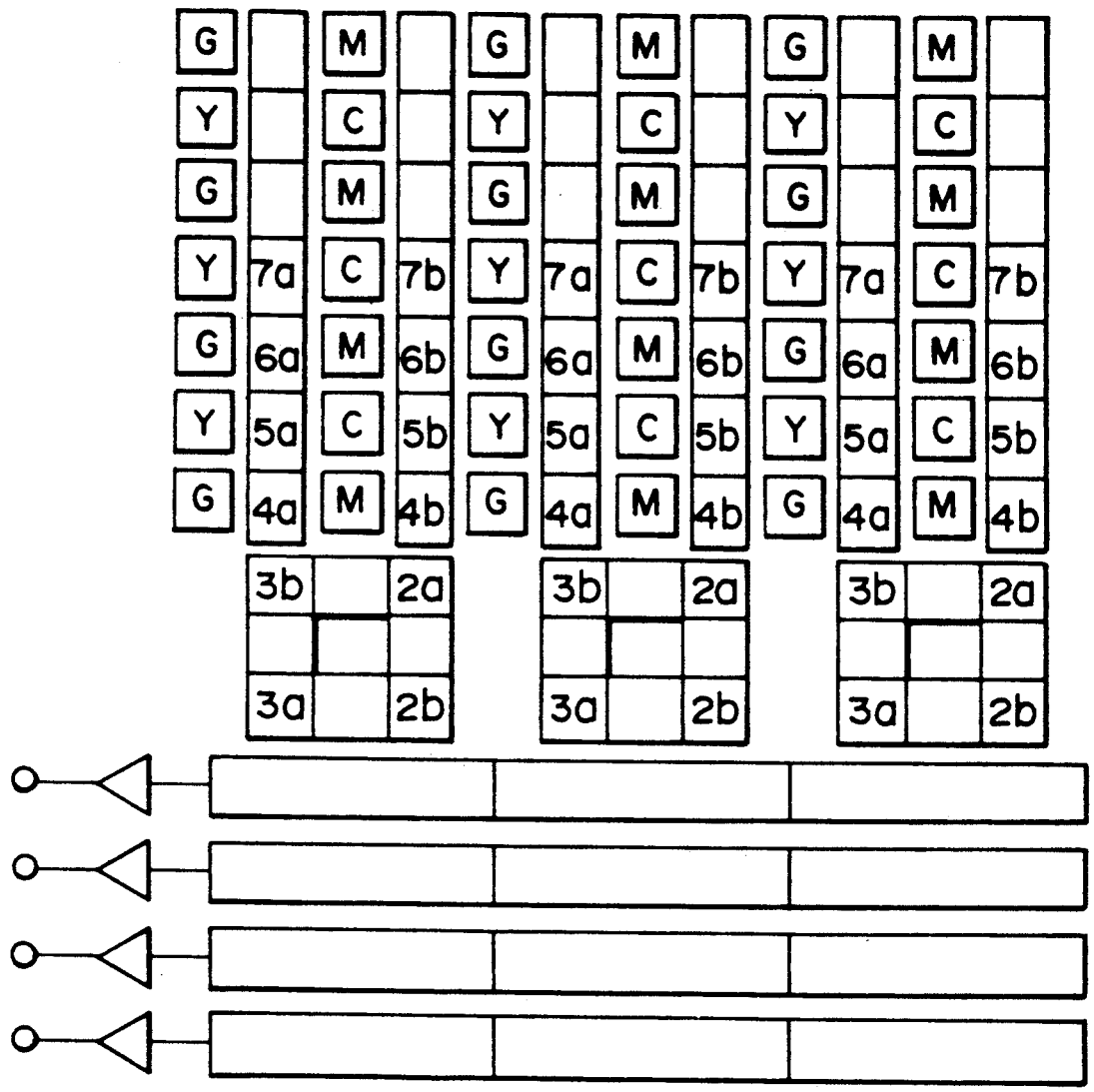
Figure 18N:
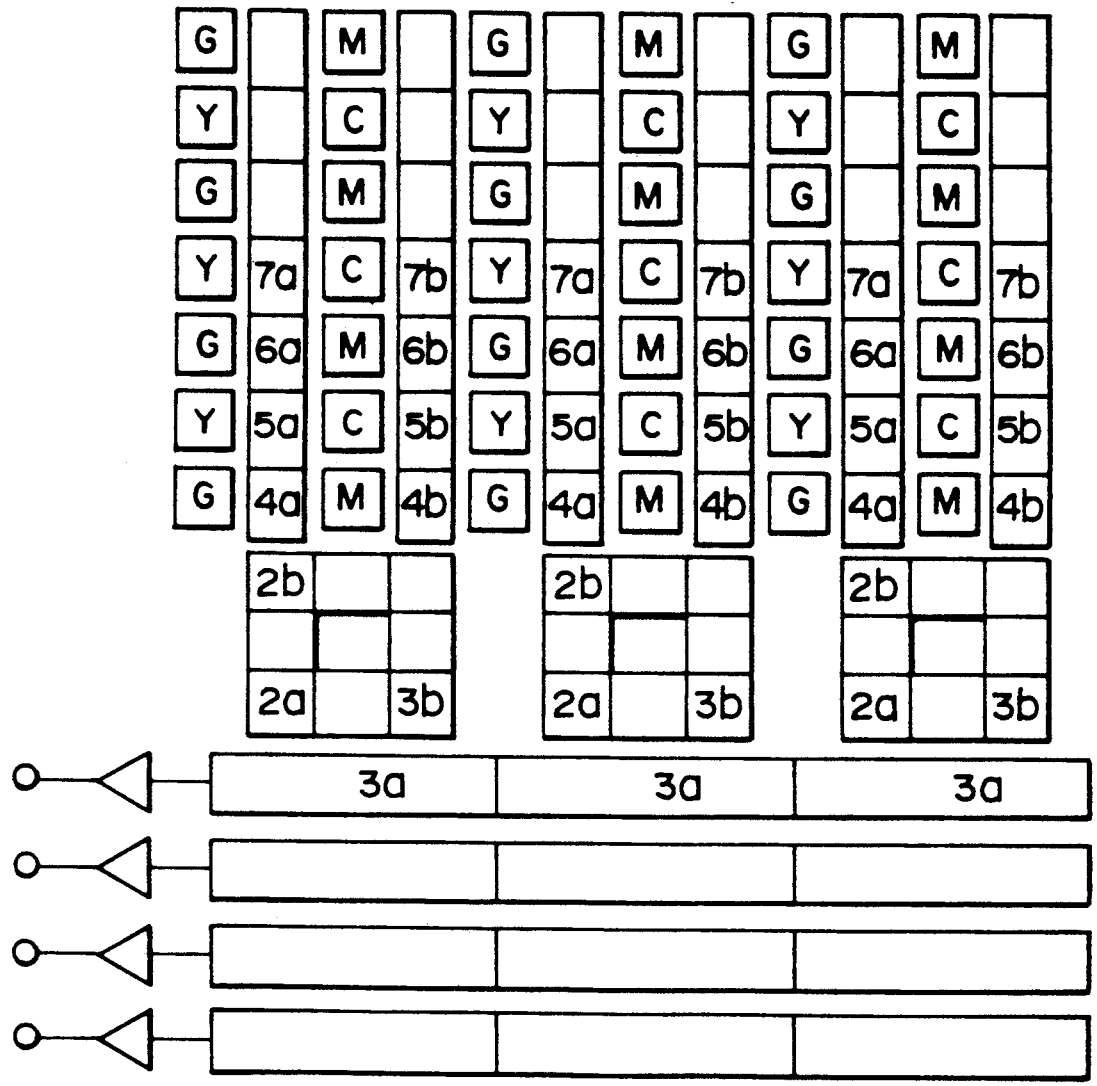
Figure 180:
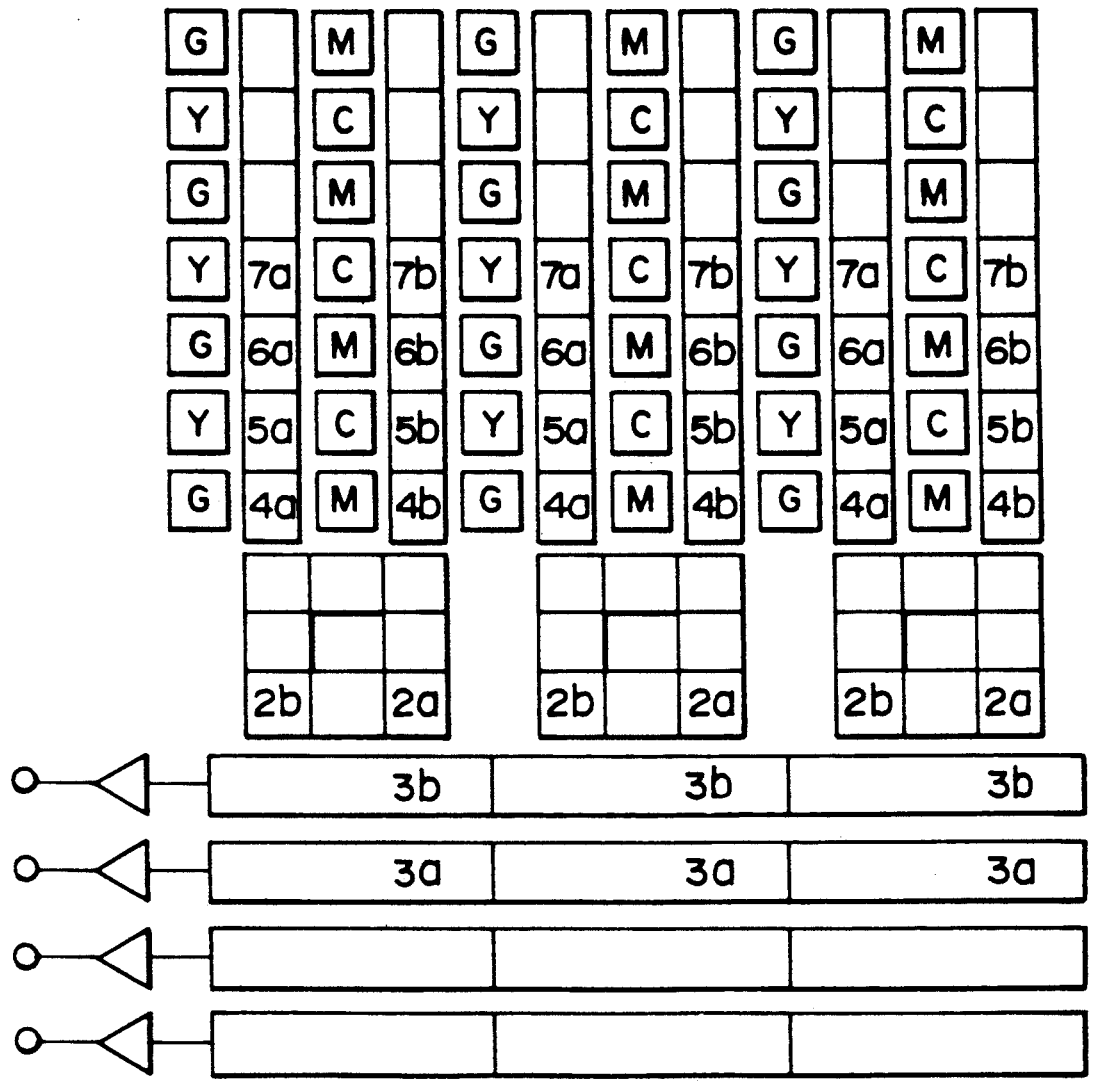

Further, as is shown in FIG. 18H, the line charges, each consisting of five pixel charges, which are accumulated in the second to sixth rows of stages 12 are transferred to the first to fifth rows of stages 12. At the same time, the pixel charges 2a and 2b accumulated in the lowermost stages 12 of each pair of columns are transferred to the charge-accumulating sections 52a and 52d of the cyclic transfer register 52. Next, as is evident from FIG. 18I, the pixel charges 2a and 2b are transferred to the sections 52b and 52a via the charge-transferring section 52h and 52g, respectively. Then, as is shown in FIG. 18J, these charges 2a and 2b are transferred to the sections 52c and 52b via the charge-transferring sections 52f and 52g, respectively. Next, as is evident from FIG. 18K, the line charges, each consisting of four pixel charges, which are accumulated in the second to fifth rows of stages 12 are transferred to the first to fourth rows of stages 12. At the same time, the pixel charges 3a and 3b accumulated in the lowermost stages 12 of each pair of columns are transferred to the charge-accumulating sections 52a and 52d of the cyclic transfer register 52. Then, in each cyclic transfer register 52, the pixel charges 2a, 2b, 3a and 3b are transferred to the charge-accumulating elements 52d, 52c, 52b and 52a, respectively, as is shown in FIG. 18L, and further transferred to the elements 52a, 52d, 52c and 52b, respectively, as can be understood from FIG. 18M. Next, as is shown in FIG. 18N, the pixel charges 2a, 2b and 3b are transferred to the sections 52b, 52a and 52c, respectively, in each cyclic transfer register 52, while the pixel charges 3a are transferred to the horizontal transfer register 53.

Figure 18P:
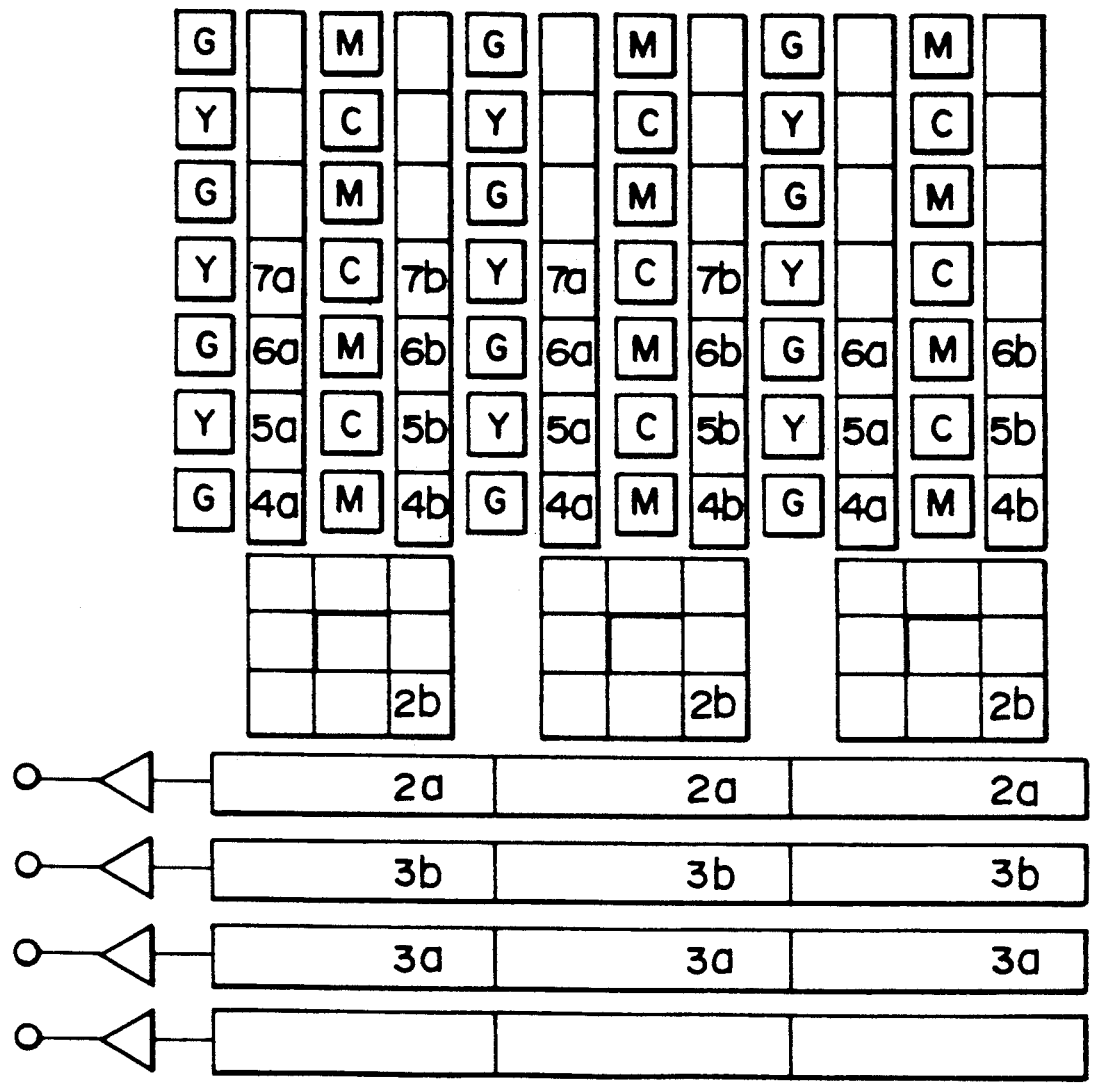

Thereafter, as can be understood from FIG. 18O, the pixel charges 2a and 2b are transferred to the sections 52c and 52b, respectively, in each cyclic transfer register 52, while the pixel charges 3a are transferred to the horizontal transfer register 54, and the pixel charges 3b are transferred to the horizontal register resister 53. At this time, the line charge consisting of the pixel charges 3a and 3b, originally accumulated in the third row of photoelectric converting elements 11, jumps over the line charge consisting of the pixel charges 2a and 2b originally accumulated in the second row of elements 11. Then, as is shown in FIG. 18P, the pixel charges 2b is transferred to the section 52c in each cyclic transfer register 52, while the pixel charges 3a, 3b and 2a are transferred to the horizontal transfer register 55, 54 and 53, respectively. Further, as is evident from FIG. 18Q, the pixel charges 3a, 3b, 2a and 2b are transferred to the horizontal transfer register 56, 55, 54 and 53, respectively. Thereafter, the detector 57 converts the pixel charges output by the register 53, into a cyan line signal; the detector 58 converts the pixel charges output by the register 54, into a yellow line signal; the detector 59 converts the serial charges output by the register 55, into a magenta line signal; and the detector 60 converts the serial charges output by the register 56, into a green line signal. The cyan line signal, the yellow line signal, the magenta line signal, and the green line signals, thus obtained, are output from the terminals 61, 62, 63 and 64, respectively.

The sequence of operations, described in the two preceding paragraph is repeated in the rest of the odd-numbered field period. Every time the device performs the sequence of operations, it outputs four line signals from the terminals 61 to 64.

Figure 18Q:
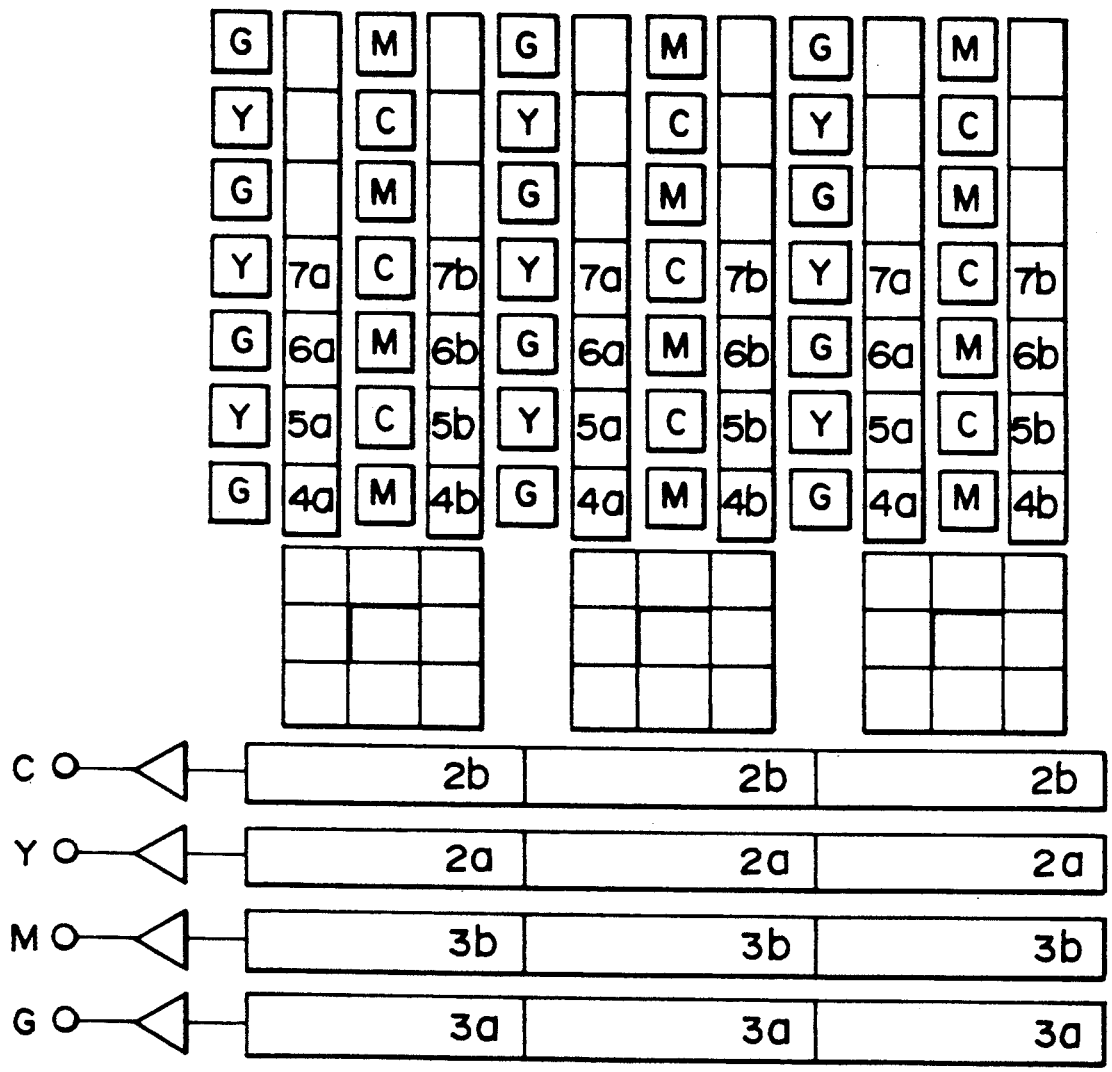

In the fourth method, as has been explained with reference to FIGS. 18A–18Q, during each odd-numbered field period, the cyclic transfer registers 52, each connected between the lowermost of the elements 12 of either associated column and the associated charge-transfer element of the horizontal transfer stage 53, transfer pixel charges such that the line charge originally accumulated in any odd-numbered row of photoelectric converting elements 11 jumps over the line charge originally accumulated in the immediately preceding even-numbered row of elements 11. Hence, two adjacent line signals the imaging device outputs during each odd-numbered field period are in the same position as the two adjacent line signals the device outputs during each even-numbered field period. As a result, it is unnecessary use switches for switching the two adjacent lines signals output by the device during each odd-field period.

What is claimed is:

1. A method for driving solid-state imaging device having a first field period and a second field period, the solid state imaging device including a plurality of photoelectric converting elements arranged in rows and columns for converting an optical image into pixel charges, a two-pixel periodic color filter array having color filters covering the photoelectric converting elements, respectively, a plurality of charge-transferring stages arranged in columns and associated with the photoelectric converting elements for transferring pixel changes from said photoelectric converting elements in a vertical direction, a cyclic transfer register associated with each column of charge-transferring stages for receiving pixel charges transferred in the vertical direction from the charge-transferring stages, and a number of horizontal transfer registers for receiving pixel charges in units of one line of an image field transferred vertically from the cyclic transfer registers and for transferring these pixel charges horizontally, the number of horizontal transfer registers equal to the number of colors of the color filter array, the method comprising the steps of:

during a first field period,
  transferring the pixels charges accumulated in the photoelectric converting elements to the charge-transferring stages,
  transferring the pixels charges in the charge-transferring stages in the vertical direction so that pixel charges transfer to the cyclic transfer registers, and
  transferring the pixel charges in the cyclic transfer registers to the horizontal transfer registers; and
during a second field period,
  transferring the pixels charges accumulated in the photoelectric converting elements to the charge-transferring stages,
  first transferring the pixels charges in the charge-transferring stages in the vertical direction so that a pixel charge from each column of charge-transfer stages transfers to an associated cyclic transfer register, storing, in the cyclic transfer register, the pixel charges transferred in the vertical direction from the charge-transferring stages during the first transferring step, second transferring the pixels charges in the charge-transferring stages in the vertical direction so that a pixel charge from each column of charge-transfer stages transfers to an associated cyclic transfer register, transferring the pixel charges transferred to the cyclic transfer registers during the second transferring step to the horizontal transfer registers, and transferring the stored pixel charges in the cyclic transfer register transferred during the first transferring step to the horizontal transfer registers.

2. The method of claim 1, wherein during the second field period, the first transferring step includes the step of transferring the pixels charges in the charge-transferring stages in the vertical direction so that a pixel charge in each column of charge-transferring stages transfers to a first charge accumulation section of an associated cyclic transfer register;

the storing step includes the step of transferring the pixel charges in the first accumulation section of the cyclic transfer registers to a second accumulation section of the cyclic transfer registers;

the second transferring step includes the step of transferring the pixels charges in the charge-transferring stages in the vertical direction so that a pixel charge in each column of charge-transferring stages transfers to the first charge accumulation section of the cyclic transfer registers;

the transferring pixel charges in the cyclic transfer registers step includes the step of transferring the pixel charges in the first accumulation section of the cyclic transfer registers to the horizontal transfer registers; and the transferring stored pixel charges step includes the steps of transferring the pixel charges in the second accumulation section of the cyclic transfer registers to the first accumulation section of the cyclic transfer registers and transferring the pixel charges in the first accumulation section of the cyclic transfer registers to the horizontal transfer registers.

3. The method of claim 1, wherein
during both the first and second field period,
the step of transferring the pixel charges in the cyclic transfer register includes the steps of transferring the pixel charges in the cyclic transfer registers to a first horizontal transfer register and transferring the charges in the first horizontal transfer register to a second horizontal transfer register; and during the second field period,
the step of transferring the stored pixel charges includes the steps of transferring the stored pixel charges in the cyclic transfer registers to the first horizontal transfer register and transferring the charges in the first horizontal transfer register to the second horizontal transfer register.

4. The method of claim 1, wherein during the second field period the method further comprises the following steps prior to the first transferring step:

transferring the pixels charges in the charge-transferring stages in the vertical direction so that a pixel charge in each column of charge-transferring stages transfers to an associated cyclic transfer registers, and transferring the pixel charges in the cyclic transfer registers to the horizontal transfer registers.

5. The method of claim 1, wherein the two-line solid-state imaging device further includes parallel-to-serial conversion units arranged between the cyclic transfer registers and the horizontal transfer registers, the method further comprising the steps of:

driving the parallel-to-serial conversion units to convert pixel charges transferred from the cyclic transfer registers to the horizontal transfer registers to serial pixel charges, and outputting serial pixel charges from the horizontal transfer registers, each horizontal transfer register representing a corresponding color in the color filter array.

6. The method of claim 1, wherein the first and second field period form one image frame.

7. A method for driving solid-state imaging device having a first field period and a second field period, the solid stage imaging device including a plurality of photoelectric converting elements arranged in rows and columns for converting an optical image into pixel charges, an at least two-pixel periodic color filter array having color filters covering the photoelectric converting elements, respectively, a plurality of charge-transferring stages arranged in columns and associated with the photoelectric converting elements for transferring pixel changes from said photoelectric converting elements in a vertical direction, a cyclic transfer register associated with each column of charge-transferring stages for receiving a pixel charge transferred in the vertical direction from the charge-transferring stages, and a number of horizontal transfer registers for receiving pixel charges in units of one line of an image field from the cyclic transfer registers and for transferring these pixel charges horizontally, the number of transfer registers equal to the number of colors of the color filter array, the method comprising the steps of:

during a first field period,
transferring the pixels charges accumulated in both even and odd numbered rows of the photoelectric converting elements to the charge-transferring stages, pixel charges in even and odd numbered rows referred to as even and odd numbered pixel charges, respectively, transferring the even and odd numbered pixels charges in the charge-transferring stages in the vertical direction so that the even or odd numbered pixel charges in each column of charge-transferring stages transfer to an associated cyclic transfer register, and transferring the even and odd numbered pixel charges in the cyclic transfer registers to the horizontal transfer registers; and during a second field period,
transferring even and odd numbered pixels charges accumulated in the photoelectric converting elements to the charge-transferring stages, first transferring even and odd numbered pixel charges in each charge-transferring stage in the vertical direction so that an even numbered pixel charge in each column of charge-transferring stages transfers to an associated cyclic transfer registers, storing, in the cyclic transfer registers, the even numbered pixel charges transferred from the charge-transferring stages during the first transferring step, second transferring even and odd numbered pixel charges in each charge-transferring stage in the vertical direction so that an odd numbered pixel charge in each column of charge-transferring stages transfers to an associated cyclic transfer register, transferring the odd numbered pixel charges transferred to the cyclic transfer registers during the second transferring step to the horizontal transfer registers, and transferring the stored even numbered pixel charges transferred to the cyclic transfer registers during the first transferring step to the horizontal transfer registers.

8. The method of claim 7, wherein during the second field period, the first transferring step includes the step of transferring the even and odd numbered pixels charges in the charge-transferring stages in the vertical direction so that an even numbered pixel charge in each column of charge-transferring stages transfers to a first charge accumulation section of an associated cyclic transfer register;

the storing step includes the step of transferring the even numbered pixel charges in the first accumulation section of the cyclic transfer registers to a second accumulation section of the cyclic transfer registers;

the second transferring step includes the step of transferring the even and odd numbered pixels charges in the charge-transferring stages in the vertical direction so that an odd numbered pixel charge in each column of charge-transferring stages transfers to the first charge accumulation section of the cyclic transfer registers;

the transferring pixel charges in the cyclic transfer registers step includes the step of transferring the odd numbered pixel charges in the first accumulation section of the cyclic transfer registers to the horizontal registers; and the transferring stored pixel charges step includes the steps of transferring the even numbered pixel charges in the second accumulation section of the cyclic transfer registers to the first accumulation section of the cyclic transfer registers and transferring the even numbered pixel charges in the first accumulation section of the cyclic transfer registers to the horizontal registers.

9. The method of claim 7, wherein during the second field period, the step of transferring the odd numbered pixel charges in the cyclic transfer register includes the steps of transferring the odd numbered pixel charges in the cyclic transfer registers to a first horizontal transfer register and transferring the even and odd numbered charges in the first horizontal transfer register to a second horizontal transfer register; and the step of transferring the stored even numbered pixel charges includes the steps of transferring the stored even numbered pixel charges in the cyclic transfer registers to the first horizontal register and transferring the odd numbered pixel charges in the first horizontal transfer register to the second horizontal transfer register.

10. The method of claim 7, wherein during the second field period the method further comprises the following steps prior to the first transferring step:

transferring the even and odd numbered pixels charges in the charge-transferring stages in the vertical direction so that an odd numbed pixel charge in each column of charge-transferring stages transfers to an associated cyclic transfer registers, and transferring the odd number pixel charges in the cyclic transfer registers to the horizontal transfer registers.

11. The method of claim 7, wherein the two-line solid-state imaging device further includes parallel-to-serial conversion units arranged between the cyclic transfer registers and the horizontal transfer registers, the method further comprising the steps of:

driving the parallel-to-serial conversion units to convert even and odd numbered pixel charges transferred from the cyclic transfer registers to the horizontal transfer registers to serial pixel charges, and outputting serial pixel charges from the horizontal transfer registers, each horizontal transfer register representing a corresponding color in the color filter array.

12. The method of claim 7, wherein the first and second field period form one image frame.

* * * * *